US012770507B2

(12) United States Patent
Nguyen

(10) Patent No.: US 12,770,507 B2
(45) Date of Patent: Oct. 20, 2026

(54) CONNECTED AND ADAPTIVE VEHICLE TRAFFIC MANAGEMENT SYSTEM WITH DIGITAL PRIORITIZATION

(71) Applicant: ThruGreen, LLC, Manassas, VA (US)

(72) Inventor: David Hong Nguyen, Southbridge, VA (US)

(73) Assignee: ThruGreen, LLC, Manassas, VA (US)

( * ) Notice: Subject to any disclaimer, the term of this patent is extended or adjusted under 35 U.S.C. 154(b) by 0 days.

(21) Appl. No.: 18/422,066

(22) Filed: Jan. 25, 2024

(65) Prior Publication Data

US 2024/0257637 A1 Aug. 1, 2024

Related U.S. Application Data

(63) Continuation of application No. 16/874,760, filed on May 15, 2020, now Pat. No. 12,136,338, which is a (Continued)

(51) Int. Cl.
*G08G 1/08* (2006.01)
*G08G 1/01* (2006.01)
(Continued)

(52) U.S. Cl.
CPC ............ *G08G 1/08* (2013.01); *G08G 1/0104* (2013.01); *G08G 1/0129* (2013.01); *G08G 1/0133* (2013.01); *G08G 1/0145* (2013.01); *G08G 1/015* (2013.01); *G08G 1/056* (2013.01); *G08G 1/081* (2013.01); *G08G 1/083* (2013.01); *G08G 1/095* (2013.01); *G08G 1/096* (2013.01)

(58) Field of Classification Search
None
See application file for complete search history.

(56) References Cited

U.S. PATENT DOCUMENTS 8,050,854 B1 * 11/2011 Chandra ................ G08G 1/081 701/119
10,475,127 B1 * 11/2019 Potter .................. B60W 40/08
(Continued)

FOREIGN PATENT DOCUMENTS

GB 2535320 A * 8/2016 ............... G08G 1/08

OTHER PUBLICATIONS

Celine Craye and Fakhri Karray, "Driver distraction detection and recognition using RGB-D sensor", https://arxiv.org/abs/1502.00250 (Year: 2015).*
(Continued)

*Primary Examiner* — Adam D Tissot
*Assistant Examiner* — Charles Pall
(74) *Attorney, Agent, or Firm* — Laubscher & Fretwell, P.C.

(57) ABSTRACT

A system for adaptively controlling traffic control devices having a traffic signal system, a computing network, a communication system, and a mobile device. The traffic signal system is configured to be in communication with the computing network through the communication system. The mobile device is also configured to be in communication with the computing network through the communication system. Then the computing network adaptively controls the traffic signal system using a location of the mobile device.

29 Claims, 36 Drawing Sheets

Related U.S. Application Data continuation of application No. 15/847,351, filed on Dec. 19, 2017, now Pat. No. 10,692,367.

(60) Provisional application No. 62/707,267, filed on Oct. 27, 2017, provisional application No. 62/606,170, filed on Sep. 12, 2017, provisional application No. 62/600,460, filed on Feb. 23, 2017, provisional application No. 62/436,403, filed on Dec. 19, 2016.

(51) Int. Cl.

| | |
|---|---|
| ***G08G 1/015*** | (2006.01) |
| ***G08G 1/056*** | (2006.01) |
| ***G08G 1/081*** | (2006.01) |
| ***G08G 1/083*** | (2006.01) |
| ***G08G 1/095*** | (2006.01) |
| ***G08G 1/096*** | (2006.01) |

(56) References Cited

U.S. PATENT DOCUMENTS

| | | | | |
|---|---|---|---|---|
| 2014/0247159 | A1* | 9/2014 | Cross | G08G 1/082 340/906 |
| 2014/0278029 | A1* | 9/2014 | Tonguz | G08G 1/161 701/117 |
| 2015/0091740 | A1* | 4/2015 | Bai | B60K 35/00 340/901 |
| 2016/0027300 | A1* | 1/2016 | Raamot | G08G 1/0145 340/922 |
| 2017/0124868 | A1* | 5/2017 | Bhat | G08G 1/09623 |
| 2017/0309171 | A1* | 10/2017 | Zhao | G08G 1/096838 |
| 2018/0059669 | A1* | 3/2018 | Madigan | H04W 4/029 |

OTHER PUBLICATIONS

"NCHRP Report 812 Signal Timing Manual Second Edition", National Cooperative Highway Research Program, 2nd ed., 2015. (Year: 2015).*

* cited by examiner

Fig. 8B1

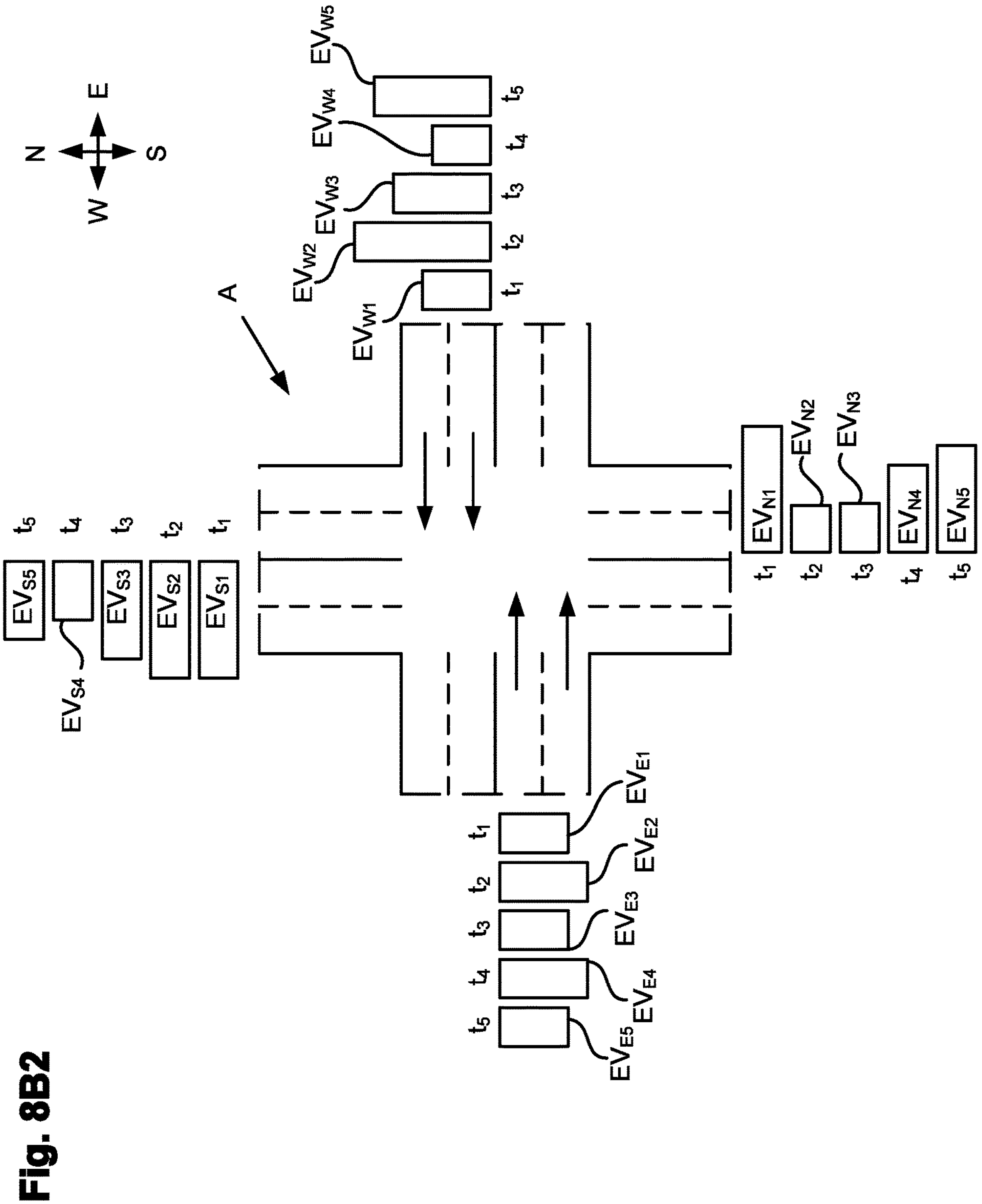
Fig. 8B2

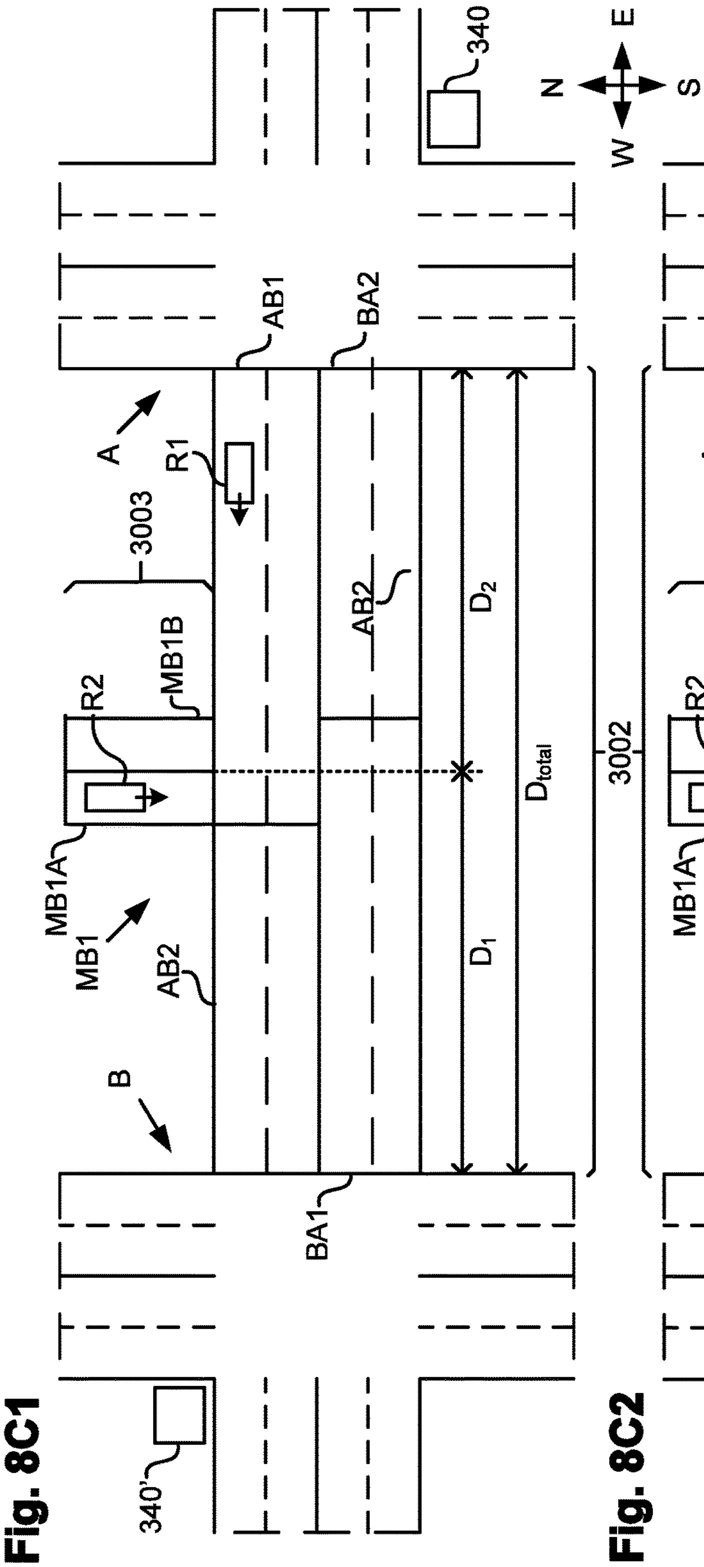
Fig. 8C1
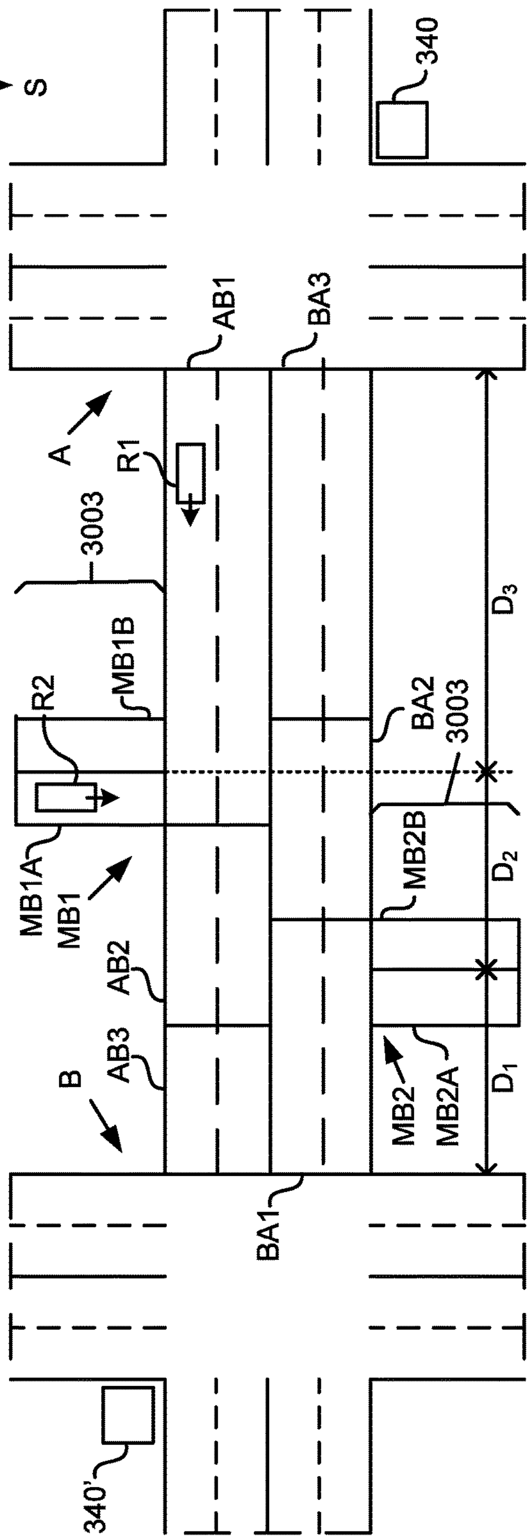
Fig. 8C2

Fig. 8C3
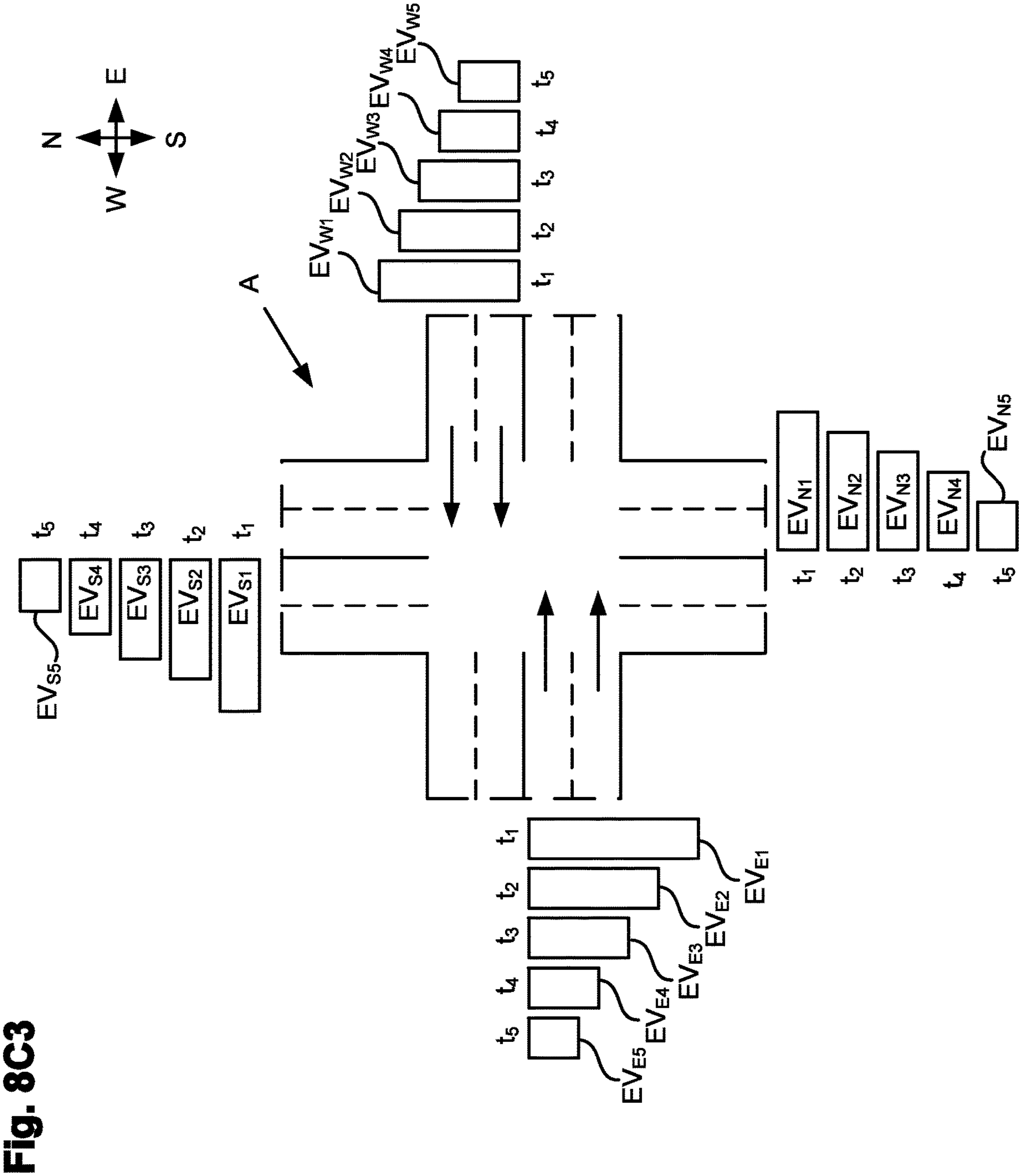

CONNECTED AND ADAPTIVE VEHICLE TRAFFIC MANAGEMENT SYSTEM WITH DIGITAL PRIORITIZATION

This application is a continuation of U.S. patent application Ser. No. 16/874,760 filed May 15, 2020, which is a continuation of U.S. patent application Ser. No. 15/847,351 filed Dec. 19, 2017, which claims benefit of U.S. provisional applications 62/436,403 filed Dec. 19, 2016, 62/600,460 filed Feb. 23, 2017, 62/606,170 filed Sep. 12, 2017, and 62/707,267 filed Oct. 27, 2017. The contents of each of these applications are incorporated by reference herein in their entirety.

BACKGROUND

Field of the Disclosure

The present disclosure is directed to a connected and adaptive vehicle traffic management system with digital prioritization.

Description of the Related Art

Vehicle traffic congestion is a major problem worldwide with costs estimated in the hundreds of billions of dollars per year in the United States alone. While there are many causes of traffic congestion, some of the major causes include vehicle counts exceeding road capacity for given conditions, unpredictable human drivers, many of whom are distracted, accidents, and timed traffic signals that further limit road capacity at signalized junctions (intersections).

Congestion can arise in cases where more vehicles are waiting in a queue at a junction for a traffic signal to change from displaying a red light to displaying a green light, and the period the traffic signal is green does not allow all the vehicles waiting in the queue to pass through the junction. Another case where congestion may arise in a similar scenario is if the traffic signal does remain green to otherwise clear the waiting queue of vehicles but a road ahead of the queue of vehicles is congested with other vehicles, the queue of vehicles still cannot proceed through the junction.

Further, while highways and interstate freeways are not typically signalized, traffic congestion on those thoroughfares can also have a significant impact on transportation and quality of life in general.

SUMMARY

The present disclosure is directed to a system for adaptively controlling traffic control devices having a traffic signal system, a computing network, and a communication system. The system is configured to receive information from a mobile device. The traffic signal system is configured to be in communication with the computing network through the communication system. The mobile device is also configured to be in communication with the computing network through the communication system. Then the computing network adaptively controls the traffic signal system using a location of the mobile device.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIGS. 8A-8B are flowcharts of exemplary traffic signal control processes;

FIG. 8A is a diagram of an exemplary semi-actuated traffic signal timing process 860 (semi-actuated process 860) that may be applied to the junction A by the TMS 101;

FIG. 8B1 is a diagram of an exemplary actuated traffic signal timing process 880 (actuated process 880) that may be applied to the junction A by the TMS 101;

FIG. 8B2 is a diagram indicating magnitudes of traffic demand approaching the junction A from each direction, according to one example;

FIG. 8C1 is a diagram of a road segment 3002 connecting a signalized junction A located at an eastern end and a signalized junction B located at a western end of the road segment 3002, respectively, according to one example;

FIG. 8C2 is a variation of that shown in FIG. 8C1, according to one example;

FIG. 8C3 is a diagram indicating magnitudes of traffic demand approaching the junction A from each direction, according to one example;

DETAILED DESCRIPTION OF THE EMBODIMENTS

Figure 1:
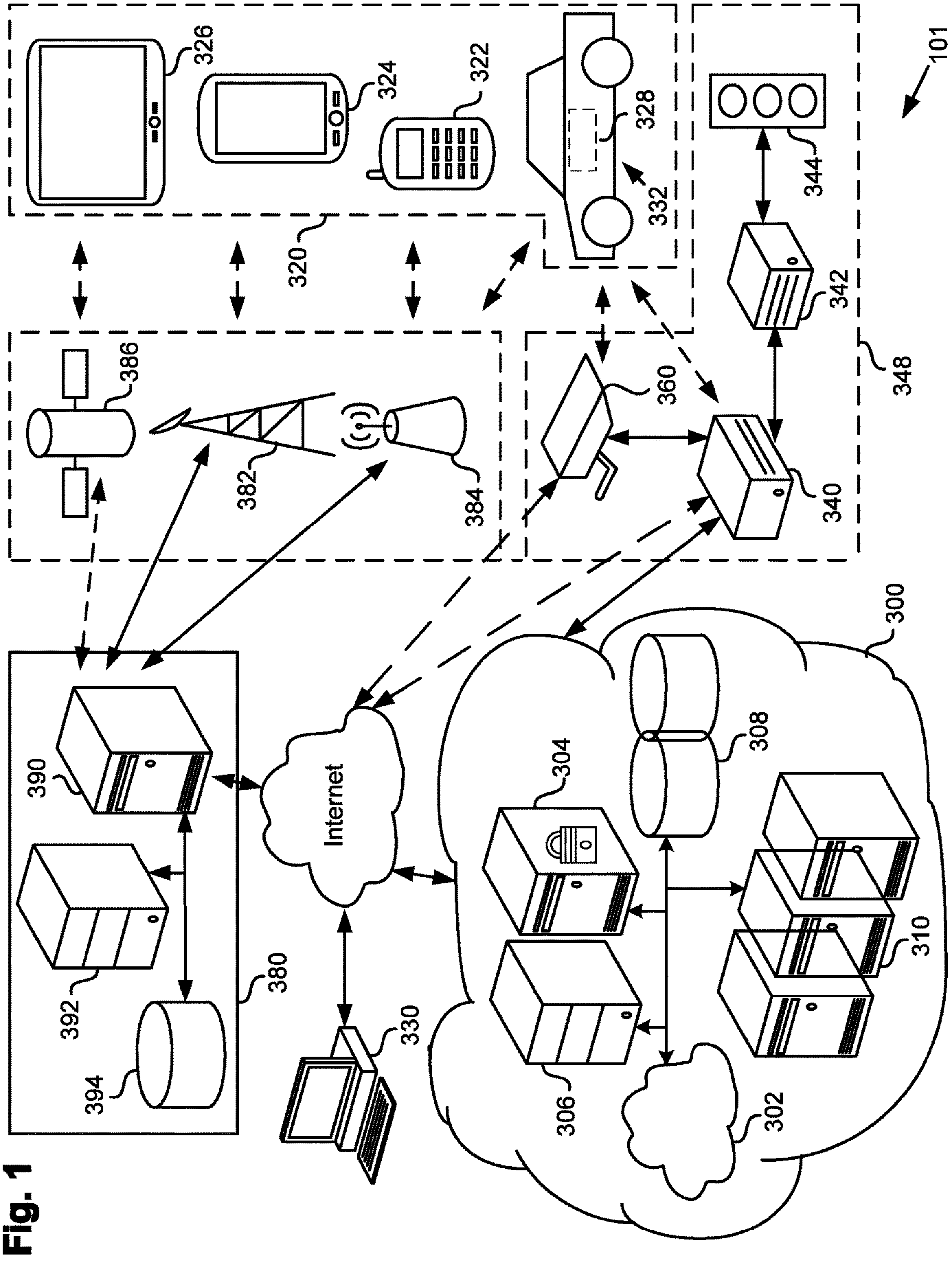
FIG. 1 illustrates a traffic management system (TMS) 101, including a computing network environment and connections between various systems and devices, according to one example.

In the drawings, like reference numerals designate identical or corresponding parts throughout the several views. Further, as used herein, the words "a", "an" and the like generally carry the meaning of "one or more", unless stated otherwise. Referring now to the drawings, wherein like reference numerals designate identical or corresponding parts throughout the several views.

FIG. 1 illustrates a traffic management system (TMS) 101, including a computing network environment and connections between various systems and devices, according to one example.

The computing network environment may be concentrated in a physical location or distributed, such as by a cloud computing environment 300 and/or a fog computing environment. In one embodiment, users and devices may access the cloud computing environment 300 through systems, mobile devices 320, and fixed devices that are connected to an internet, other networks or, for example, directly with the cloud computing environment 300, a Traffic Control Device (TCD) controller 340, or a detection device 360. Connections to the internet may include both wireless and wired connections.

Exemplary mobile devices 320 may include a cell phone 322, a smartphone 324, a tablet computer 326, and a variety of connected vehicle systems 328, such as telematics devices, navigation and infotainment devices, and vehicle tracking devices that may be on-board, built-into, or installed in a vehicle 332. Additional mobile devices 320 may include identification, biometric, health, medical, and physiological monitoring devices, or any device that may provide data to a mobile device or network. Mobile devices 320 may also include devices such as laptop and notebook computers that may use wireless or mobile communication to communicate with the internet, mobile networks, or other wireless networks.

A mobile device 320 may connect to the cloud and the TCD controller 340 through a mobile network service 380, with signals transmitted to the mobile network service 380 (e.g. EnodeB, HeNB, or radio network controller) via a wireless communication channel such as a base station 382 (e.g. a 3G, 4G, 5G, EDGE, or LTE network), an access point 384 (e.g., a femtocell or Wi-Fi network), a satellite connection 386, or any other wireless form of communication that is known. The TCD controller 340 may also be part of a traffic signal system (TSS) 348, as further illustrated by FIGS. 2A-2D.

Further, wireless communication may occur between a mobile device 320 and a TCD controller 340 or detection device 360, such as through Vehicle-to-Vehicle (V2V), Vehicle-to-Infrastructure (V2I), Vehicle-to-Person (V2P), and Vehicle-to-Everything (V2X) protocols, including use of Dedicated Short Range Communication (DSRC), which may be operating on a 5.9 GHz spectrum, Near Field Communication (NFC), Radio-frequency identification (RFID), infrared, the mobile device 320 and another mobile device, or any other form of wireless communication or detection that is known, if the detection device 360 or the TCD controller 340 is configured to communicate with the mobile device 320, or otherwise detect the vehicle 332 or the mobile device 320. In one example, the TCD controller 340 may communicate directly with the cloud computing environment 300 (and/or may be considered part of the cloud computing environment 300), the internet, and/or a mobile device 320, for example, to stream images from a traffic camera, transmit a road or travel condition, or communicate information to, from, or about the cloud computing environment 300, the TCD controller 340, or the detection device 360, or receive information from the mobile device 320. In some cases, the detection device 360 may connect directly to the internet and/or the mobile device 320 (such as via a roadside DSRC receiver/transmitter unit or via a local fog computing network).

In one example, signals from a wireless interface of the mobile device 320 and a wireless communication channel are transmitted to the mobile network service 380. A central processor 390 of the mobile network service 380 may receive requests and information via signals from one or more mobile device 320. The central processor 390 may be connected to a server 392 and a database 394, and the mobile network service 380 may, for example, provide authentication or authorization for access to the various devices and systems in communication with the mobile network service 380 and/or the mobile device 320 based on data stored in the database 394. Mobile device information or requests may then be delivered to the cloud computing environment 300 through at least one of the internet and another connection.

The cloud computing environment 300 may also be accessed through fixed devices such as a desktop terminal 330, the TCD controller 340, or the detection device 360 that is connected to the internet via a wired network connection or a wireless network connection.

The network may be a public or private network such as a Local Area Network (LAN) or a Wide Area Network (WAN). Further, the TCD controller 340 may be connected directly to the cloud computing environment 300, again either via a wired network connection or a wireless network connection. The network may be wireless such as a cellular network (including 3G, 4G, 5G, EDGE, and LTE systems). The wireless network may also be connected by Wi-Fi, Bluetooth, or any other wireless form of communication that is known.

Mobile devices 320 and fixed devices may connect to the cloud computing environment 300 via the internet, or through another connection, to send input to and receive output from one or more of the cloud computing environment 300, the TCD controller 340, the detection device 360, or other fixed or mobile devices. Each mobile device 320 may communicate with at least one of the cloud computing environment 300, the TCD controller 340, another mobile device 320, and the detection device 360 through at least one of any form of wireless communication.

In some examples, the TCD controller 340 may be connected to a Conflict Monitoring Unit (CMU) 342, and the CMU 342 may be connected to a Traffic Control Device (TCD) 344 such that the CMU 342 verifies instructions provided by the TCD controller 340 to the TCD 344 are valid and safe to execute. In another example, the TCD controller 340 is connected to and directly controls the TCD 344. Examples of the TCD 344 may include traffic signals, dynamic message signs, speed limit signs, gates, railroad crossings, and dynamic lane indicators.

In one example, the cloud computing environment 300 may include a cloud controller 302 to process requests to provide devices with corresponding cloud services. These services may be provided through the use of a service-oriented architecture (SOA), utility computing, and virtualization.

In one example, the cloud computing environment 300 may be accessed via an access interface such as a secure gateway 304. The secure gateway 304 may, for example, provide security policy enforcement points placed between cloud service consumers and cloud service providers to apply enterprise security policies as the cloud-based resources are accessed. Further, the secure gateway 304 may consolidate multiple types of security policy enforcement, including, for example, authentication, authorization, single sign-on, tokenization, security token mapping, encryption, logging, alerting, and API control.

The cloud computing environment 300 may provide computational resources using a system of virtualization, wherein processing and memory requirements may be dynamically allocated and distributed among a combination of processors and memories to create a virtual machine to efficiently utilize available resources. Virtualization effectively may create an appearance of using a single, seamless computer even though multiple computational resources and memories may be utilized depending on fluctuations in demand.

In one example, virtualization is accomplished by use of a provisioning tool 306 that prepares and equips the cloud resources such as a data storage 308 and a processing center 310 to provide services to devices connected to the cloud computing environment 300. The processing center 310 can be a mainframe computer, a data center, a computer cluster, or a server farm. In one example, the data storage 308 and the processing center 310 are co-located.

The preceding descriptions are non-limiting examples of corresponding structure for performing the functionality described herein. One skilled in the art will recognize that the TCD may be adjusted or controlled by a computing device and/or a TCD controller in response to data from a mobile device or other detection or information input source in a variety of ways.

FIGS. 2A-2D are block diagrams illustrating exemplary configurations of traffic signal systems 348 (**348*a*, 348*b*, etc.). Each traffic signal system 348 may be configured to provide communication and detection between at least one mobile device 320, the cloud computing environment 300, at least one TCD controller 340, and at least one detection device 360** to adaptively manage traffic control devices and/or systems.

One or more mobile devices 320 may be configured to communicate with at least one of the cloud computing environment 300, the TCD controller 340, and the detection device 360. The TCD controller 340 may be connected to the cloud computing environment 300, the detection device 360, and the mobile devices 320.

The cloud computing environment 300 may be configured to communicate with a number of mobile systems, control systems, detections systems, mobile devices 320, TCD controllers 340, and detection devices 360. Devices or systems configured to communicate with one another may be able to send and receive data in at least one direction, for example, from the detection device 360 to the TCD controller 340. Further, communications may occur in more than one direction, for example, also from the TCD controller 340 to the detection device 360, and may occur in multiple directions between multiple devices.

The TCD controller 340 may be configured to communicate with at least one of the cloud computing environment 300, one or more CMUs 342 (342', etc.), one or more detection devices 360 (360', 360", etc.), one or more mobile devices 320, and one or more TCD 344 (344', etc.). Further, each TCD 344 (344', etc.) may be connected to and controlled by at least one CMU 342 or TCD controller 340.

In one example of the traffic signal system **348*a* (illustrated by FIG. 2A), at least one mobile device 320 may communicate with at least one of the cloud computing environment 300, the TCD controller 340, and one or more detection devices 360. The TCD 344 may be controlled by the TCD controller 340, which may also have a CMU 342 as an intermediate connection between the TCD controller 340 and the TCD 344. The TCD controller 340 may be connected to at least one of the cloud computing environment 300, at least one detection device 360, and one or more mobile devices 320**.

Figure 2A:
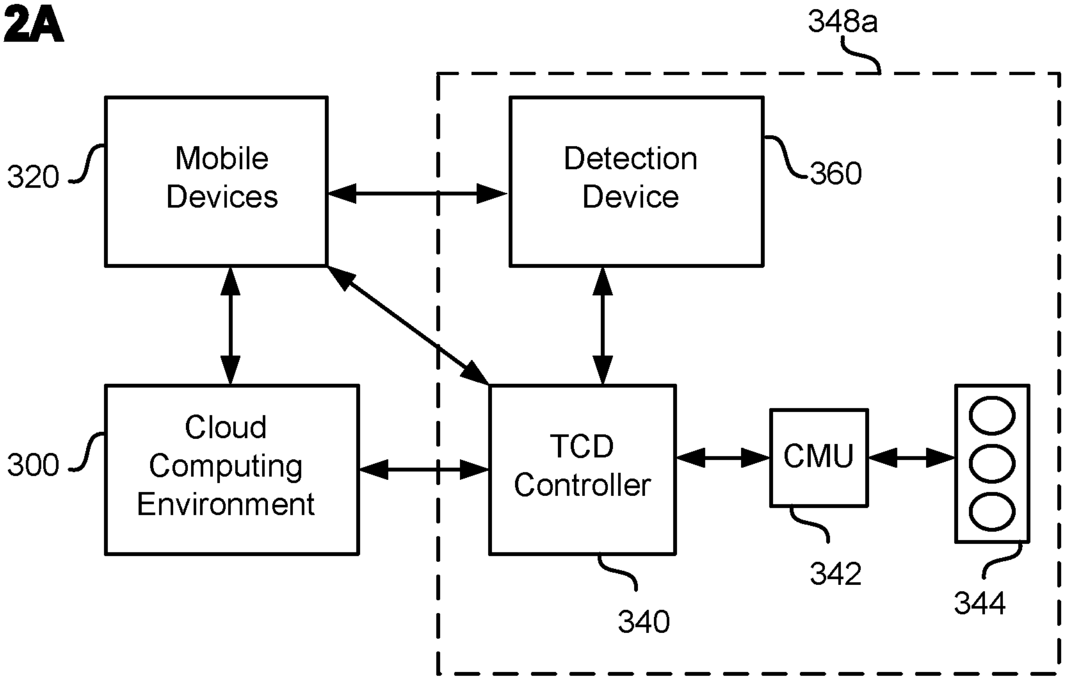
FIGS. 2A-2D are block diagrams illustrating exemplary configurations of traffic signal systems 348 (348*a*, 348*b*, etc.)
Figure 2B:
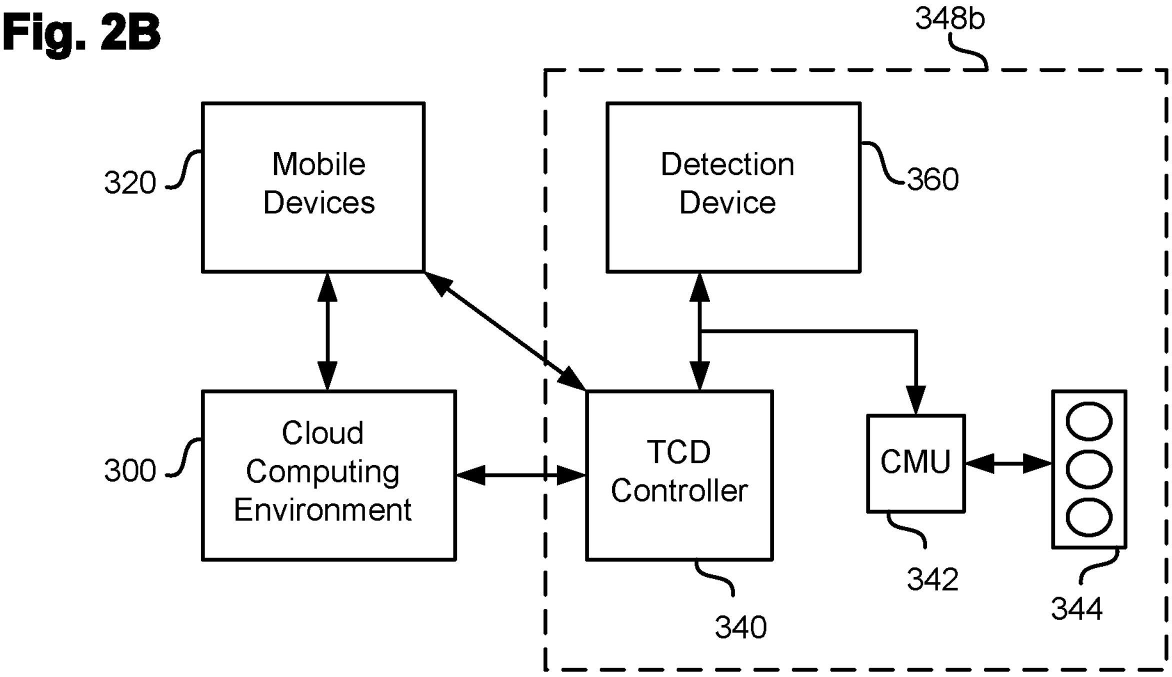
Figure 2C:
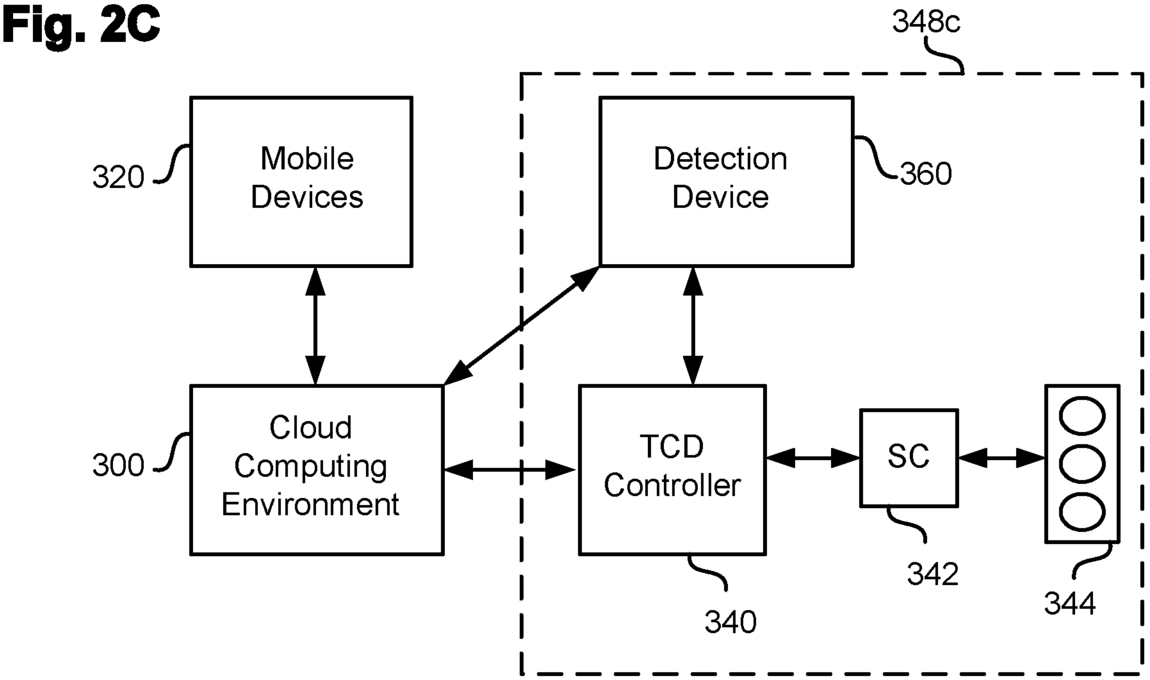
Figure 2D:
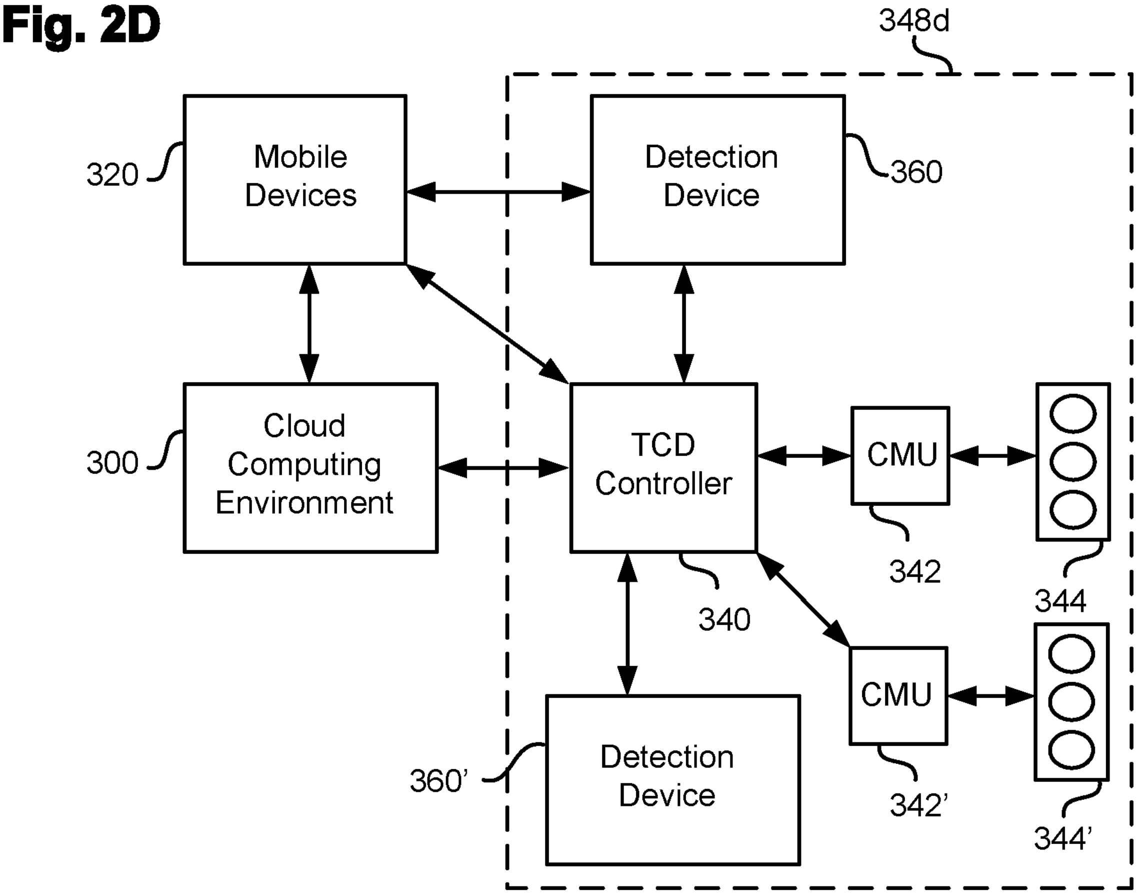

In another example (illustrated by FIG. 2B), a traffic signal system **348*b* may be identical to that illustrated by FIG. 2A with the exception that at least one detection device 360 may also communicate directly with the cloud computing environment 300 and the TCD controller 340 may be directly in communication with the TCD 344 instead of through a CMU 342. Further, in some cases, the functions of the CMU 342 may be incorporated into the TCD controller 340 and/or the TCD 344**.

In another example (illustrated by FIG. 2C), a traffic signal system 348*c* may be identical to that illustrated by FIG. 2A with the exceptions that the TCD controller 340 may be configured to communicate with one or more CMUs 342 (e.g. 342, 342', etc.) and/or corresponding TCDs 344 (e.g. 344, 344', etc.), respectively, and that the TCD controller 340 may also communicate with one or more detection devices 360 (e.g. 360, 360', etc.).

In another example (illustrated by FIG. 2D), a traffic signal system 348*d* may be identical to that illustrated by FIG. 2A with the addition of a second TCD controller 340' connected to, for example, additional detection devices 360' and 360", and a second CMU 342', and the second CMU 342' further connected to a second TCD 344'.

Further, detection devices 360 of any of the exemplary configurations may also be connected to more than one TCD controller 340, and any of the TCD 344 may be connected directly to a TCD controller 340 without a CMU 342. The preceding descriptions are non-limiting exemplary implementations of corresponding structure for performing the functionality described herein.

A TCD controller 340 of a junction A may control each of the TCD 344 of the junction A by a timing plan. Each TCD 344 may also have dynamic displays, for example a green light to indicate permission to proceed in a forward direction that may also change to a forward or upward pointing arrow to indicate allowable movement in a forward direction, or a left pointing arrow to indicate allowable movement in a leftward direction in a same display or housing.

Each TCD 344 may include or be complemented by a sign or display to provide additional information, such as a countdown until a green or red light will be provided, until another condition has been met, or indicators for pedestrians, bicyclists, vehicles, and certain modes of transportation (e.g. transit buses, rail, etc.) to stop or proceed.

Figure 3:
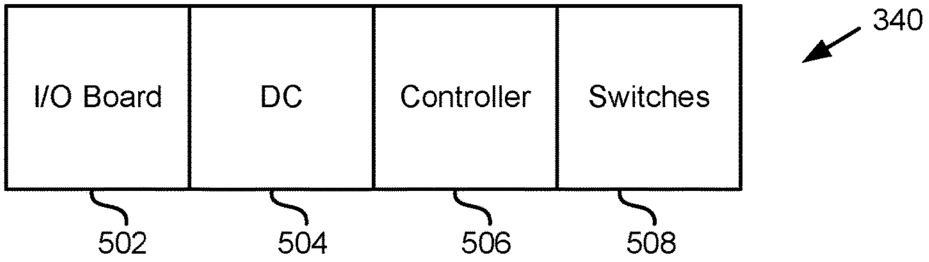
FIG. 3 illustrates a block diagram of a TCD controller 340, according to one example.

FIG. 3 illustrates a block diagram of a TCD controller 340, according to one example. The TCD controller 340 may be a system or an assembly that includes an input/output board 502 connected to a detector card (DC) 504, and a controller 506 may be connected to the DC 504. The controller 506 may be connected to and configured, for example, to receive data for and/or transmit a status of the controller 506 or the status of at least one switch 508 that is configured to control one or more TCD 344, or to communicate to a CMU 342 that is connected to one or more TCD 344, such as described by FIGS. 2A-2D.

In one example, the DC 504 may convert signals received by the input/output board 502, such as those from at least one detection device 360 and/or the cloud computing environment 300, into at least one format that the controller 506 may process. The controller 506 may be connected to at least one switch 508 that is connected to either a CMU 342 that is further connected to at least one TCD 344, or the switch 508 may be connected directly to at least one TCD 344.

In another example, the controller 506 may send signals directly to or receive signals directly from the cloud computing environment 300, detection devices 360, and/or mobile devices 320, such as described by FIGS. 2A-2D. Such signals may be digital and in the form of commands transmitted or received via a software application layer residing within the controller 506 or elsewhere.

Further, in some examples, digital commands transmitted or received by the controller 506 may include provisions for a time delay prior to or after transmission to execute at a later time.

This may allow digital commands such as one or more signal timing plans to be computed in advance and revised or overwritten one or more times prior to execution.

Further, in some examples, switches 508 may be built into the controller 506 or virtualized and effectively operate the TCD 344 via digital commands originating from a software application layer operating within the controller 506 and/or any device or network the controller 506 may be connected to.

Figure 4A:
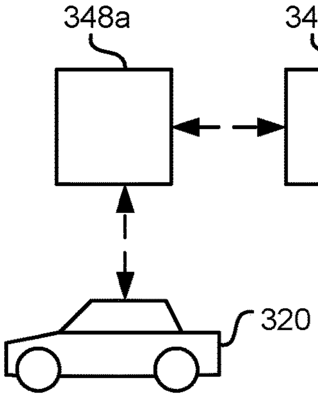
FIGS. 4A-4C illustrate exemplary communication configurations between a mobile device 320 and a number of traffic signal systems 348 (348*a*, 348*b*, 348*c*)
Figure 4B:
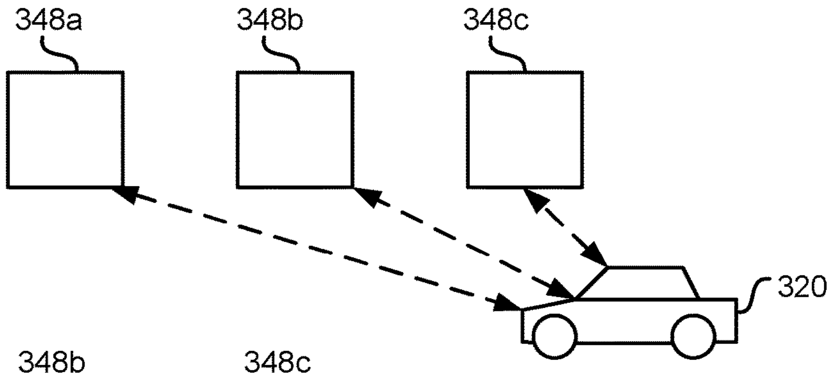
Figure 4C:
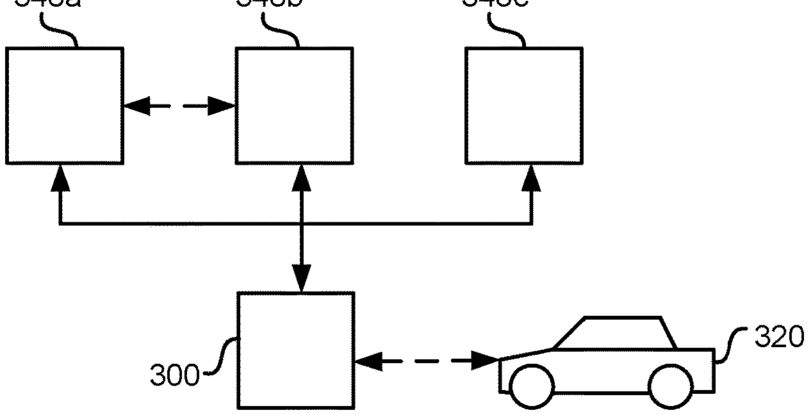

FIGS. 4A-4C illustrate exemplary communication configurations between a mobile device 320 and a number of traffic signal systems 348 (348*a*, 348*b*, 348*c*).

In one example, a first traffic signal system 348*a* may be in communication with the mobile device 320 (illustrated by FIG. 4A), to identify, for example, a location and/or a heading of the mobile device 320. In some cases the first traffic signal system 348*a* may be in further communication with at least one of a second traffic signal system 348*b* and/or a third traffic signal system 348*c*, and may also provide information about the mobile device 320.

In another example, each of the traffic signal systems 348*a*, 348*b*, and 348*c* may be in communication with the mobile device 320 (illustrated by FIG. 4B). In some cases the first traffic signal system 348*a* may be in further communication with at least one of the second traffic signal system 348*b* and the third traffic signal system 348*c*, and may provide information about the mobile device 320.

In another example, the mobile device 320 may be in communication with a cloud computing environment 300 (illustrated by FIG. 4C), that may also referred to as Central, such as described by FIG. 1. In some cases the first traffic signal system 348*a* may be in further communication with at least one of the second traffic signal system 348*b* and the third traffic signal system 348*c*, and may also provide information about the mobile device 320.

In each example, the cloud computing environment 300 and/or at least one of the traffic signal systems 348*a*, 348*b*, 348*c* may receive data from the mobile device 320 disclosing at least one of identification, location, heading, speed, status, and time information, or from which such information may be derived or determined. Other information may also be provided by the mobile device 320 to the cloud computing environment 300, and vice versa. Data from the mobile device 320 may be provided to the cloud computing environment 300 or the respective TCD controller 340 of each traffic signal system 348.

At least one of the cloud computing environment 300, the traffic signal system 348, and the TCD controller 340 may be configured to process data received from a number of sources, including the mobile device 320, to adjust traffic signal phase and timing (SPaT) for a signalized junction. SPaT adjustments may include at least one of a present or a future green, red, and yellow (amber) signal phase, durations, and operating mode of one or more TCD 344 of one or more signalized junctions. SPaT adjustments may be made at the TCD controller 340 by algorithms (such as those described by FIGS. 8A-8B) operating within the TCD controller 340, in some cases influenced by external inputs such as from detection devices local to the junction or a variety of data sources received by the TCD controller 340 as previously described. In another case, SPaT adjustments may be made by algorithms operating within the TMS 101 but outside of the TCD controller 340. Data sources may include inputs from roadside detection systems (e.g. inductive loops, video or thermal cameras, radar, etc.), detection broadcast from mobile devices and/or vehicles, detection information from vehicles, bicyclists, pedestrians and drones or devices configured to communicate presence and location information to the TMS 101, and aggregate data feeds from traffic/navigation providers (e.g. through the cloud, apps, and/or internet).

External inputs may be used to adjust, influence, override or otherwise change a present or future SPaT operation of the TCD controller 340 and any TCD 344 the TCD controller 340 may be connected to or configured to operate.

FIGS. 5A-5F are diagrams representing exemplary non-conflicting traffic movements in a plan view of a signalized four-way junction A, with a compass representing North (N), East (E), West (W), and South (S) directions. Junctions of roads may include any number of directions such as three-way, four-way, and five-way junctions, varying combinations of directions such as a two way street intersecting another two way street, a two way street intersecting a one way street, or a one way street intersecting a one way street. While all examples depicted in this disclosure illustrate a road system where vehicles proceed on a right hand side of a road such as in the United States, Germany, and Canada, a person having ordinary skill in the art will recognize that road systems where vehicles proceed on a left hand side of a road such as in the United Kingdom, Japan, and Australia, are also amenable to the content described herein.

Arrows indicate some of the possible directions that vehicle traffic may proceed through the junction A. Solid arrows indicate a direction with a green light signal in progress and right of way while dotted arrows indicate a direction that may proceed after yielding to cross traffic or pedestrians. Traffic flows through the junction A may be described by a system of equations that sum a number of vehicles entering and exiting each direction of the junction A during a time period. During the time period the number of vehicles entering the junction A equals the number of vehicles exiting the junction A unless a subset S of the vehicles remains within the junction A, for example, due to parking, traffic congestion, a collision, or other immobilization. Traffic flow through the exemplary four way junction A may be represented by a set of equations such as:

$$A_{OE}=A_{IW}+rt(A_{IS})+lt(A_{IN})+ut(A_{IE})-lt(A_{IW})-rt(A_{IW})-ut(A_{IW})-S_E A_{OW}=A_{IE}+rt(A_{IN})+lt(A_{IS})+ut(A_{IW})-lt(A_{IE})-rt(A_{IE})-ut(A_{IE})-S_W A_{ON}=A_{IS}+rt(A_{IE})+lt(A_{IW})+ut(A_{IN})-lt(A_{IS})-rt(A_{IS})-ut(A_{IS})-S_N A_{OS}=A_{IN}+rt(A_{IW})+lt(A_{IE})+ut(A_{IS})-lt(A_{IN})-rt(A_{IN})-ut(A_{IN})-S_S$$

Where during the time period, $A_{OE}$ is a number of vehicles heading out of the junction A in an eastbound direction, $A_{OW}$ is a number of vehicles heading out of the junction A in a westbound direction, $A_{ON}$ is a number of vehicles heading out of the junction A in a northbound direction, $A_{OS}$ is a number of vehicles heading out of the junction A in a southbound direction, $A_{IE}$ is a number of vehicles heading into the junction A from an eastbound direction, $A_{IW}$ is a number of vehicles heading into the junction A from a westbound direction, $A_{IN}$ is a number of vehicles heading into the junction A from a northbound direction, $A_{IS}$ is a number of vehicles heading into the junction A from a southbound direction, and S may be a sum of $S_E$, $S_W$, $S_N$, and $S_S$ that represents a number of vehicles that enter the junction A from each direction, respectively, and remain within the junction A. Further, the functions rt( ), lt( ), and ut( ) represent a number of vehicles turning right, turning left, and performing a U-turn, respectively, within the junction A and from a direction denoted (e.g. rt(AIS) denotes the function of determining a number of vehicles entering the junction A from a southbound direction, turning right and then exiting the junction A in an eastbound direction). A three way junction C as described by FIGS. 6A-6C may have flows as the equations for the exemplary four way junction A above with one or more terms equal to zero:

$$AOE = A_{IW} + rt(A_{IS}) + ut(A_{IE}) - rt(A_{IW}) - ut(A_{IW}) - S_E A_{OW} = A_{IE} + lt(A_{IS}) + ut(A_{IW}) - lt(A_{IE}) - ut(A_{IE}) - S_w A_{OS} = rt(A_{IW}) + lt(A_{IE}) + ut(A_{IS}) - S_S$$

Equations for junctions having more roads such as five, six, and seven way junctions may use the same principles and have additional terms added instead. Further, equations may be more specific to set equations by lanes if there are multiple lanes in at least one travel direction through the junction A. Generally, the number of equations is proportional to the number of approaches to the junction, whether by road segments or by the number of individual lanes of each road segment.

The TMS 101 and/or the traffic signal system 348 may switch between various traffic phases, movements and/or cycles at the junction A that allow at least one detected vehicle approaching the junction A to have a greater probability of passing through without delay or with less delay than if the traffic signal system 348 was not adaptive or aware of the vehicle. Any non-conflicting combination of movements through the junction A and a time duration of each movement may be applied by the TMS 101 to the traffic signal system 348 for traffic control, for example, to maximize vehicle throughput, minimize total travel time, minimize average travel time, reduce a number of stops for at least one vehicle, accommodate emergency vehicles, accommodate pedestrian movements, or some other objective or combination of objectives. The time duration may vary between a minimum required green time and a maximum allowed green time. Further, a first movement in a combination of non-conflicting movements through the junction A may have a different time duration from a second movement provided at least a previous or subsequent combination of non-conflicting movements through the junction A also includes one of the first movement or the second movement such that there is no gap or discontinuity in a sequence of movements.

Figure 5A:
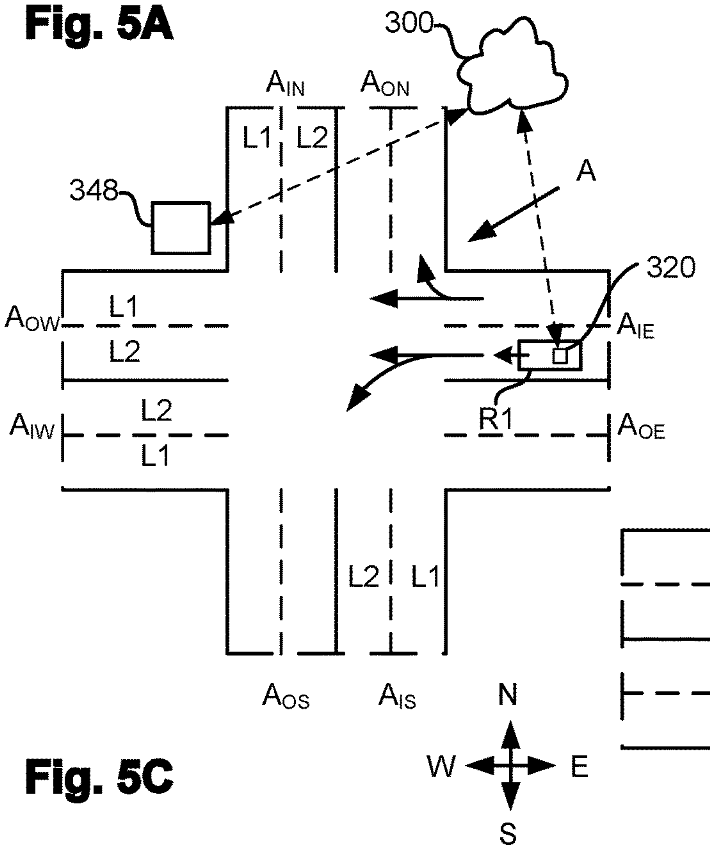
FIGS. 5A-5F are diagrams representing exemplary non-conflicting traffic movements in a plan view of a signalized four-way junction A, with a compass representing North (N), East (E), West (W), and South (S) directions.
Figure 5B:
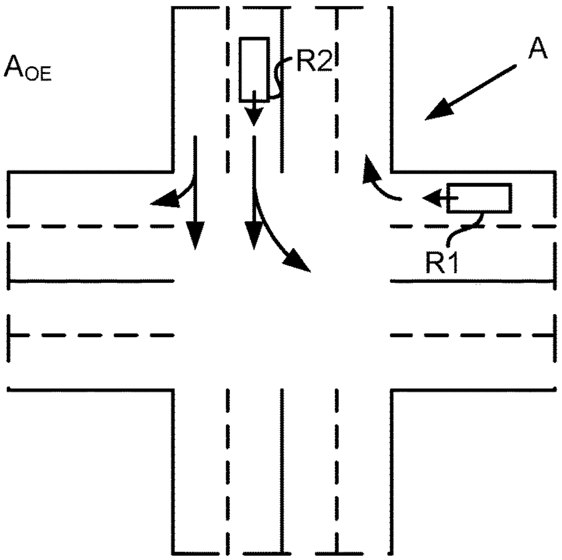
Figure 5C:
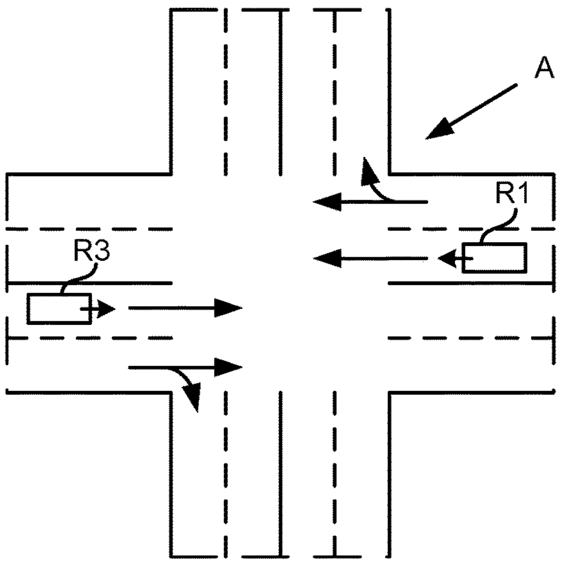
Figure 5D:
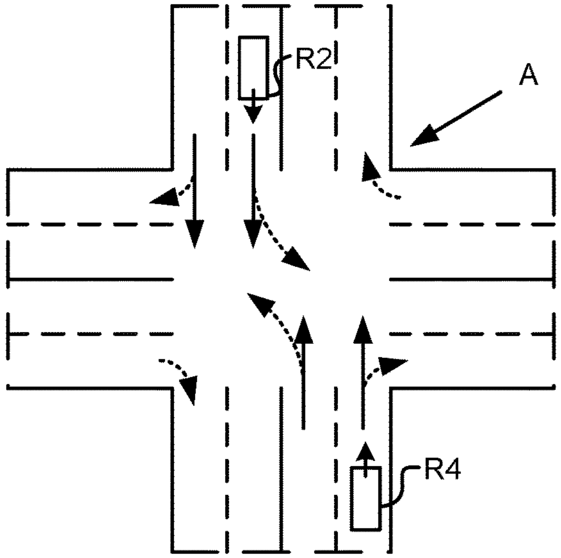
Figure 5F:
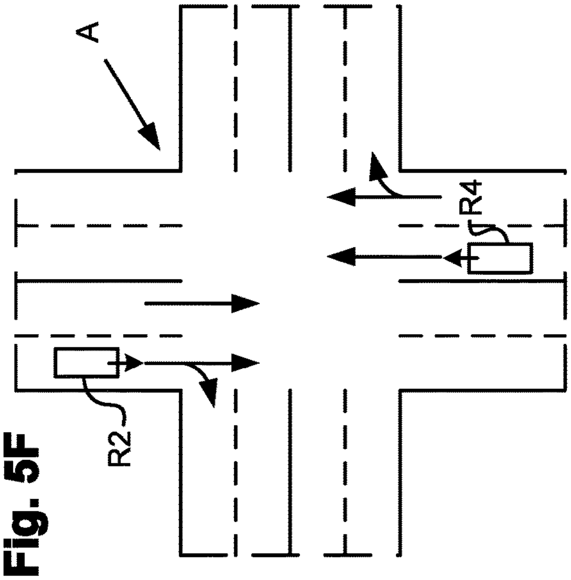

For example, movements described by FIG. 5A may be followed by movements described by FIG. 5C. While eastbound movement is not included in FIG. 5A, it is included in FIG. 5C while westbound movement is included in both FIGS. 5A and 5C. In this way a sum of green time in the westbound movements (disregarding the left turn movement from westbound to southbound) may have a continuous total time duration that is different from that of the eastbound movements.

A time $t_c$ to change one or more TCD 344 at a signalized intersection from one direction to another may include, for example, at least one of a minimum green signal time, a yellow (or amber) signal time, an all red time (a duration of time that all signals in all directions of the junction A are red), and a latency time, where the latency time may include known delays in communication and signal transmission, for example, between a vehicle and the TMS 101, and between the TMS 101 and the TCD 344. Detection of the vehicle R1, such as by the TMS 101 or the traffic signal system 348, may be via any way described herein or otherwise known (mobile device, detection via inductive loop, video camera, thermal camera, radar, sonar, etc.).

In one example, the vehicle R1 is approaching the junction A from a westbound direction. Use of a green light signal by a control algorithm of the traffic signal system 348 with one of a traffic movement as described by FIGS. 5A-5H may allow the vehicle R1 to proceed through the junction A with minimal delay, if any.

In another example, a vehicle R2 is approaching the junction A from a northern direction. Use of the green light signal with a traffic movement as described by FIG. 5B and FIGS. 5D-5F may allow the vehicle R2 to proceed through the junction A with minimal delay, if any. The underlying concept is that the green light signal may be displayed in a direction of travel of the vehicle R2 prior to the arrival of the vehicle R2 at the junction A by a margin sufficient that a driver does not have to slow for the light. The green light signal is provided not due to chance but due to the TCD controller 340 or TSS 348 receiving at least one signal to provide the green light signal at an appropriate time, and specifically for the vehicle R2 due to, for example, knowing identifying information of the vehicle R2 together with the signal provided about the vehicle R2 approaching.

In another example, a vehicle R3 is approaching the junction A from an eastbound direction. Use of the green light signal with a traffic movement as described by FIGS. 5C-5H may allow the vehicle to proceed through the junction A with minimal delay, if any.

In another example, a vehicle R4 is approaching the junction A from a southern direction. Use of the green light signal with a traffic movement as described by FIGS. 5D-5F may allow the vehicle to proceed through junction A with minimal delay, if any.

The junction A may have one or more approaches leading to the junction A. The approach may be a location or an area within which detection of traffic, such as vehicle, bicycle, or pedestrian, may occur. In some cases, an approach to the junction A from any direction may be located any distance from the junction A, independent of a location of any other approach to the junction A.

Figure 5H:
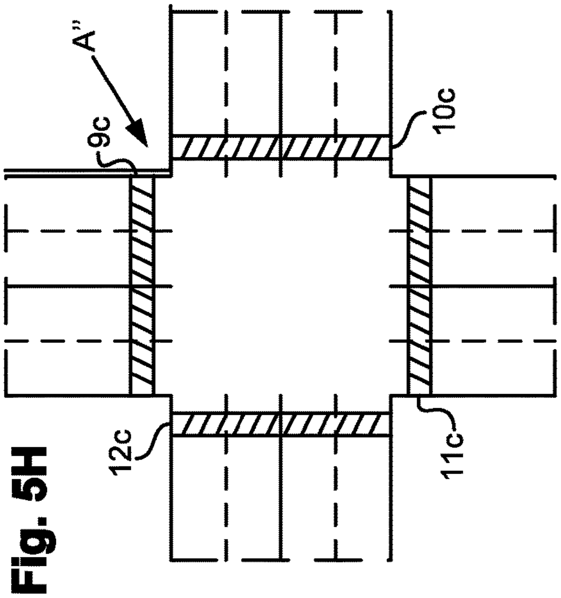
FIG. 5H is a diagram of a plan view of a signalized four-way junction A3, according to one example.
Figure 5H:
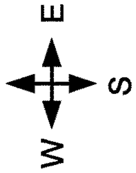
Figure 5E:
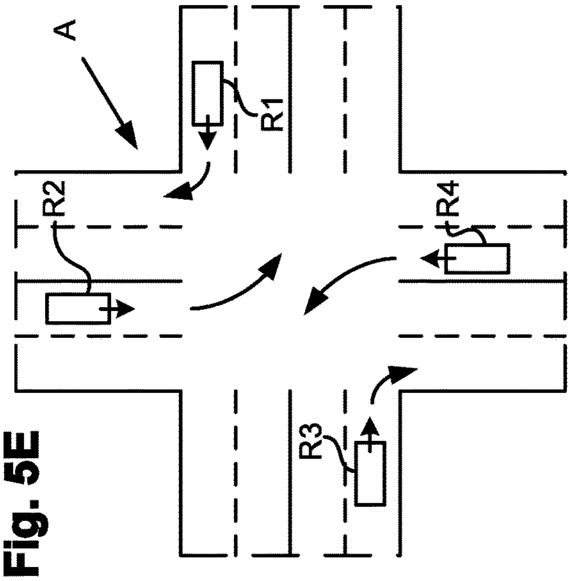
Figure 5G:
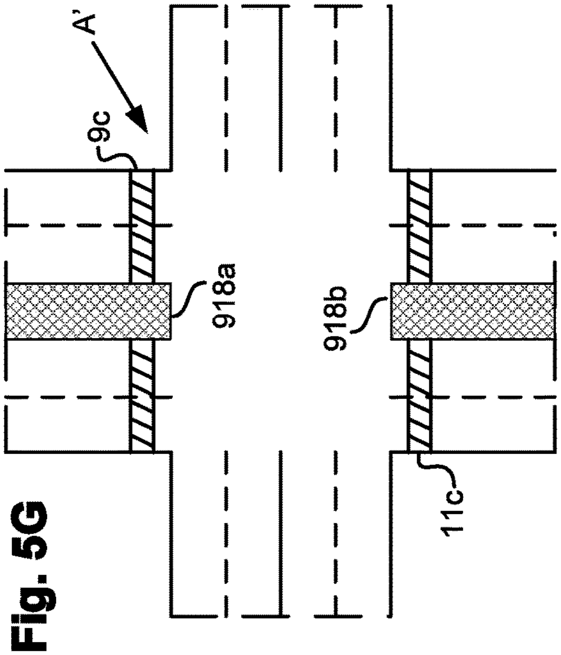
FIG. 5G is a diagram of a plan view of a signalized four-way junction A2, according to one example.

FIG. 5G is a diagram of a plan view of a signalized four-way junction A2, according to one example. Traffic movements may include those described by FIGS. 5A-5F. However, the junction A2 may include one or more medians 918 (918*a*, 918*b*) in at least one direction, and may include a first crosswalk 10*c* and a second crosswalk 12*c*.

In one example, the median 918 may provide a stopping point for pedestrians using either the first crosswalk 10*c* or the second crosswalk 12*c* such that vehicle traffic traveling in an eastbound direction may be stopped while traffic in a westbound direction may be allowed to proceed (e.g. pedestrians waiting on the median 918*b* to travel northbound on the crosswalk 10*c* may proceed if westbound vehicle traffic is stopped even if eastbound traffic may proceed), or vice-versa. This decouples each segment of the crosswalks 10*c* and 12*c* from certain other pedestrian and vehicle movements, instead of requiring vehicle traffic in both eastbound and westbound directions of the junction A2 to simultaneously come to a stop before pedestrians may use at least a portion of either the crosswalk 10*c* or 12*c*.

FIG. 5H is a diagram of a plan view of a signalized four-way junction A3, according to one example. Traffic movements may include those described by FIGS. 5A-5F. However, the junction A3 may include a first crosswalk 10*c*, a second crosswalk 12*c*, a third crosswalk 9*c*, and a fourth crosswalk 11*c*. Traffic movements of the junction A3 may further include various movements for pedestrians using the aforementioned crosswalks 9*c*-12*c*.

Figure 6A:
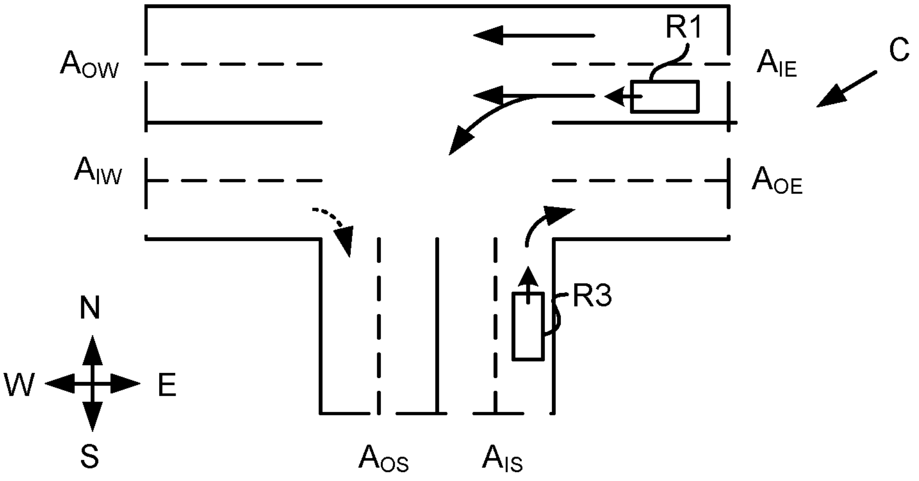
FIGS. 6A-6C are diagrams representing exemplary non-conflicting traffic movements in a plan view of a three-way signalized junction B, with a compass representing North (N), East (E), West (W), and South (S) directions.
Figure 6B:
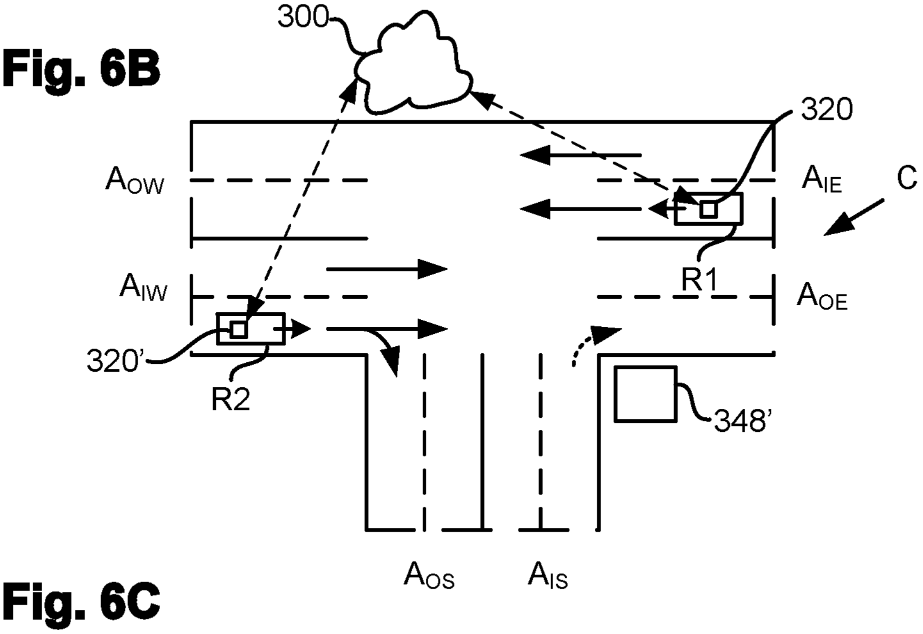
Figure 6C:
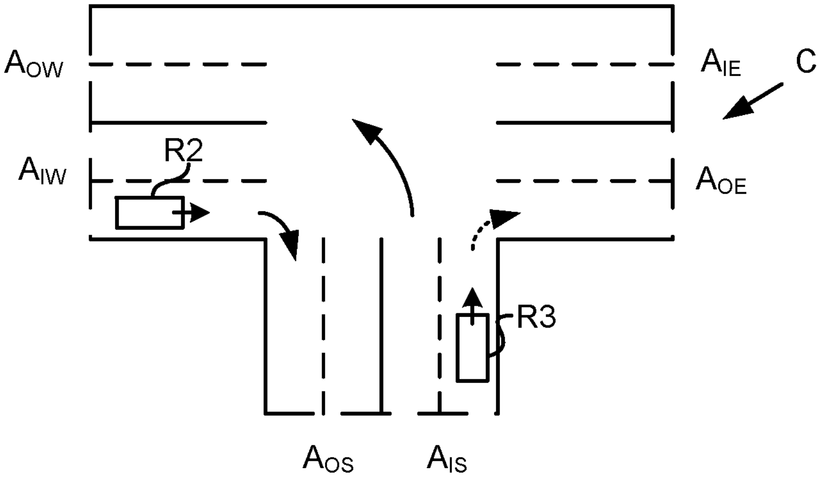

FIGS. 6A-6C are diagrams representing exemplary non-conflicting traffic movements in a plan view of a three-way signalized junction B, with a compass representing North (N), East (E), West (W), and South (S) directions. Arrows indicate some of the possible directions that vehicle traffic may proceed through the junction B. Solid arrows indicate a direction with a green light signal in progress and right of way while dotted arrows indicate a direction that may proceed after yielding to cross traffic or pedestrians.

The TMS 101 and/or the traffic signal system 348 may switch between various traffic movements at the junction B to allow a detected vehicle approaching the junction B to more likely pass through without delay or with less delay than if the traffic signal was not adaptive or aware of the vehicle.

In one example, a vehicle R1 is approaching the junction B from a westbound direction. Use of a green light signal with a traffic movement as described by FIGS. 6A-6B may allow the vehicle R1 to proceed through the junction B without delay.

In another example, a vehicle R2 is approaching the junction B from an eastbound direction. Use of the green light signal with a traffic movement as described by FIGS. 6B-6C may allow the vehicle R2 to proceed through the junction B by turning right without delay.

In another example, a vehicle R3 is approaching the junction B from a southern direction. Use of the green light signal with a traffic movement as described by FIG. 6A, 6C may allow the vehicle R3 to proceed through the junction B by turning right without delay.

Other variations of three-way junctions may include at least one median and/or at least one pedestrian crosswalk as described by FIGS. 5G-5H.

Figure 7A:
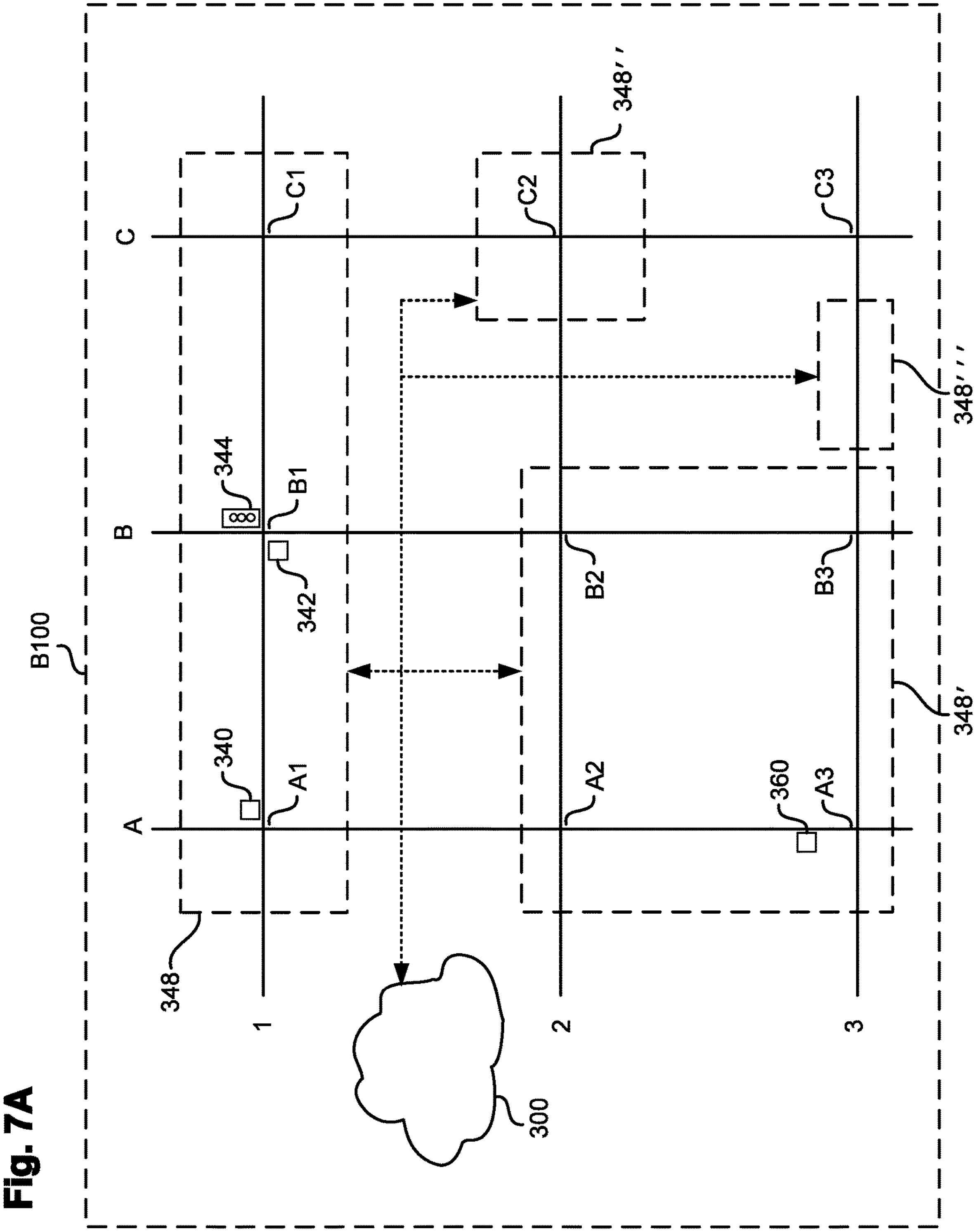
FIG. 7A illustrates an area B100 including a number of road junctions having at least one traffic signal system, according to one example.

FIG. 7A illustrates an area B100 including a number of road junctions having at least one traffic signal system, according to one example. The area B100 may include junctions, for example, junctions A1, A2, A3, B1, B2, B3, C1, C2, and C3. The area B100 may include a number of roads, junctions, and pedestrian crossings. Junctions of roads may include any number of directions, for example, three way, four way, and five way junctions, varying combinations of directions such as a two way road intersecting another two way road, a two way road intersecting a one way road, or a one way road intersecting another one way road. Further, parts of a traffic signal system (TSS) 348 or the TMS 101 such as a TCD controller 340, a CMU 342, a detection device 360, and/or a TCD 340 may be positioned at various locations of the area B100.

Each road lane in each direction of a junction (e.g. lanes L1 and L2 in each direction shown in FIG. 5A) may vary to include combinations such as left and right turns, right turn only, left turn only, or no turns. Combinations of permissible directions of travel through a junction may also vary for each lane within a traffic signal cycle. For example, during a phase of a traffic signal cycle, forward and right turn directions may be allowable while a left turn direction for an oncoming lane is not permitted. During another phase, forward directions for opposite directions of travel through a junction are the only permissible directions. Junctions may offer maximum flexibility in the number and combinations of directions of travel that may be simultaneously allowed to provide maximum traffic throughput. Other types of junctions may include metered and non-metered merge lanes or on ramps, and U-turn lanes.

Directional limitations of each lane of each road may also vary based on conditions, for example, by a time of day, a day of the week, for a special event, a traffic volume, or certain other conditions. Each section of road may have a speed limit. The speed limit may be fixed or dynamic, varying with variables that may include a time of day, a vehicle type traveling on the section of road, real-time traffic volume, and other criteria.

The TMS 101 may include a number of controlled signalized junctions equipped with a number of TCDs 344 in communication with one or more traffic signal systems 348. The traffic signal system 348 may be configured to monitor and/or control or effect operation of the TCDs 344 at each junction so equipped. The TMS 101 may further include a number of sensors, for example, a detection device 360, for detecting presence, movement, or status, for example, of vehicles, cyclists, and pedestrians, operating conditions, ambient conditions, and conditions that may be relevant to operation of the TMS 101.

A traffic signal system 348 may control one or more TCDs and signs in a zone encompassing junctions A1, B1, and C1. A traffic system 348' may control one or more TCDs located by at least one of the junctions A2, A3, B2, and B3. A traffic system 348'' may control one or more TCDs located in at least one of the junctions C2.

A traffic system 348''' may be located on or near a road and between two junctions on a segment of road to detect activity, for example, traffic activity, pedestrian or bicyclist activity, environmental conditions, or other activity. Also, the traffic system 348''' may communicate messages to on-board devices 328 on a vehicle 332, a mobile device 320, or to dynamic message signs. The traffic system 348''' may not necessarily have a traffic signal, for example, a TCD 344, but may have a detection device 360 (as illustrated by FIG. 1 and FIGS. 2A-2D), a TCD controller 340, or messaging equipment such as a dynamic message sign 355A, dynamic speed limit sign 355B, a dynamic traffic control device 355C (dynamic stop or yield sign, railroad crossing sign, a gate, a movable barrier, etc.), or a communication relay device 355D to allow communication between two or more zones or traffic systems (FIG. 7B).

Each of the traffic signal systems 348, 348', and 348'' may be identical or similar to any of the traffic systems illustrated by FIG. 1 and FIGS. 2A-2D. Each of the traffic signal systems 348, 348', 348'', and 348''' may be configured to communicate with one another. For example, communication may occur between the traffic signal system 348 and the traffic signal system 348'', between the traffic signal system 348' and the traffic signal system 348'', between the traffic signal system 348' and the traffic signal system 348, or between the traffic signal system 348 and at least one of the traffic signal systems 348', 348'', and 348'''. In effect, the zones represented by the traffic signal systems 348, 348', 348'', and 348''' may each communicate with at least one of the cloud computing environment 300, the mobile devices 320, and a second traffic signal system 348 (e.g. 348, 348', 348'', and 348''') to adapt operation of traffic control devices and communicate traffic related information between various connected systems and devices (e.g. as illustrated by FIG. 1 and FIGS. 2A-2D).

Figure 7B:
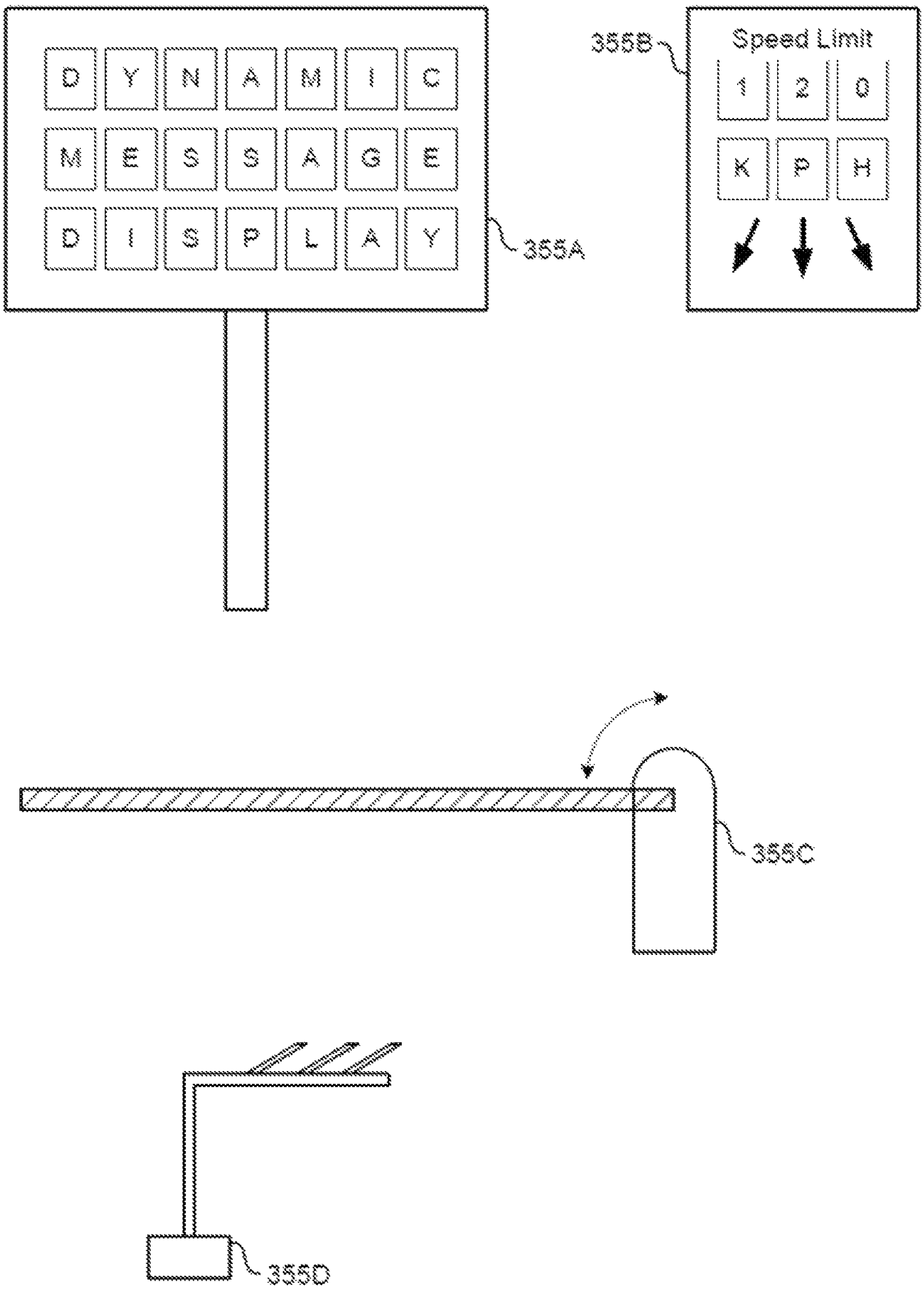
FIG. 7B illustrates examples of other equipment which may be controlled by a TCD controller in some embodiments.

FIG. 7B illustrates exemplary devices such as the dynamic message sign 355A, the dynamic speed limit sign 355B, the dynamic traffic control device 355C (in this case a gate), and the communication relay device 355D. Any of these may be configured as part of a traffic signal system 348 with or without a TCD 344, and located in a zone such as those described by FIG. 7A.

The dynamic message sign 355A may be a roadside device used to provide observers (drivers, passengers, bicyclists, pedestrians, etc.) with messages that may be changed after a period of time. Messages displayed may be in text or graphical form, and may be in monochromatic or multiple colors. The dynamic speed limit sign 355B may be a roadside device used to display a value of a speed limit for a road segment. The value of the speed limit may be adjusted based on time or location, for example the speed limit for the road segment or for a lane of the speed limit. In one case, a first lane of a road segment may have a different value for the speed limit for that of a second lane. The dynamic speed limit sign 355B may have one or more fixed or dynamic arrows or other indicators to indicate a lane the speed limit applies to, such as the lane directly below the sign 355B and/or an adjacent lane. Further, signs 355B may be able to display more than one speed limit value, either simultaneously for different lanes or by rotation of the speed limit values and indicators for the corresponding lane or lanes.

The dynamic traffic control device 355C may be a gate for controlling traffic. The device 355C may vary between a raised position and a lowered position to prevent or allow traffic to proceed past a location of the device 355C.

The communication relay device 355D may be a wired or wireless receiver and transmitter or relay device for allowing communication between at least one other communication device and or system. For example, a first communication relay device 355D located at a first signalized junction A may be in communication with a second 355D located at a second signalized junction B to allow communication of detection and/or SPaT information between at least the two signalized junctions A and B. Other examples may include communication such as communication between junctions A1, B1 with at least a third signalized junction C1, as shown in FIG. 7A.

Further, communication that may occur between traffic signal systems may occur through connections between various components or subsystems of separate traffic signal systems, such as between at least one of a TCD controller, and a detection device of a first traffic signal system and at least one of a TCD controller and a detection device of a second traffic signal system.

In another example, one traffic signal system 348 may control one, some, or all of the traffic signals, dynamic messaging signs, and associated traffic management and communication systems located within the area B100.

Figure 8A:
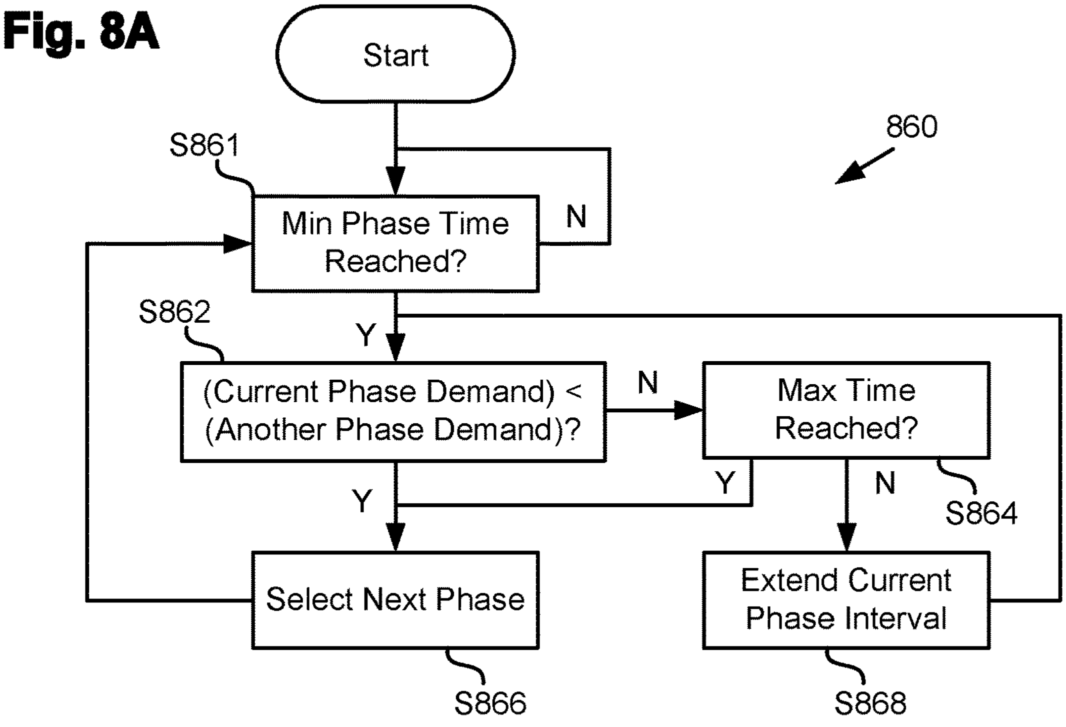
Figure 8A:
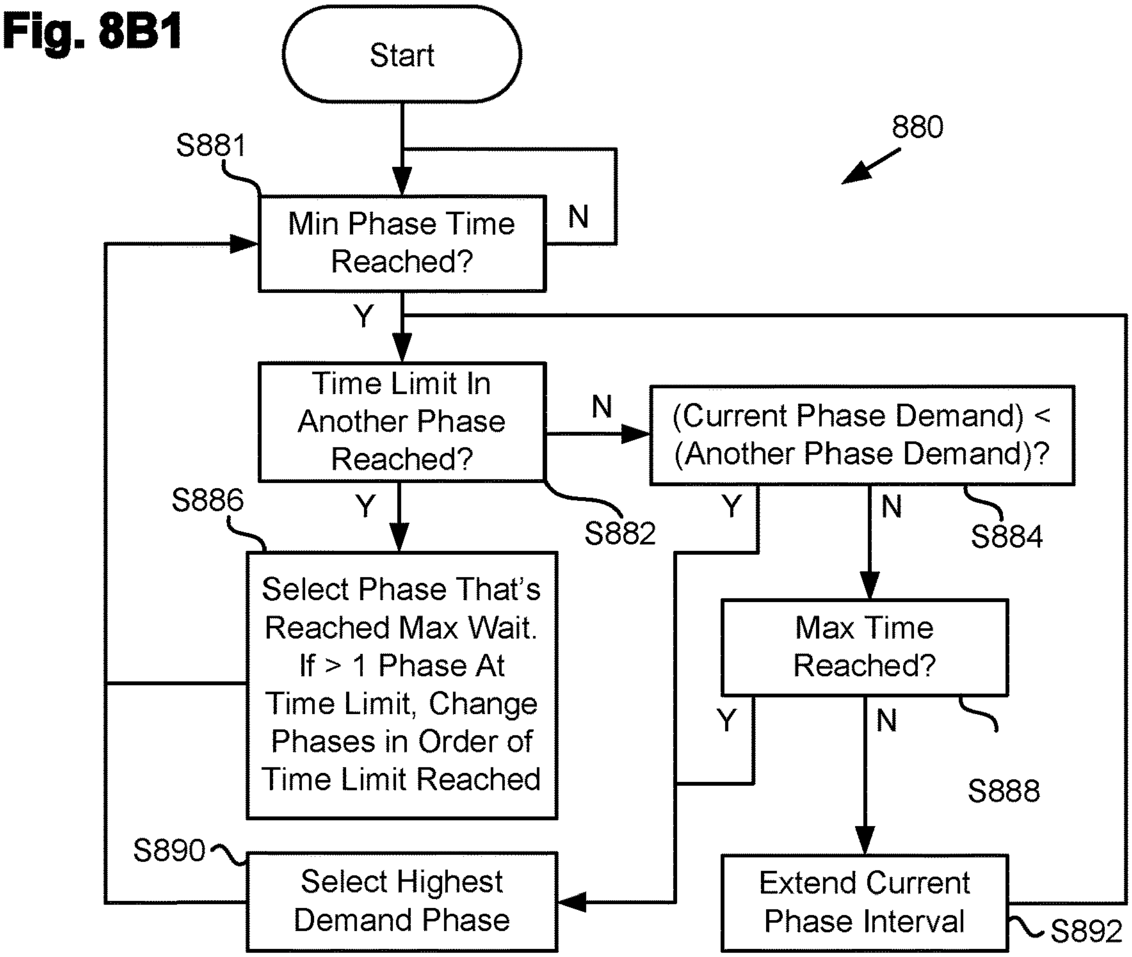

FIGS. 8A-8B are flowcharts of exemplary traffic signal control processes, also called timing plans. Exemplary timing plans may include pre-timed, semi-actuated, actuated (or free mode), hold, and actuated coordinated plans. Timing plans selected may be chosen based on a present or upcoming system or signal operating mode of the TMS 101, the TCD controller 340 able to shift between various timing plans as needed.

In a pre-timed plan the TCD controller 340 may rotate through a fixed set of phases or traffic movements of the junctions (e.g. FIGS. 5A-5H, 6A-6C, 7A, and 8C1-8C2) in a set order. Each phase may have a set time duration. Once the TCD controller 340 has rotated through each of the phases of the set, the TCD controller 340 repeats the process again in the same order beginning with the first phase of the set.

In a semi-actuated plan the TCD controller 340 may rotate through a fixed set of phases or traffic movements of the junction A in a set order. Each phase may have a variable time duration. Thus if traffic demand is detected in a particular direction of the junction A, a time duration of a present phase may be changed—either by increasing or decreasing the time duration, in order to serve the particular direction needed. A next phase may also be skipped if the time duration is allowed to be zero. Once the TCD controller 340 has rotated through each of the phases of the set, the TCD controller 340 may repeat the process again in a same order beginning with the first phase of the set.

In an actuated plan the TCD controller 340 may use one or more algorithms (such as described by FIG. 8B1) to determine when to change phase, which phase to change to, and the duration of each movement within the phase. Phases may be selected independently or from a set of phases, and need not be dependent upon any particular sequence of phases, and time durations may be varied.

In a hold plan the TCD controller 340 may control some or all TCDs 344 of the junction A to provide a red light or stop signal for a fixed time period or until a condition is met. Some uses of the hold plan may be to stop other traffic (such as to allow emergency vehicles passage through the junction A without a green signal for traffic from conflicting directions), to temporarily close one or more directions of the junction A, to provide a detour, and/or to provide part of a flashroute (explained further in this document). During a clearance phase, the TCD controller 340 may stop movement in all directions of a junction. This may be used to help prevent collisions during phase changes to account for a vehicle that may not stop on a red light in time.

In an actuated coordinated plan, operation of the TCD controller 340 may be at least partly dependent upon operation of a second TCD controller 340' of a second junction B, such that phases of the junction A and the junction B are actively coordinated to respond to traffic demand. For example, as a number of vehicles are expected or detected to pass through the junction B in a direction toward the junction A, the TCD controller 340 may adjust a present or upcoming phase of the junction A based, at least in part, on the phase or timing sequence and time duration of the second controller 340' of the junction B, and/or a detected flow of traffic from the junction B, as described by FIGS. 8C1 and 8C2.

Variables in each phase or movement may include which traffic movements are included, a minimum green duration for each movement (if applicable), a maximum green duration for each movement (if applicable), a yellow (or amber) duration as a movement changes from green to yellow to red, a clearance time when all TCDs 344 may be red between phases, and at least one time increment such as for shortening or extending a green duration.

Other minimum and maximum limits may also be applied within processes such as those of FIG. 8A-8B to ensure minimum and maximum green time durations are met or to trigger certain actions.

FIG. 8A is a diagram of an exemplary semi-actuated traffic signal timing process 860 (semi-actuated process 860) that may be applied to the junction A by the TMS 101.

Through a sub-process S861 the semi-actuated process 860 determines if a minimum phase time (if applicable), for example, a minimum green phase time, and has been reached for a first (or present) phase of the junction A. If not, the sub-process S861 repeats. If so, the semi-actuated process 860 proceeds to a sub-process S862 that compares at least one traffic demand of the first phase of the junction A with at least one traffic demand of at least one other phase of the junction A, such as that of a next phase, and the comparison may occur for at least one upcoming time period. The next phase is not necessarily predetermined by a fixed order or sequence of operations if the TMS 101 is operating adaptively to real-time conditions.

If the traffic demand of at least one of the next phases of the junction A is sufficiently greater than the traffic demand of the first phase, then the semi-actuated process 860 may proceed to a sub-process S864 that determines if a maximum time has been reached, for example, the maximum phase time for the first phase of the junction A.

If so, then the semi-actuated process 860 proceeds to a sub-process S866 that selects the next phase for the junction A, and then returns to the sub-process S860. If not then the semi-actuated process 860 proceeds to a sub-process S868 that extends the present phase by a time increment, which may be either a predetermined, fixed interval such as a calculated duration within a range such as about 3, 5, or 10 seconds, or a calculated duration within a range such as about 5 or 10 seconds, that allows the most amount of known or expected traffic to pass through the junction A in such a time interval. Then the semi-actuated process 860 returns to sub-process S862.

In one case of sub-process S862, the traffic demand of the next phase must exceed the traffic demand of the first phase by more than a delta amount to select the next phase (unless another limit is reached such as a maximum green time). In another case of sub-process S862, the anticipated traffic demand of the next phase must exceed the traffic demand of the first phase over the course of one or more upcoming time periods.

FIG. 8B1 is a diagram of an exemplary actuated traffic signal timing process 880 (actuated process 880) that may be applied to the junction A by the TMS 101.

Through a sub-process S881 the semi-actuated process 880 calculates if a minimum time is applicable, for example, a minimum green phase time, and has been reached for a first (or present) phase of the junction A. If not, the sub-process S881 repeats. If so, the actuated process 880 proceeds to a sub-process S882. If no minimum time is specified, the process 880 begins at sub-process S882 and all sub-processes that loop to sub-process S881 would loop to sub-process S882 instead.

The sub-process S882 calculates if a time limit, for example, a maximum red time or a maximum wait time, has been reached in another phase of the junction. A maximum wait time may be set for each movement and/or phase such that if the maximum wait time is reached, the actuated process 880 proceeds to sub-process S886. If a maximum wait time has not been reached in another phase of the junction A then the actuated process 880 proceeds to sub-process S884.

Sub-process S886 selects a phase that has reached a maximum wait time, changes from a green light signal in the present phase direction to the movement and/or phase that has reached the maximum wait time. If more than one phase has reached a maximum wait time, then the sub-process S886 changes the present green light signal movement and/or phase to one that has reached the maximum wait time, as described above, in an order the maximum wait times were reached. The actuated process 880 then proceeds to sub-process S881.

The sub-process S884 compares a traffic demand of at least one time period of the first phase of the junction A with a traffic demand of at least one time period of at least one other phase of the junction A. If the traffic demand of the first phase is sufficiently less than the traffic demand of another phase (e.g. such as with potential comparisons described above in FIG. 8A) during the one or more time periods compared, the process 880 proceeds to a sub-process S890. If the traffic demand of the first phase is not less than the traffic demand of another phase, the process S880 proceeds to a sub-process S888.

The sub-process S888 calculates if a maximum time, for example, a maximum green time, has been reached for the first phase. If not, then the actuated process 880 proceeds to a sub-process S892 that extends the present phase by either a predetermined or variable time increment, and then returns to the sub-process S882. If yes, then the actuated process 880 proceeds to the sub-process S890. The sub-process S890 selects a higher demand phase, and then the actuated process 880 returns to the sub-process S881.

In each timing process described herein, traffic demand described and considered or compared by sub-processes S862 and S882 of processes 860 and 880, respectively, may span one or more time periods.

FIG. 8B2 is a diagram indicating magnitudes of traffic demand approaching the junction A from each direction, according to one example. The traffic demand approaching each direction may be divided into time periods based on present or estimated times of arrival (ETAs) at the junction, such as by a time period $t_1$, $t_2$, $t_3$, $t_4$, and $t_5$. Traffic demand may be considered in aggregate for all non-conflicting movements through a junction during a time period. A simple example of this is a case no turns are allowed at the junction A. Traffic demand for the junction A may then be considered for one set of movements having two phases: A first phase being traffic movement in eastbound and westbound directions, and a second phase being traffic movement in northbound and southbound directions.

A traffic demand of the first phase of the junction A during a first time period $t_1$ may be compared with a traffic demand of the second phase of the junction A during the first time period $t_1$. Then a traffic demand of the first phase of the junction A during a second time period $t_2$ after the first time period $t_1$ may be compared with a traffic demand of the second phase of the junction A during the second time period $t_2$.

In a case where the traffic demand of the first phase is greater than the traffic demand of the second phase during the first time period $t_1$, and the traffic demand of the first phase is greater than the traffic of the second phase during the second time period $t_2$ then the first phase may offer higher traffic throughput for at least one of the first and second time periods $t_1$, $t_2$ by extending a duration of the first traffic phase beyond a present time period $t_1$.

Alternatively, if the traffic demand of the first phase is greater than the traffic demand of the second phase during the second time period $t_2$ by an amount at least equal to or larger than during the first time period $t_1$, then the relative difference in traffic demand between the first and second phases is trending upward, and the first phase may offer higher traffic throughput for at least one of the first and second time periods $t_1$, $t_2$ by extending a duration of the first traffic phase beyond a present time period $t_1$, reducing a number of traffic changes in traffic phases. This process may be repeated for comparing the traffic demand of the first and second phases from the first time period out to n time periods. The first phase may be a present phase displaying a green light signal and the second time period $t_2$ may or may not be a time period that immediately follows the first time period $t_1$. Alternatively, the first time period $t_1$ may be a previous time period and the second time period $t_2$ may be a present or upcoming time period. A purpose of comparing multiple time periods is to detect demand trends in order to minimize switching between phases, which can be disruptive to traffic flows.

In another case, the traffic demand of the first phase is less than the traffic demand of the second phase during the first time period $t_1$, and traffic demand of the first phase is less than the traffic demand of the second phase during the second time period $t_2$, then the second phase may offer higher traffic throughput for at least one of the first and second time periods $t_1$, $t_2$. However, if the first phase is the present phase displaying a green light signal, the disruption to change phases, which may include a change time and a clearance time, may not result in an overall increase in traffic throughput at the junction A for the first and second time periods $t_1$, $t_2$. Thus, the change and the clearance times may be considered in comparing the estimated traffic demand that may be met from each direction approaching the junction A.

In this section traffic demand is defined as a count or numerical quantity of vehicles. That is, traffic demand is considered in terms of a number of vehicles approaching each direction of the junction A during each time period. Later examples may also include measures on a basis other than or in addition to these. In various examples, demand may be considered on the basis of energy consumption or vehicle emissions, levels of priority of junctions (junction weightings), junction directions, vehicles or passengers, distance and/or time from a junction, and/or adherence to a travel route, an itinerary, or a time schedule. These exemplary criteria may be considered part of a weighting of each known junction or identifiable vehicle, passenger, or pedestrian and may be considered in traffic demand calculations, as described by FIGS. 16, 17, and 19.

Table 1 contains a timing plan in tabular form, the timing plan having a series of present and upcoming phases and time durations for the junction A, according to one example. The timing plan may be periodically generated within the TMS 101 in response to detected and historical traffic demands, on the order of every few seconds, for example from zero to about 60 seconds.

Each entry of the timing plan may be assigned a SPaT identifier (#), a time of day when the phase and time duration is to begin, a time duration, and a phase to be provided by the TCD controller 340 of the junction A. A time display format may include hh:mm:ss or even smaller increments such as in a hh:mm:ss. xxx format where. xxx represents thousandths of a second.

In the example table, a first SPaT entry of the TCD controller 340 begins at 12:00:00, has a duration of 45 seconds, and provides phase C to the junction A. This is followed by a second, a third, and a fourth SPaT entry that extend the phase C for time increments of five seconds each from 12:00:45 through to 12:01:00. These are followed by a fifth SPaT entry (shown as #2) that begins at 12:01:00 and provides phase D for a duration of 15 seconds, and so forth through to a SPaT entry (shown as #5) that begins at 12:03:00 and provides phase C for a duration of one minute.

TABLE 1

Exemplary SPaT Table for the Junction A

| # | Time | Duration | Phase |
|---|---|---|---|
| 1 | 12:00:00 | 00:45 | C |
| 1A | 12:00:45 | 00:05 | Extension |
| 1B | 12:00:50 | 00:05 | Extension |
| 1C | 12:00:55 | 00:05 | Extension |
| 2 | 12:01:00 | 00:15 | D |
| 3 | 12:01:15 | 00:35 | F |
| 4 | 12:01:50 | 01:10 | A |
| 5 | 12:03:00 | 01:00 | C |

A phase and time of the timing plan may be revised even if it is presently in use by the TCD controller 340, and displaying a green light signal, by changing a time duration, either by decreasing or increasing the phase duration by an increment of time. Changes to the time duration of a phase may not result in a time duration of less than zero (and may not be less than a minimum time if the applicable minimum time is more than zero), and may not exceed a maximum green time for the junction A unless in particular signal operating modes, such as in an emergency or fault-detected mode. Extensions or reductions in the present phase and time of the timing plan may be noted, for example, by adding an entry to the table with an identical entry number and appending a subsequent code (e.g. A, B, C, and so forth) to the entry number, and specifying a time and duration for the same phase, as shown in Table 1.

Depending on a signaling mode of operation in use (e.g. pre-timed, semi-actuated, actuated, etc.), selection of a phase and time duration for a specific segment of time, such as a phase after the present phase and time duration, may be based on the traffic demand in each direction of the junction A.

The signaling mode of operation may allow the TCD controller 340 to rotate through phases in a fixed order of rotation, such as in the pre-timed mode, may follow a fixed order of phase rotation but skip some phases, for example where the time duration of a phase may be zero (t=0) in a semi-actuated mode, or to select any phase from a set or subset of possible phases (actuated mode).

Timing plans may be coordinated in conjunction with one or more junctions. A signal timing plan of a second junction may be adjusted to coordinate traffic flow arriving from or heading to the first junction based on an estimated time of arrival (ETA) of at least one vehicle R1. The ETA may be dependent upon at least one of a present or upcoming speed limit of a road segment located between the first and the second junctions, a current speed of one or more vehicles detected traveling in at least one direction of the road segment located between the first and the second junction, and a past speed of one or more vehicles traveling in at least one direction of the said road segment. For example, the TMS 101 may adjust the amount of green signal time in a direction to allow the vehicle R1 to proceed through the second junction in a direction of the first junction such that the vehicle R1 may then have an ETA at the first junction during a time period the TMS 101 provides a green signal at the first junction in a direction the vehicle R1 may be traveling.

Traffic exiting a first junction and heading toward a second junction may be at least part of traffic demand of the second junction from the direction of the first junction. Signal timing and signal timing plan of the first and second junctions may each be adjusted based on the exit flow of at least one other junction.

In one case, the exit flows of the at least one other junction may enter on the same road segment. In another case, the traffic demand entering a junction may be from more than one inbound road segment (e.g. a series of them) or other directions intersecting with inbound road segments that may or may not be signalized. Further, a probability may be estimated for each of those inbound directions to account for mid-block junctions, turns, and other reasons why a vehicle, bicyclist, or pedestrian may not arrive at a junction during the present or an upcoming time period. The closer a vehicle or traveler gets to a junction, the higher the probability may be that the vehicle or traveler approaches and enters the junction.

FIG. 8C1 is a diagram of a road segment 3002 connecting a signalized junction A located at an eastern end and a signalized junction B located at a western end of the road segment 3002, respectively, according to one example. In this example, the road segment 3002 has two lanes for westbound traffic from the junction A to the junction B, and two lanes for eastbound traffic from the junction B to the junction A. In other examples, the road segment 3002 may have zero, one or more lanes for westbound traffic from the junction A to the junction B and may have zero, one or more lanes for eastbound traffic from the junction B to the junction A.

The road segment 3002 has amid-block junction MB1 located between the junction A and the junction B leading to another road segment 3003. Traffic is able to turn from at least one direction of the road segment 3002 onto road segment 3003, and traffic is able to turn from at least one direction of the road segment 3003 onto the road segment 3002. The road segment 3002 has a length Dtotal formed from two segments D1 and D2. Segment D1 represents an approximate distance from the junction B to the mid-block junction MB1, and segment D2 represents an approximate distance from the junction A to the mid-block junction MB1.

An approach BA1 is located on the road segment 3002 between the junction B and the mid-block junction MB1 for eastbound traffic. An approach BA2 is located on the road segment 3002 between the mid-block junction MB1 and the junction A for eastbound traffic. An approach AB1 is located on the road segment 3002 between the junction A and the mid-block junction MIB1 for westbound traffic. An approach AB2 is located on road segment 3002 between the mid-block junction MB1 and the junction B for westbound traffic. An approach MB1A and an approach MB1B are located on the road segment 3003 and connected to the mid-block junction MB1. The approach MB1A may be for southbound traffic turning onto the road segment 3002, and the approach MB1B may be for northbound traffic turning off of the road segment 3002.

Each direction of travel between the junction A and the junction B has at least one approach leading to the signalized junction A or the signalized junction B. Each approach may include at least one lane. A first approach having one lane and approximately parallel to a second approach for traffic traveling in a same direction may have a different turning probability than that of the second approach. For example, where traffic may turn right at a junction, an approach located in a left travel lane would likely not have a turning probability equal to that of an adjacent approach located in a right travel lane, since a vehicle is less likely to make a right turn from a left lane than from a right lane.

Traffic demand may be determined on a time basis and/or a distance basis that includes detected and/or estimated traffic demand from at least one road segment. Time basis traffic demand may be a measure of traffic that may arrive or be located at or within a particular location or area within one or more time periods, for example, within the next 5 to 20 seconds. In another example, the time period may be 20 to 60 seconds. In another example the time period may be one to thirty minutes, or some combination of time increments from zero up to ten minutes.

Distance-Basis Traffic Demand May be a Measure of Traffic that is within an Area or within a Distance of a Particular Location.

In one example, traffic demand may be determined on the basis of a number of vehicle movements in each direction toward a junction. In another example, traffic demand is a number of vehicles, bicyclists, or pedestrians on the basis of quantity. In another example, traffic demand is a sum and/or product of a weighted quantity of detected, known, or estimated vehicles, bicyclists, and/or pedestrians, and may have a count value different from a numerical value of one, such as between zero and one for lower priority and greater than one for higher priority.

In the examples of traffic depicted in FIGS. 8C1 and 8C2, a vehicle R1 is known to be traveling west on the road segment 3002 from the junction A toward the junction B. If there were no turns between the junction A and the junction B, the vehicle R1 could have an expected value (EV) representing a probability X1 that the vehicle R1 will arrive in the approach AB2 of the junction B within a time period $t_1$. On a time-basis (i.e. during the time period $t_1$), the traffic demand for the junction B arriving from the junction A may be expressed in terms of EV as EV=(X1)(Weighting R1) where Weighting R1 is a weighting of the vehicle R1, and may be equal to one on a numerical basis for traffic demand (i.e. vehicle R1 counts as one vehicle). Vehicle R1 may have a value greater than or less than one if a weighted basis for traffic demand is used instead of a purely numerical basis, such as for high and low priority weightings. Generally, a Weighting R may also be equated to the Vehicle Score Stack VSS (see description of FIG. 16A, discussed below), and may vary dynamically. Further, the Weighting R may be conditional. For example, if an emergency vehicle begins operating in an emergency mode the Weighting R of the emergency vehicle may be increased some amount, such as to a maximum value, while the Weighting R of other vehicles within a certain range (time, distance, etc.) of the emergency vehicle may be adjusted in response as well.

In another case, turns may be allowed between a mid-block turn MB1 that may be located between the junctions A and B. The vehicle R1 may then have a probability X2 of arriving at the junction B that is less than the probability X1 of the previous case because the vehicle R1 may also have a probability Y1 of turning at the mid-block turn MB1 instead of continuing toward the junction B. EV of the vehicle R1 arriving in the approach AB2 of the junction B may then be expressed as (X2)(Weighting R1). The sum of X2+Y1 may be equal to up to about one (100%).

A traffic demand approaching the junction B from the direction of the junction A may be represented by a sum of the EV of all known, estimated, or detected vehicles traveling toward the junction B within the time period $t_1$. The closer in time and/or distance, and the fewer possible turns or potential reasons to stop the vehicle R1 as it approaches the junction B (and the greater the confidence the vehicle R1 will arrive at the junction B within the time period $t_1$) the higher the EV will be for the junction B from the direction of the junction A due to the vehicle R1. Further, a weighted priority, if applicable, of the vehicle R1 may also affect the EV.

Historical data may indicate how likely it is that a vehicle may turn at a particular junction in general. For example, in general ten percent of overall vehicle traffic driving from the junction A toward the junction B may turn right at the mid-block turn MB1. Further, a probability may vary in general for each junction based upon time of day (TOD) and/or day of the week (DOW), special event, or other conditions. More granularity may be obtained for specific vehicles. A range of exemplary conditions may be indicated by drivers, users, or vehicles ahead of time that may affect the probability Y1. In one case, if the mid-block turn MB1 leads to a location the vehicle R1 (or a driver or passenger of the vehicle R1) frequently or routinely drives to, then the probability Y1 may be higher than average. In another case, if the mid-block turn MIB1 is for a gas station and the vehicle R1 is estimated or known to have a low level of fuel aboard, the probability Y1 may increase that the vehicle R1 will turn into MB1. In another case, if heavy trucks are not permitted to turn into the mid-block turn MIB1 and the vehicle R1 is a heavy truck, the probability Y1 the vehicle R1 will turn at mid-block turn MB1 may be lower than average. In another case, use of a turn signal by the vehicle R1 known to the TMS 101, for example, by video detection of a flashing turn signal on an exterior surface of the vehicle R1 or by a databus broadcast or download to at least one of the TMS 101 and a mobile device 320 that then transmits the information to the TMS 101, while on a road segment, approach or within a range of a location, may affect the probability Y1 the vehicle R1 will turn at mid-block turn MB1.

In a case the vehicle R1 is detected to be in the approach AB1, a probability X1 may be assigned or estimated by the TMS 101 that the vehicle R1 will proceed from the approach AB1 to the approach AB2. Further, a probability Y1 that the vehicle R1 will instead proceed to turn onto the approach MB1B may also be assigned, derived or estimated, as well as a probability U1 that the vehicle R1 may perform a U-turn from the approach AB1 to then continue in an opposite direction on the approach BA2. As such a sum of X1+Y1+U1 may be equal to up to 1 (100%).

In a case the road segment 3002 has multiple mid-block junctions (FIG. 8C2) between the signalized junctions A and B, an overall probability that the vehicle R1 proceeds from the junction A to the junction B may be estimated by the compound probabilities of the vehicle R1 proceeding toward the junction B from each of the approaches leading from the junction A to the junction B. The same may also be true for a road segment or set of road segments having one or more junctions, signalized or not, between a first junction and a second junction, and where a vehicle's route is not known.

In a case a vehicle R2 located in the approach MB1A is about to enter the road segment 3002 from the road segment 3003, a probability Z1 the vehicle R2 will enter the approach AB2 and a probability W1 the vehicle R2 will enter the approach BA2 may be estimated. Whichever approach the vehicle R2 enters may have a corresponding increase in traffic demand, and/or a time interval tn may have an increase in demand.

In one example, each probability for each approach may be estimated or determined on the basis of historical data for that particular approach at a particular TOD for a particular DOW for traffic in general. In another example, each probability may be determined for the specific vehicle R based on data from past trips of the vehicle R. In another example, each probability may be determined for the specific vehicle R based on data from past trips of vehicles of a type or class of the vehicle R. In another example, each probability may be determined for the specific vehicle R based on a combination of at least one of historical data for each particular approach of the road segment, data from past trips of the vehicle R, a present road, traffic, or weather condition, and data from past trips of vehicles of a type or class similar to that of the vehicle R.

Further, various time segments may each represent a time interval for a vehicle traveling at a speed (e.g. a speed limit, an average speed, etc.) in a direction between the junction A and the junction B.

In one example, for a time interval tn of 5 seconds on a road segment having a speed limit of 40 mph (about 59 ft/s), a distance covered by the time interval tn may be estimated to be about 295 feet. The time interval tn may be fixed or dynamic and may be used to determine on a time basis when detected or known vehicles are expected to arrive at a junction or other location, such as a point, an approach, or an area on a road segment.

This allows for estimation of a number of vehicles approaching a junction by direction and/or by time intervals. Further, in addition to having estimated vehicle counts, weightings and/or probabilities may also be applied to estimate a measure of traffic demand for a direction of a junction or road segment during a time span of at least one time interval.

The traffic demand of each direction approaching a junction may be compared to then select a traffic signal phase or cycle that may provide an optimal routing for a system operating mode of the TMS 101. For example, in a case a TMS 101 system operating mode is to maximize throughput for a junction then the TMS 101 may provide a green traffic signal in a combination of non-conflicting movements that have the most total or combined traffic demand and continue to extend green traffic signal phase time in at least one direction until some limit may be reached, ignoring other traffic that may be waiting at a red traffic signal during this time in a second, conflicting direction. While this may maximize an amount of traffic through the junction, it may cause delay for other traffic. In another case, a TMS 101 system operating mode may be to minimize wait times, and the TMS 101 may operate a traffic signal at a junction to limit extending green traffic signal phase times such that only a portion of maximum green time is reached in any phase. This may result in shorter maximum wait times but reduce the amount of traffic through the junction. Descriptions for FIGS. 8E and 8F further explain.

FIG. 8C2 is a variation of that shown in FIG. 8C1, according to one example. An additional mid-block turn MB2 is located between the mid-block turn MB1 and the junction B. An approach AB3 and BA3 may be added to the westbound and east bound directions, respectively, between the junctions A and B. Further, similar to the probability Y1 described above, once the vehicle R1 is in the approach AB2, a probability Y2 may indicate a probability the vehicle R1 may turn at the mid-block turn MB2 and a probability X2 that the vehicle R1 will proceed toward the junction B. If there are multiple junctions located between the vehicle R1 and the junction B, the EV may be a product of the various probabilities of the vehicle R1 turning prior to arrival at the junction B within the time period $t_1$. In one case, the vehicle R1 is located between the mid-block turn MB1 and the mid-block turn MB2, and traveling in a direction of the junction B. The sum of the probability Y2 and the probability X2 may be equal to about one, and the EV that the vehicle R1 may arrive at the junction B may be at least partly a function of the probabilities, such as EV=(X2)(Weighting R1) or (1−Y2)(Weighting R1).

In another case, the vehicle R1 is located between the junction A and the mid-block turn MB1, and traveling in a direction of the junction B. The sum of the probabilities Y1+Y2+X1+X2 may be equal to up to about one, and the EV that the vehicle R1 may arrive at an approach AB3 of the junction B may be at least partly a function of the probability X1 and X2, such as EV=(X1)(X2)(weighting R1). The sum of probabilities the vehicle R1 will arrive at the approach AB3 to the junction B varies with a present location of the vehicle R1. For example, if the vehicle R1 is in the approach AB1, the sum of the probabilities X1+Y1 may be equal to up to one. If the vehicle R1 is in the approach AB2, the sum of the probabilities X2+Y2 may be equal to up to one.

In a case a destination of the vehicle R1 is known by the TMS 101 but a specific route is not known by the TMS 101, an EV of the vehicle R1 relative to each junction on the route may be estimated or determined with a higher degree of confidence than in a case the destination is not known since there are a set of routes from which the vehicle R1 will likely take to arrive at the destination, which may result in higher EV. The TMS 101 may also offer guidance or recommendations to influence a driver's likelihood of taking a particular route.

In a case a route of the vehicle R1 is known by the TMS 101, for example, through a navigation system or algorithm, a location of each signalized junction on the route may be known, and an ETA at each of the locations of at least one of the signalized junctions may be estimated based on at least one of the vehicle R1 location and movement, other known or detected traffic, and a present condition of a road network such as traffic volume, roadwork, weather, special event, or accident status. An EV of the vehicle R1 relative to each junction on the route may thus be determined by the TMS 101 with a higher degree of confidence than in a case the route of the vehicle R1 is not known since, in effect, the vehicle R1 has initially declared its route and then periodically or continually demonstrates it is following the route (or not).

Some vehicles or vehicle types may be operated on fixed routes or probable routes such as for a transit bus or a parcel delivery truck. These routes, when not fixed, may be selected from a set of known or likely routes. Use of such routes may simplify probability calculations and increase confidence intervals in route and timing predictions for some vehicles.

In any case, additional time periods may be added to calculations of when to change a traffic signal phase of a signalized junction to account for needed time to clear queues of traffic located on a road segment with or adjacent to a direction of travel of the vehicle R1, or for other delays such as active railroad, bicyclist, and pedestrian movements, in advance of arrival of the vehicle R1 such that the vehicle R1 does not have to slow (or slow as much) or stop for the junction.

Traffic demand of a vehicle R located on the approach BA1 on the road segment 3002 headed from the junction B to the junction A may be expressed as an EV relative to the junction A.

The sum of EV for all known or detected vehicles traveling in a direction on a road segment for a time interval may be expressed as:

$$\sum \text{Vehicle } EV = EV_1 + EV_2 + \ldots + EV_n$$

The closer a vehicle is to a junction, in either time or distance, the larger an EV of the vehicle tends to be since the vehicle is increasingly likely to arrive at the junction. Traffic demand on the road segment for time periods $t_1$ to tn from a data Source1 may be expressed as:

$$\text{Source1} = (\Sigma\text{Vehicle EV for } t_1) + (\Sigma\text{Vehicle EV for } t_2) + \ldots + (\Sigma\text{Vehicle EV for } tn)$$

Further, total traffic demand from multiple data sources for a direction of a junction may be expressed as:

$$\text{Total Traffic Demand} = (JW)[(W_1)\text{Source}_1 + (W_2)\text{Source}_2 + \ldots + (W_n)\text{Source}_n]$$

where W1 is a weighting for the total traffic demand of a corresponding first Source1, W2 is a weighting for the total traffic demand of a second source Source2, and so forth. JW is a Junction Weighting for a direction of the junction and may serve as an indicator of relative importance of the direction during one or more time periods. Adjustment of JW may allow for coordination with adjacent signalized junctions. In a case a source of traffic may be effectively counted more than once, such as in a case a known vehicle is detected on a road segment and also known to be in communication with the TMS 101 via a smart phone app, at least one data source may be adjusted to reduce a vehicle count for the known vehicle.

Determining directional traffic demand of the junction, such as by use of the preceding equations and calculations, may correspond to a process S3020 (FIG. 22) and allows the TMS 101 away to compare traffic demand between different road segments and approaches to the junction, and then to select a signal timing plan for the junction to optimize for at least one of a system operating mode and a signal operating mode.

FIG. 8C3 is a diagram indicating magnitudes of traffic demand approaching the junction A from each direction, according to one example. While similar to that described in FIG. 8B2 in that vehicles may be counted from each direction approaching the junction A to calculate traffic demand, the traffic demand may then be weighted by time period (or distance). The closer a time period tn is to the junction, the higher the traffic demand may be compared with traffic demand of subsequent time periods. This is due to the use of EV, as described above with reference to FIGS. 8C1-8C2. Even if there are no turns along a road segment approaching the junction A, there is a probability that a vehicle will stop (due to accident, breakdown, pulling over, etc), and therefore not pass through the junction A during a next time period, is lower the closer it gets to the junction A, so the higher the probability the vehicle will pass through means the weight or EV should still rise, albeit at a lower rate, as the vehicle approaches the junction A. A sum of EV of vehicles approaching the junction A from one direction in a time period n may form the traffic demand for the junction A for that direction during the time period n.

The further away a vehicle is from the junction A, the lower its EV due to the greater the probability that the vehicle will turn off a present road and not arrive at the junction A, and the lower the probability that the vehicle will arrive at the junction A in a present time period. This is especially true in cases the vehicle route is not defined or available to the TMS 101. As the vehicle moves closer toward the junction A, the probability that the vehicle will go through the junction A increases, or the probability decreases if the vehicle is delayed and may go to zero if the vehicle takes another turn before arriving at the junction A. The EV of the vehicle with respect to the junction A then increases or decreases correspondingly with time (or distance) as the vehicle travels toward or away from the junction A.

Figure 8D:
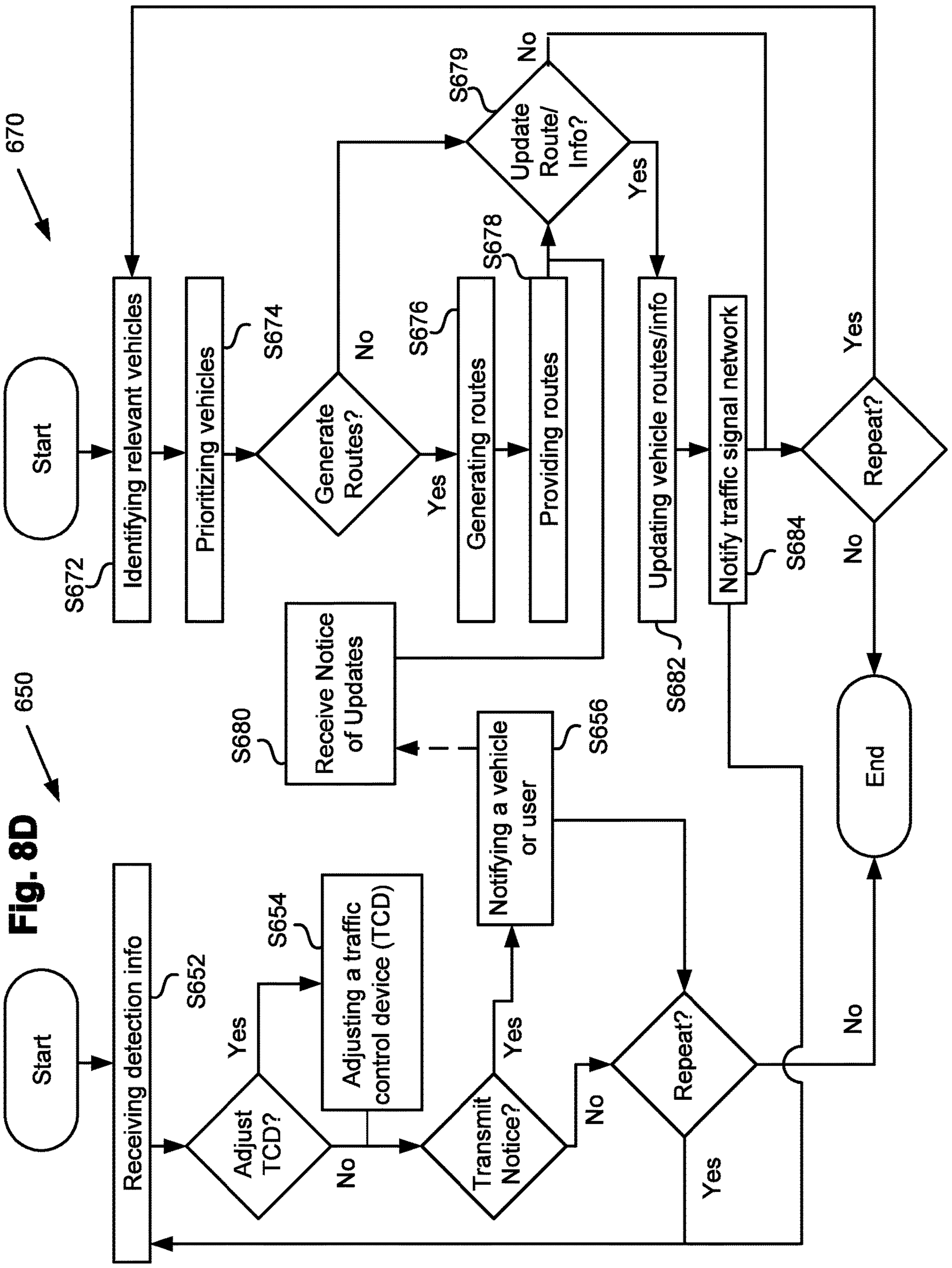
FIG. 8D is a diagram of exemplary processes of an adaptive traffic management process 650 and a navigation process 670 based on traffic and prioritization operations.

FIG. 8D is a diagram of exemplary processes of an adaptive traffic management process 650 and a navigation process 670 based on traffic and prioritization operations described elsewhere in this specification, that may be applied by the TMS 101 together, or by the TMS 101 and a separate navigation service or system configured to communicate with the TMS 101. An adaptive traffic management process 650, the process 650 providing adaptive traffic management for one or more signalized junctions, and a navigation process 670, the process 670 providing navigation guidance to one or more vehicles operating on a road or in an area. The process 650 may already be in operation when the navigation process 670 starts operating.

The adaptive traffic management process 650 adaptively manages traffic in response to traffic detection inputs received from various sources, including a navigation process 670 and various detection systems such as traffic cameras, detection loops, and vehicle counters, as well as data sources from various navigation systems or networks.

The adaptive traffic management process 650 starts by proceeding to a sub-process S652 to receive detection information from various sources, such as those stated above. The process 650 then decides whether to adjust any traffic control devices (such as traffic signals, dynamic message boards, and dynamic speed limits, etc.) in response to traffic demand approaching one or more signalized junctions in relation to an operating mode of the TMS 101, such as described by FIGS. 8A-8B1. If so then the process 650 proceeds to a sub-process S654 to adjust at least one TCD 340 or TSS 348 such as by changing a traffic signal phase or timing, changing a message displayed on a dynamic message board, and/or changing a dynamic speed limit to meet traffic demand, such as defined in the description of FIGS. 8A-8C3.

The process 650 then decides whether to transmit an update of a status of one or more TCD 340 or TSS 348, or any additional detection information that may have been received at the sub-process S652, to a navigation system. Criteria for transmission may include an update of a road segment, area, or traffic signal status or countdown relevant to a vehicle using the navigation system.

If the process 650 decides not to transmit an update then the process 650 proceeds to decide whether to repeat the process 650. If the process 650 decides to transmit an update then the process 650 proceeds to a sub-process S656 to communicate an update to the navigation process 670. Once the sub-process S656 is completed the process 650 decides whether to repeat the process 650. In general the process 650 is continuous unless there is a system fault or loss of power.

If so then the process 650 returns to begin the sub-process S652 again. If not then the process 650 ends.

The navigation process 670 starts by proceeding to a sub-process S672 to identify one or more relevant vehicles to the navigation process, such as those using the navigation process and those that may be detected by the adaptive traffic management process 650.

The process 670 then proceeds to a sub-process S674 to prioritize the vehicles identified in an area or on one or more roads by the sub-process S672. Prioritization of the identified vehicles may include sorting each vehicle by an available VSS and/or each group of vehicles by an available GSS. It may also involve calculating how a volume of detected vehicles that do not have a VSS may affect navigation of vehicles with a VSS, such as predicting traffic volumes or speeds in the area or along one or more road segments.

The process 670 then decides whether to generate a navigation route for at least one of the vehicles having a VSS or vehicle groups having a GSS. Vehicle groups having high GSS may be given higher priority than individual vehicles with VSS, which in turn have higher priority than vehicles operating without priority scores. All vehicles using the navigation system with a declared destination may each be provided with a system generated route.

If the process 670 decides not to generate a navigation route for at least one of the vehicles then the process 670 proceeds to a decision point S679. If so then the process 670 proceeds to a sub-process S676 to generate the navigation route for at least one of the vehicles or vehicle groups using a known process, such as provided by a third-party, that further accounts for adaptive traffic signaling and control information provided by the process 650. Then the process 670 proceeds to a sub-process S678 to provide the navigation route to at least one of the vehicles or vehicle groups, such as by transmitting route information to a system or device aboard the vehicle or vehicle groups. The process 670 then proceeds to the decision point S679.

At decision point S679 the process 670 decides whether to update route or other information of one or more vehicles or vehicle groups. Before deciding whether to do so the process 670 may also receive a status update from the adaptive traffic management process 650 via a sub-process S680. The process of updating a route or information depending, at least in part, on whether adjusting a route based on information received from the process 650 may allow one or more of the vehicles using the navigation system to reduce a travel time, avoid a delay or reduce a number of stops compared with a present route plan of the vehicle or vehicles.

If the process 670 decides not to update route or other information then the process 670 decides whether to repeat the process 670.

If the process 670 decides to update route or other information then the process 670 proceeds to a sub-process S682 to perform an update. The process 670 then proceeds to a sub-process S684 to provide the process 650 with notification of any relevant updated route information of the vehicles and/or vehicle groups. The process 670 then decides whether to repeat, generally repeating until there are no vehicles with a VSS or GSS using the service in an area or on a road segment.

If so then the process 670 returns to begin sub-process S672 again. If not then the process 670 ends.

In one implementation, the TMS 101 may prioritize limiting a number of vehicles in a zone of a road network to attain or maintain a level of traffic movement or flow, for example, a set or dynamic number, within or below a range of numbers, a rate of movement, or another criterion, for the zone and/or other zones (e.g. adjacent or nearby zones).

The TMS 101 may provide each vehicle or user with at least one of different modes of operation based in part on prevailing conditions and circumstances of the road network, and modes of operation may have differing objectives such as maximizing vehicle throughput, minimizing travel time, or controlling or restricting access. These objectives may be further defined, for example, for individual vehicles presently located in a zone or area, for all vehicles, for a subset of all the vehicles, for the entire road network in an area, or for one or more zones of the area. Further still, the modes of operations may vary with types of roads, for example, signalized roads or non-signalized roads, or road segments with controlled access (e.g. highways and interstates).

The TMS 101 may be used in a zone or area to detect and calculate traffic counts and flows. Based on use of at least one system operating mode, the TMS 101 may dynamically prioritize vehicle traffic and communicate with and through mobile devices, vehicles, and roadside equipment to provide guidance and instruction to vehicles and users, such as by providing navigation information, operating and adapting traffic signal timing, speed limits, and driving routes, adjusting system conditions, monitoring system usage, performance, and inputs, and communicating with users or vehicles on the system to provide feedback based on real-time or near real-time conditions, probabilistic estimates, or historical data.

Figure 8E:
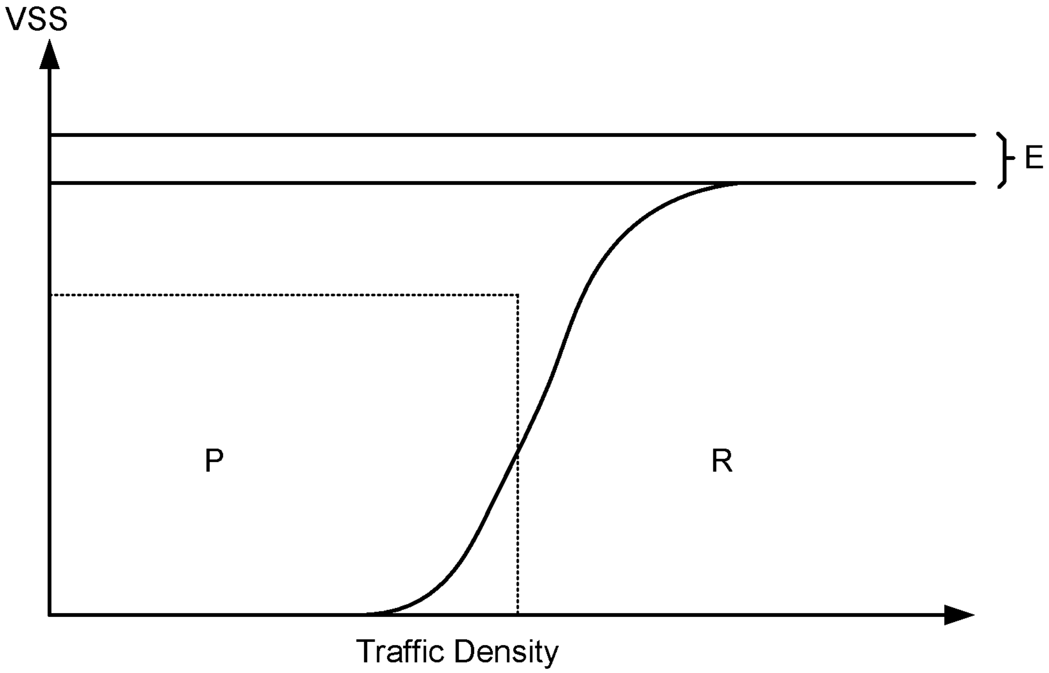
FIG. 8E is a graph illustrating VSS and traffic density, and three operating regions P, R and E, according to one example.
Figure 8F:
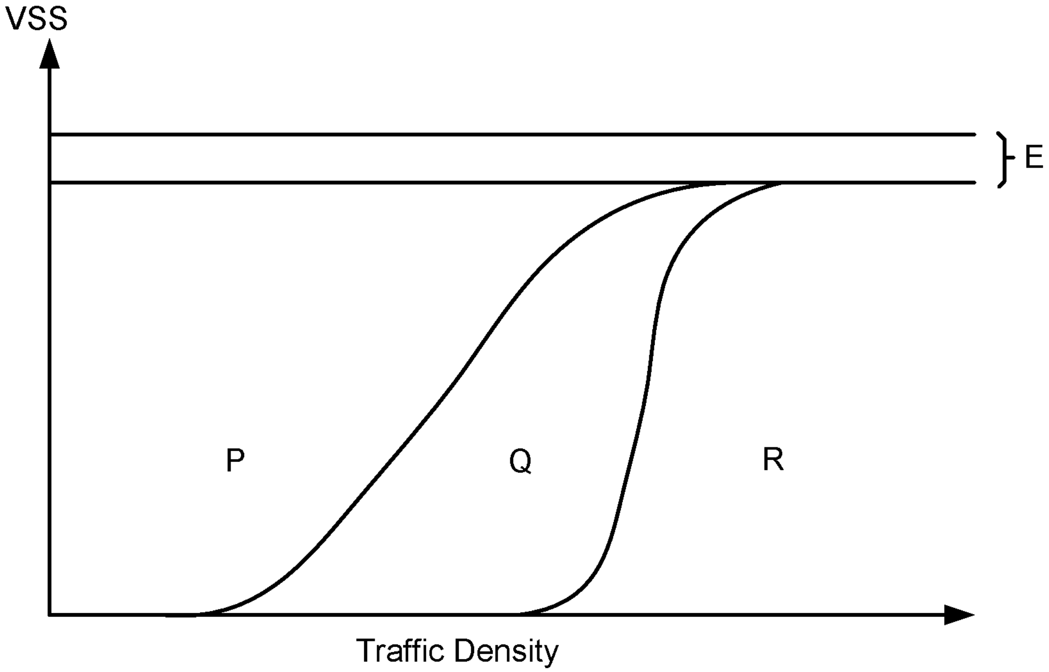
FIG. 8F is a graph illustrating VSS and traffic density, and four operating regions P, Q, R and E, according to one example.

FIGS. 8E-8F illustrate exemplary conditions where the TMS 101 may use different system operating modes, depending on system load or condition. A measure of system load is traffic density, which may occupy a continuum from light to heavy traffic, from having only one vehicle on a road segment, the vehicle able to drive freely, toward having higher traffic volumes approaching a saturation threshold, and then reaching severe congestion, such as a situation of gridlock where traffic is effectively at a standstill. In such a case, traffic signals are no longer effective as traffic cannot move even in a direction of a green light signal due to blockage.

Traffic density TD may be a number of vehicles per time period per lane:

TD=(Vehicles/Time) and a saturation rate S for a road segment may be a constant:

S=1,800 vehicles/hour and a saturation ratio may be determined by TD/S. If the saturation ratio (SR) exceeds a threshold (examples provided below and in description for FIG. 21A), congestion may occur. Further, a trend in traffic density for a road segment may be determined by comparing a TD of a first time period (e.g. an hour, 15 minutes or 1 minute intervals) to that of one or more subsequent time periods. If TD of a lane or road continues to increase with each measurement such as TD1<TD2<TD3, depending on a rate of increase, the road segment may approach saturation.

Each vehicle driving on a road segment effectively occupies a portion of the road segment beyond its physical footprint to encompass a surrounding area needed to safely drive among other vehicles. The more predictably a vehicle behaves (is operated or driven), the smaller the surrounding area needed. The higher the density of vehicles on the road segment or network (a. k. a. traffic density) the more predictable vehicles need to behave in order to maintain a level of traffic flow. In other words, a saturation threshold for the road segment may increase (e.g. from 70% to 90%) as the predictability of vehicles increases. Conversely, saturation threshold decreases as predictability decreases, to a point that one unpredictable vehicle may be sufficient to cause congestion, such as by causing a collision that blocks the road segment. Any system operating mode of the TMS 101 may include use of at least one of a Vehicle Score Stack (VSS), a Group Score Stack (GSS), a JW in routing, guidance, traffic signal timing calculations, and other traffic control measures. The VSS and the GSS represent a measure of vehicle and vehicle group priority, respectively, and are described in detail by FIG. 16A. Vehicle and group priorities may also serve as proxies for predictability. Thus the higher the VSS (or the GSS) the more likely the TMS 101 may provide a vehicle-centric operating mode for the vehicle. Different system operating modes may have different objectives, for example, maximizing vehicle traffic throughput, reducing traffic density, reducing average travel time per distance (or increasing average speed), minimizing travel time for a specific vehicle or vehicle group, minimizing a number of stops for a specific vehicle, minimizing a number of stops for a vehicle group, minimizing total distance traveled by a vehicle group, diverting certain traffic away from or consolidating certain traffic toward a specific location or area, or optimizing for a combination of objectives. These are merely examples and there may be other objectives.

The TMS 101 may use, combine, or blend modes of operation simultaneously for different road segments, zones, or vehicles. Dynamic selection of system operating modes may include at least one system operating mode for routing of vehicles on a road network, and may use various processes in various combinations to accomplish objectives.

FIG. 8E is a graph illustrating VSS and traffic density, and three operating regions P, R and E, according to one example. The graph describes conditions of a road segment, zone or area where different operating modes or sets of operating modes may be used by the TMS 101 in each region toward meeting various objectives, and may use traffic density to represent conditions. The region P may represent conditions where the TMS 101 may use vehicle-centric operating modes to optimize the road network and/or traffic signals for one or more specific vehicles, generally for a low traffic density range. The region R may represent conditions where the TMS 101 may use system-centric operating modes to optimize the road network and/or traffic signals for a majority of known or detected vehicles, generally for a high traffic density range. As traffic density increases from a lower range toward a higher range fewer vehicles may be provided with a vehicle-centric operating mode, specifically only the vehicles or vehicle groups with high (above a threshold) or relatively high VSS or GSS, respectively. In one example, a road segment may have a measure of TD or SR, such as TD=750 vehicles/hour or SR=0.5 beyond which progressively higher VSS is required to receive priority traffic signaling, up to a point beyond which no vehicle may receive priority signaling due to congestion or impending congestion and the system is operating in the region R. In another example, only vehicles with at least a VSS ratio (ratio of VSS to an average VSS) of 1.2 may be provided with priority traffic signaling when $0.50<SR<0.70$. An exception to this may be applied to vehicles that have a VSS in region E. Due to the critical nature of their operations, emergency vehicles operating in an emergency mode may be provided with vehicle-centric operating modes by the TMS 101 regardless of traffic density or other road conditions, especially with respect to traffic signal timing, to minimize travel time of the emergency vehicles.

Vehicle-centric operating modes may adjust weightings of vehicle elements to increase their relative significance, such as elements indicating weightings of specific vehicles or vehicle groups in equations described by FIG. 8C2. For example, the weighting of the vehicle R1 may be temporarily increased and/or the weightings of other vehicles may be lowered in EV calculations to prioritize the vehicle R1 over the other vehicles. The weighting, such as W1, of a data source may also be temporarily increased and/or the weighting, for example W2, of another data source may also be lowered in total traffic demand calculations to adjust a proportion of influence a vehicle or vehicle group has, which may allow a vehicle or vehicle group connected to the TMS 101 to be able to encounter mostly or only green light signals in an area equipped with traffic signals that are also connected to the TMS 101, particularly during periods of low traffic density.

System-centric operating modes may adjust weightings of system elements to increase their relative significance, such as elements indicating numerical vehicle counts from detection equipment or certain data feeds (e.g. aggregate or anonymized feeds) in traffic demand and EV equations explained by the description of FIG. 8C2 to prioritize traffic throughput, rather than individual vehicles or vehicle groups. For example, the junction weighting JW of a first junction may be temporarily increased and/or the junction weightings of other junctions may be lowered in total traffic demand calculations to prioritize a relative significance of the first junction over other junctions to optimize traffic movements of a road segment, area or zone.

FIG. 8F is a graph illustrating VSS and traffic density, and four operating regions P, Q, R and E, according to one example. The graph describes conditions of a road segment, zone or area where different operating modes may be used by the TMS 101 toward meeting various objectives, and may use traffic density to represent conditions. The regions P, R, and E may be the same as described by FIG. 8E. However, as traffic density progressively increases from a low traffic density condition to a high traffic density condition a larger set of system operating modes may be used. In between, the region Q may represent conditions where the TMS 101 may use a combination of both vehicle-centric operating modes to optimize the road network and/or traffic signals for one or more specific vehicles, generally for a low traffic density range. The region Q may represent conditions where the TMS 101 may use system-centric operating modes to optimize the road network and/or traffic signals for a majority of known or detected vehicles, generally for a high traffic density range. As traffic density increases from a lower range toward a higher range fewer vehicles may be provided with vehicle-centric operating modes, specifically only the vehicles with higher VSS or the vehicle groups with higher GSS. In one example, a first Density Reduction system operating mode may request that a vehicle or a user defer beginning a trip to a future time or a future time period. In another example, a second Density Reduction system operating mode may request that a vehicle or a user schedule a next trip for a specific time or a time period prior to departure. Further, a user may schedule a departure time via the TMS 101 in advance, and the TMS 101 may track adherence to the schedule by the user or the vehicle. In another example, a third Density Reduction system operating mode may request that a vehicle or a user depart at a present time on a trip. Agreement and adherence to any request by the TMS 101 operating in a density reduction mode by at least one of the vehicle and the user may provide enhancement to the VSS or other reward. Lack of adherence by a user or a vehicle to such request may result in reduction of the VSS or other disincentive.

In another example, a second Density Reduction system operating mode limits traffic access or closes certain roads or junctions entering a zone for a time period or until target traffic density threshold for a road segment, area or zone is met.

In another example, a Vehicle Optimal system operating mode may provide a vehicle with vehicle-centric routing designed to optimize routing for a specific vehicle based on at least one of travel time, distance, number of stops, cost (e.g. tolls or other expense), a number of turns, and a probability of delay. Variables and metrics may be prioritized or weighted algorithmically, by a user, by a system operator, or through some combination thereof.

In another example, a first System Optimal system operating mode may provide system-centric routing designed to optimize routing for a number of vehicles by maximizing vehicle traffic throughput based on, for example, at least one of average speed, travel time, and travel distance. Variables and metrics may be prioritized or weighted algorithmically, and may be based at least in part on individual or combined user priorities, such as those provided by a vehicle optimal mode.

In another example, a second System Optimal system operating mode may route vehicles in a way to distribute traffic across multiple routes, such as to increase traffic flow or reduce traffic density at one or more junctions.

In another example, a third System Optimal system operating mode may route vehicles in a way to consolidate or concentrate traffic on one or more routes, such as for minimizing vehicle flow at one or more junctions.

In another example, an Alternate Travel system operating mode may be available and designed to present users with modes of transportation in lieu of or in addition to driving to accomplish equivalent or similar travel objectives through other modes of transit such as bus, rail, bicycling, car pooling or sharing, walking, or some combination thereof.

In another example, an Emergency system operating mode may provide priority or highest priority routing to emergency response vehicles such as police, fire, and rescue vehicles. The emergency system operating mode may be a variation of a vehicle optimal system operating mode with a highest priority level or highest priority band status to emergency response vehicles operating in an emergency mode.

In another example, an artificial intelligence (AI) system may be used to augment any system operating mode, such as to determine routing for one or more vehicles traveling in at least one zone on the road network and adjusting traffic signal timing in response to those vehicles. The A1 system may utilize at least one of a variety of techniques or processes to determine each vehicle's route using, for example, machine learning, logical, probabilistic, search and optimization (including use with heuristics), and various types of neural networks, for at least a portion of a routing function. Further, human input or review may be used in some situations.

In another example, an operating mode may use detection of a presence of a vehicle at or approaching a junction to operate a traffic signal at the junction or a second traffic signal at a second junction, with or without data input from other sources.

In another example, a backup operating mode may use a traffic signal phase and cycle schedule to provide signal timing at a junction in a case of an emergency or loss of previous data or connectivity.

Figure 9:
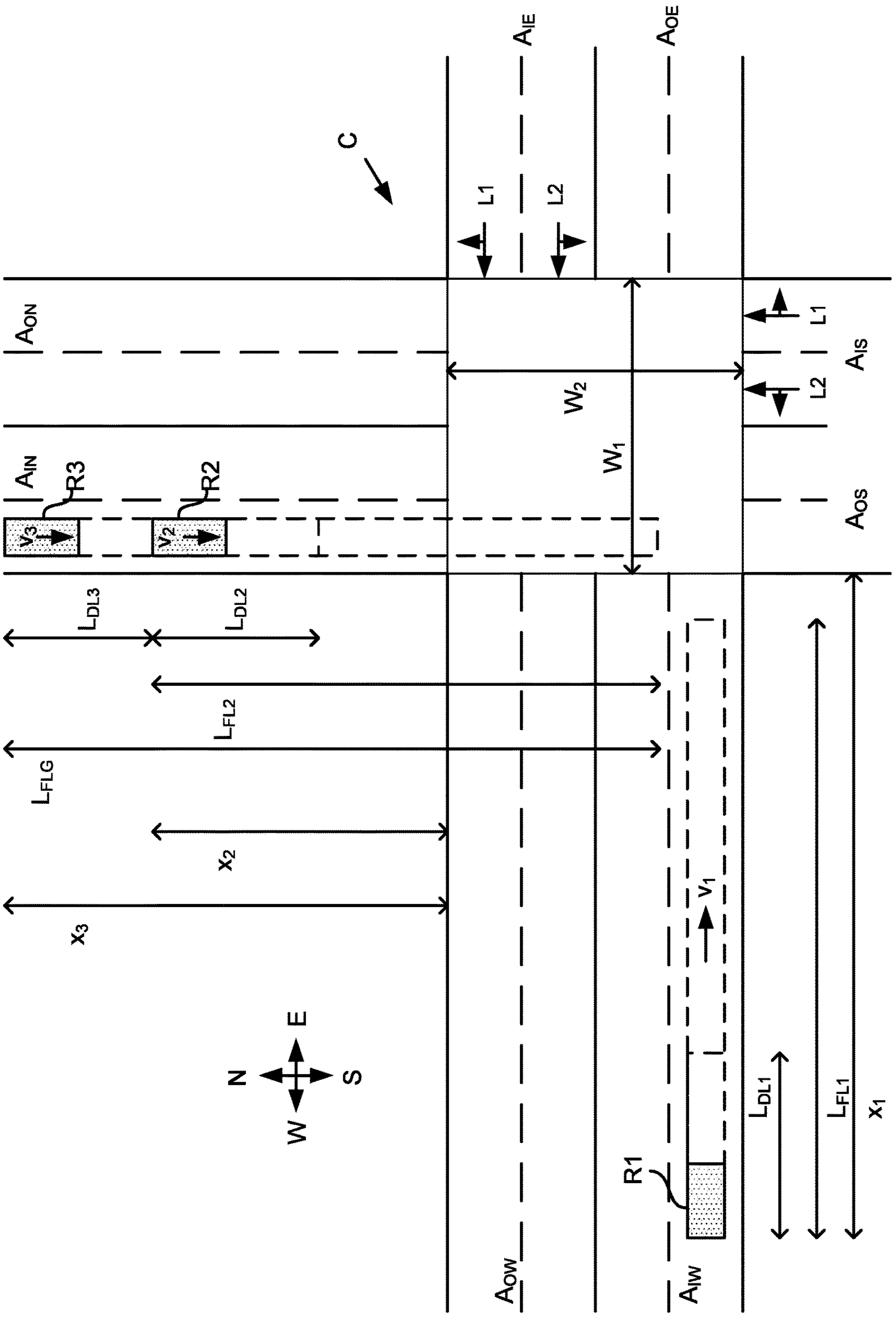
FIG. 9 illustrates a junction C of two roads having a vehicle R1 approaching the junction C, according to one example.

FIG. 9 illustrates a junction C of two roads having a vehicle R1 approaching the junction C, according to one example. The vehicle R1 may be in communication with the TMS 101 and following a route provided by the TMS 101. The junction C may have a traffic signal. The TMS 101 may be aware of the presence of the vehicle R1 as the vehicle R1 approaches the junction C, and then adjust the traffic signal to provide a green light signal in a direction such that the vehicle R1 may travel through the junction C without having to stop for a traffic light signal, for example, to proceed straight through, to turn right, or to turn left at the junction C with reduced impedance. A vehicle connected to the TMS 101 may have a VSS assigned, as explained by FIG. 16A and may have a buffer length $L_{FL}$ and a drive length $L_{DL}$. The buffer length $L_{FL}$ of the vehicle may be for navigation purposes and may include a length of the vehicle and a distance forward of the vehicle's location and path on a route calculated to, for example, provide sufficient distance for the vehicle to fully pass through one or more upcoming junctions on a route for a present, average, or estimated vehicle velocity without intersecting or overlapping a buffer length or a drive length of another vehicle (such as another vehicle traveling in a cross direction), or to indicate a location on the navigation route where the vehicle is anticipated to stop or change velocity.

The drive length $L_{DL}$ of the vehicle may include the length of the vehicle and a distance forward of the vehicle calculated to provide distance to take evasive or emergency action for a present vehicle velocity, for example, the distance to another vehicle traveling ahead in approximately a same direction. The buffer length $L_{FL}$ and the drive length $L_{DL}$ of a vehicle may each be measured from a same reference point (e.g. trailing or leading edge of the vehicle), may be at least the length of the vehicle, and the buffer length $L_{FL}$ may include the drive length $L_{DL}$.

Both the buffer length $L_{FL}$ and the drive length $L_{DL}$ may each be a dynamic distance from a trailing or leading edge of the vehicle that extends toward a distance forward of the vehicle, and the distance forward may vary with, for example, vehicle velocity and/or operating environment and conditions. Both the buffer length $L_{FL}$ and the drive length $L_{DL}$ may also have a width component that forms a buffer area that may be inclusive of a footprint of the vehicle. The drive length $L_{DL}$ may be a portion of the buffer length $L_{FL}$. The drive length $L_{DL}$ may be approximately equal to, for example, a vehicle stopping distance from a present velocity, a distance for the vehicle to reduce velocity (e.g. brake) by an amount from a present velocity, or a distance to swerve to avoid a slow or stopped obstacle in a present lane or path of the vehicle.

A vehicle's buffer length $L_{FL}$ may be used for calculation purposes if the vehicle is traveling individually (a vehicle group of one) or the vehicle is the lead vehicle in a vehicle group. In one example, a vehicle driving at 30 mph (44 ft/s) operating with a 30 second time horizon may have a buffer length $L_{FL}$ of approximately 1,320 feet. In another example, a vehicle driving at 45 mph (66 ft/s) operating with a 40 second time horizon may have a buffer length $L_{FL}$ of approximately 2,640 feet. A vehicle's time horizon may, for example, be a time until a green light signal at a next or subsequent junction is due to be provided in the vehicle's direction of travel.

The time horizon may also determine a wait time for cross traffic movements of other vehicles, pedestrians, bicyclists, and ground drones, to prevent movements in a cross direction from overlapping at least one of the vehicle's buffer length $L_{FL}$. Further, the drive length $L_{DL}$ of a vehicle may be static or dynamic. If dynamic, it may vary as a function of vehicle velocity. For example, as velocity increases drive length $L_{DL}$ may increase to accommodate a following or reaction distance ahead of the vehicle. In another example, drive length $L_{DL}$ of a vehicle may also vary with speed and the vehicle's class and/or specification that may indicate the vehicle's braking capability (size, weight, brake type, computer assistance, vehicle autonomy, etc.), and other performance criteria, as well as prevailing conditions such as known traffic densities and speeds, and weather (e.g. rain, snow, fog, time of day) or road conditions (e.g. construction zone, school zone, TOD, DOW, presence of a disabled vehicle, bicyclist, pedestrian, etc.).

Factors that may determine a junction weighting (JW) of a direction of a junction may include at least one of directional priority of a travel direction entering the junction, a vehicle or group priority, a vehicle or group velocity, a vehicle or group length, and vehicle density on a road segment or lane density, a present speed limit, a presence of pedestrian, bicyclist, or groups of people, a topography factor such as incline, relative elevation, road curvature, and certain unique features related to visibility or situational awareness related to the direction, and possibly compared with the same aspects of a second direction of the junction. Map data of each road segment may include data to identify road and road segment use constraints. Examples may include length, width, elevation, grade, number of lanes, junction (intersection) locations and turn directions or restrictions, traffic control device locations (e.g. traffic signals, gates), speed control devices (e.g. speed bumps, rumble strips), overhead clearance limits, presence of tunnels, bridges, topographical data (slopes, inclines), temporary and long term restricted access and periods of restriction, traffic flow and historical data, permissible travel directions, truck restrictions, signage, roadside equipment (e.g. dynamic message boards, cameras, other monitoring equipment), photographs, access roads, and location of infrastructure such as communication, electrical, and plumbing equipment. Note that drivers described herein may include, at least partially, a computer system, such as in a case of a (human) driver assistance system or an automated vehicle (AV).

For example, if a first direction entering the junction has a steep decline approaching the junction, the JW of that approach direction may have a higher or lower weighting than that of a second direction entering the junction that has a relatively flat topography approaching the junction, increasing or reducing a likelihood of a green light signal in the first direction of the junction relative to that of the second direction. In another example, a first exit direction of a junction has an upward slope while a second exit direction of a junction does not have a substantial slope. To help preserve vehicular momentum through the junction, maintaining flow and reducing vehicle energy consumption, the directional priority of the junction may lead to the JW for a green signal in the first exit direction to have a higher value than that of the second exit direction.

In one example, the vehicle R1 is traveling eastbound toward the junction C with a velocity v1, is a distance x1 from junction C and has a buffer length $L_{FL1}$ ahead of and including a length of the vehicle R1. A time tin for the vehicle's R1 buffer length $L_{FL1}$ to arrive at the junction C may be calculated as tin=(x1−$L_{FL1}$)/v1. In a case the vehicle R1 is proceeding straight through the junction C, a time tout for the vehicle R1 to fully pass by the width W1 of the cross road as the vehicle R1 crosses the junction C may be calculated as tout=(x1+w1)/v1. At a time t=0, if x1 is 360 feet, $L_{DL1}$ is 40 feet, W1 is 48 feet, and v1 is 44 ft/s, then tin=(360−40)/44=7.27 seconds, and tout=(360+48)/44=9.27 seconds.

Thus, under these conditions, the drive length $L_{DL1}$ (including the vehicle R1) passes through the junction C in 2 seconds.

Another example may be identical to the previous example and also have a second vehicle R2, the second vehicle R2 traveling south toward the junction C with a velocity v2. The second vehicle R2 may also be following a corresponding second route provided by the TMS 101.

In a case the second vehicle R2 would proceed straight through the junction C if the traffic signal at the junction C is green in a southbound direction, a time tout for the second vehicle R2 to fully pass by the width W2 of the cross road as the second vehicle R2 crosses the junction C may be calculated as tout=(x2+w2)/v2. At a time t=0, if x2 is 300 feet, $L_{DL2}$ is 40 feet, W2 is 48 feet, and v2 is 44 ft/s, then tin=(x2−$L_{DL2}$)/v2=(300−48)/44=5.72 seconds, and tout=(x2+w2)/v2=(300+48)/44=7.91 seconds.

If the first vehicle R1 and the second vehicle R2 are both known to the TMS 101 and due to arrive, or their respective buffer lengths $L_{FL}$ are due to arrive within the junction C during a time period that overlaps, the TMS 101 may provide guidance or instructions to at least one of the first vehicle R1 and second vehicle R2 to avoid simultaneous or near-simultaneous arrival at the junction C, minimizing delay or stoppage for at least one of the first vehicle R1 and the second vehicle R2

Such guidance may include reducing at least one of the velocity v1 of the first vehicle R1 and the velocity v2 of the second vehicle R2, increasing at least one of the velocity v1 of the first vehicle R1 and the velocity v2 of the second vehicle R2, rerouting at least one of the first vehicle R1 and the second vehicle R2 to avoid the junction C, and/or bringing at least one of the first vehicle R1 and the second vehicle R2 to a stop at a point prior to entering the junction C such as by providing a red light signal in a vehicle's direction of travel at junction C or a prior junction along the vehicle's route (if applicable to that vehicle during a present time period). The TMS 101 may determine what guidance or instructions to provide or what actions to take based, in part, on at least one of a priority VSS1 of the first vehicle R1, a priority VSS2 of the second vehicle R2, a location of the first vehicle R1 and a location of the second vehicle R2 relative to the junction C, a velocity v1 of the first vehicle R1, a velocity v2 of the second vehicle R2, speed limits, vehicle routes, and traffic conditions on surrounding roads and junctions. In one example, Further, if both the first vehicle R1 and the second vehicle R2 are approaching the junction C and due to arrive within an overlapping time period, the traffic signal may provide a red light signal to at least one of the first vehicle R1 and the second vehicle R2 to stop traffic in at least one direction entering the junction C.

Any change in the guidance or instructions for the first vehicle R1 and the second vehicle R2, such as with the velocity v1 or the velocity v2 may be subject to additional conditions. For example, maintaining the velocity v1 or the velocity v2 relative to a respective speed limit SL1 or SL2 unless the first vehicle R1 and/or the second vehicle R2 is decelerating to a stop, such as at a traffic signal, and with conditions such as |v1−SL|<(a first velocity deviation limit) and/or |V2−SL2|<(a second velocity deviation limit), among other possible constraints.

Another example may be identical to the preceding example and also have a third vehicle R3, the third vehicle R3 traveling south toward the junction with a velocity v3 and following behind the second vehicle R2 on a common road segment. The third vehicle R3 may also be following a corresponding third route provided by the TMS 101, the third route having at least one common road segment as that of the second route (e.g. that of the second vehicle R2).

The second vehicle R2 and the third vehicle R3 may be considered a vehicle group. In one case, a group priority GSS and a vehicle group buffer length $L_{FLG}$ may be a function of at least one of the priority and the drive length LDL, respectively, of at least one of the second vehicle R2 and the third vehicle R3.

In one example, the vehicle group may include two or more vehicles traveling in a line in one lane and the group priority may be a function (such as a sum) of the priority VSS of each vehicle within the vehicle group, and the vehicle group buffer length $L_{FLG}$ may be up to a sum of at least one of the $L_{FL}$ and the $L_{DL}$ of each vehicle in the vehicle group and any gap lengths that may exist between the various $L_{FL}$ and $L_{DL}$ of the vehicles in the group. Each vehicle may be assigned to the vehicle group on the basis of at least one of, for example, the vehicle's location within a lane or road segment, a present velocity and direction of the vehicle, an expected velocity and direction of the vehicle, the vehicle's VSS, adherence to an assigned route and/or travel time, a proximity of the vehicle to another vehicle in the vehicle group, or an identity or operating status.

In another example, the group priority GSS of a vehicle group may be a function of, for example, a sum, a product, or a product and a sum, or some calculation based on the VSS of at least two vehicles traveling on a number of lanes of a length of a road segment or on a length of one lane of a road segment. A vehicle group buffer length $L_{FLG}$ may be a length along one lane of a road segment and at least one of the buffer length $L_{FL}$ and the drive length $L_{DL}$ of each vehicle within the length may be a basis for determining the vehicle group buffer length $L_{FLG}$. The vehicle group buffer length $L_{FLG}$ may fully span a vehicle buffer length $L_{FL}$ of a leading vehicle and a drive length $L_{DL}$ of each following vehicle in the vehicle group, for example, up to and including a final vehicle in the group of vehicles.

In another example, the group priority GSS and the vehicle group buffer length $L_{FLG}$ may be based on at least two vehicles located within an area of a road segment having at least one lane and traveling in a common direction. The vehicle group buffer length $L_{FLG}$ may span a length that includes the drive length $L_{DL}$ or buffer length $L_{FL}$ of a first vehicle R1 located at a foremost position to a second vehicle R2 located at a rearmost position in the group. The second vehicle R2 may be located in the same lane or a different lane as the first vehicle R1.

In a case the third vehicle R3 would proceed straight through the junction with the second vehicle R2 if the traffic signal at the junction is green in a southbound direction, and assuming the third vehicle R3 remains behind the second vehicle R2, a time tING for the vehicle group to enter the junction and a time tOUTG for the vehicle group to fully pass by the width W2 of the cross road as the third vehicle R3 crosses the junction may be calculated in one example at a time t=0, if x3 is 350 feet, $L_{DL3}$ is 60 feet, W2 is 48 feet, and v3=v2, and v2 is 44 ft/s, then $$tING = (x3 - L_{DL3} - L_{DL2})/v2 = (350-60-40)/44 =$$

$$5.68 \text{ seconds and } tOUTG = (x3 + w2)/v3 = (350 + 48)/44 = 9.05 \text{ seconds.}$$

If the first vehicle R1, the second vehicle R2, and the third vehicle R3 are all known to the TMS 101 and due to arrive within the junction during a time period that overlaps, the TMS 101 may provide guidance or instructions to at least one of the first vehicle R1 and second vehicle R2 to avoid simultaneous or near-simultaneous arrival at the junction, minimizing delay or stoppage for at least one of the first vehicle R1, the second vehicle R2, and the third vehicle R3.

In each of the examples above, an additional time tFS may be added to time tOUT such that total time allotted for each (final vehicle if in a group) vehicle to pass through the junction C before the traffic signal changes to red in that direction accounts for additional delay, for example, due to a latency that may exist in communication within the TMS 101 or due to road or traffic conditions. Alternatively, the time tFS may also be accounted for during a time period the traffic signal changes from green to yellow to red. If not then a time tEXTRA may account for time to decelerate, clear an existing queue of traffic, and/or for a stationary waiting period.

A priority level of a vehicle approaching a junction may be a VSS if one or more travel directions approaching the junction has only one vehicle. The priority of more than one vehicle approaching a junction may be a GSS if more than one vehicle is approaching the junction from one travel direction has a VSS. In other words, GSS may include a VSS of one or more vehicles.

In one example, a first vehicle is traveling on a first route that intersects a second route. A second vehicle traveling on the second route would otherwise arrive at a junction of the first and the second route approximately at a time the first vehicle arrives at the junction on the first route. The second vehicle may be requested or guided by the TMS 101 to reduce or increase a velocity of the second vehicle by an amount beginning at a location prior to the junction to offset arrival of the second vehicle at the junction from that of the first vehicle, allowing the TMS 101 to provide a green light signal for the first vehicle to pass through the junction and then to either provide a green light signal to the second vehicle to pass through the junction upon arrival of the second vehicle at the junction, or to reduce a time the second vehicle will be stopped at the traffic light at the junction if the second vehicle arrives at the junction before the first vehicle has safely passed through the junction and the traffic light has turned red in the direction the first vehicle is traveling.

A JW may be assigned to a junction, for example, if at least one direction entering the junction has a higher priority than at least one other direction entering the junction. The junction weighting may be dynamic and may depend, in part, on a time of day, a current or historical volume of traffic approaching or entering junction, a topography of the junction such as a slope of an incline approaching the junction, a road surface, weather conditions, visibility, pedestrian traffic, rail traffic, side streets, known routes of vehicles using the TMS 101, and/or other factors.

Further, the junction weighting of a junction may serve as an indicator of relative significance of the junction to that of other junctions within a zone or area. Weightings of individual directions of a junction may be based on historical traffic flows, topography, etc. (or special events or time schedules). Junction weightings may be assigned dynamically or statically based on overall significance of a junction within an area to prioritize traffic movements in the area rather than at specific locations.

A significance of a junction and of each direction entering or exiting the junction may be dynamic. Some junctions and junction directions may have a higher priority at certain times due to situations such as proximity to other junctions and traffic effects of those other junctions, traffic volume, and impedance (e.g. school buses) in or near the junction.

Traffic volume entering or approaching each junction may be estimated or determined in part by routes provided to vehicles by the TMS 101, or other navigation system such that routes are communicated to the TMS 101. Further, an expected arrival time for each vehicle approaching the junction may also be estimated or determined by the TMS 101. Combined with other information that may be available, a dynamic junction weighting may be assigned by the TMS 101 to each direction entering and exiting a junction and may be used to, at least in part, determine directional priorities to the TMS 101.

Vehicle prioritization through a junction may be performed as a comparison of values of a function. Each function may, for example, include a sum, a product, or another combination of mathematical operations involving at least one of a junction weighting, a VSS, and a GSS. For example, a vehicle with a priority of VSS entering a junction from a direction with a junction weighting of JW1, may have a total priority equivalent to (VSS)×(JW1), and a vehicle group with a priority of GSS entering the junction from the direction with the junction weighting of JW2 may have a total priority equivalent to (GSS)×(JW2).

In one example, a priority VSS1 of a first vehicle approaching a junction from a first direction may be compared to a priority VSS2 of a second vehicle approaching the junction from a second direction.

In another example, a function of a priority VSS1 of a first vehicle approaching a junction and a junction weighting JW1 of a first direction may be compared to a function of a priority VSS2 of a second vehicle approaching the junction and a junction weighting JW2 of a second direction.

In another example, a priority GSS1 of a first vehicle group approaching a junction from a first direction may be compared to a priority GSS2 of a second vehicle group approaching the junction from a second direction.

In another example, a function of a priority GSS1 of a first vehicle group approaching a junction and a junction weighting JW1 of a first direction may be compared to a function of a priority GSS2 of a second vehicle group approaching the junction and a junction weighting JW2 of a second direction.

In another example, a priority VSS1 of a first vehicle approaching a junction from a first direction may be compared to a priority GSS1 of a vehicle group approaching the junction from a second direction. The priority VSS1 may be considered a GSS having one vehicle.

In another example, a function of a priority VSS1 of a first vehicle approaching a junction and a junction weighting JW1 of a first direction may be compared to a function of a priority GSS1 of a vehicle group approaching the junction and a junction weighting JW2 of a second direction. The priority VSS1 may be considered equivalent to a GSS of a vehicle group having one vehicle.

As far as routing processes, at least two distinct cases exist that may determine how a vehicle is routed by the TMS 101. In a first case, if a first vehicle having a first vehicle buffer length is traveling on a first route, a second vehicle having a second vehicle buffer length is traveling on a second route, and the first vehicle buffer length and the second vehicle buffer length do not intersect or overlap at a present time and will not within a next time period, then the first and the second routes may be considered by the TMS 101 to be independent routes. This case generally exists in situations of low traffic density.

In a second case, which tends to exist in situations of moderate to high traffic density, if the first vehicle and the second vehicle are traveling as described in the first case except that the first vehicle buffer length and the second vehicle buffer length do intersect or overlap at the present time, or are estimated to intersect or overlap within a next time period, then the TMS 101 may take action to mitigate the effects. Actions may include at least one of generating an alternate route for the second vehicle such that, if the second vehicle were traveling on the alternate route, the second vehicle buffer length would not intersect with the first vehicle buffer length, or using one or a combination of routing processes described below to optimize traffic flow.

Depending on a system operating mode of the TMS 101, a route for each vehicle on the road network and connected to the TMS 101 may be generated using a known process, or based on a known process, for example, Dijkstra's algorithm, Johnson's algorithm, Bellman-Ford algorithm, Floyd-Warshall algorithm. or variations thereof, or may be determined by an alternate routing process.

A routing process may generate a first route for a first vehicle or a first vehicle group that includes use of at least one of a VSS, a GSS, a JW, a time component for at least a portion of the first route, and other information. The routing process may generate a second route for a second vehicle or a second vehicle group that may include use of at least one of, at least for a portion of the second route, a VSS, a GSS, a junction weighting, a time component, and other constraints, such as information that may arise from the first route generated for the first vehicle or the first vehicle group. Depending on a system operating mode of the TMS 101, the second route may be generated with a priority to avoid intersecting the first route. Vehicle routing, guidance, and/or instruction may be adjusted for at least one of the first vehicle (or first vehicle group) and the second vehicle (or second vehicle group) toward an objective, for example, to minimize a number of vehicle stops for at least one vehicle or to maximize vehicle throughput, such as on a route, in a zone, or in an area.

In one example, the second vehicle or the second vehicle group may travel on the second route and be guided to at least one of an approximate speed range and/or a full stop for a time period one or more times while traveling on the second route. Further, the second vehicle or the second group of vehicles may travel on the second route and be guided on a detour away from the first route, for at least a portion of the second route.

A time period of seconds to minutes may provide sufficient limits for accomplishing system objectives. Vehicle routes may be continually revised or updated with initial destinations for each route remaining fixed unless the TMS 101 is provided with updated destinations for a route.

A multitude of distinct and independent location and time domain route segments may be created by fractionating assigned vehicle routes and using an immediately relevant downstream route segment or segments for guiding vehicle traffic during a current and/or subsequent time period. A process may create a snapshot of route segments in use for a time period. Only a subset of all junctions and road segments between routes may be in use in the snapshot due to a shortened time period and anticipated distance covered by each vehicle than would be present if an entire length of each vehicle route were considered. The length of in-use routes or route segments may be a function of route proximity, vehicle speeds, and or vehicle buffer lengths $L_{FL}$.

One routing process for creating uninterrupted road segments may be by reducing a number of available junctions in an area for periods of time, and routing vehicles away from red lighted directions of those junctions during those time periods.

JW may be static or dynamic, and may vary by direction. Each direction entering or exiting a junction may have a different JW. A first junction may be a primary junction in a set of at least two junctions while a second junction may be a secondary junction with at least one JW that may be a function of at least one JW of the first junction. In one case a JW of the second junction may be based on a distance or a travel time (e.g. time period $t_1$) of the second junction from that of a first junction. JW may be arbitrary constants applied to the TMS 101 and/or may be dependent upon permanent or temporary conditions described above such as topography, traffic volumes, and ambient conditions.

A process for calculating traffic demand priority for each direction of a junction may include the sub-processes or steps of sorting junctions of a set in order from highest to lowest JW, optimizing traffic for a junction with a highest JW, then optimizing traffic for a junction with a second highest JW and so forth until lastly optimizing traffic for a junction with a lowest JW. In one case, calculating traffic demand priority for a junction is performed without changing or considering the prioritization results of junctions with higher JW that were optimized prior to optimizing of the present junction. In another case, calculating traffic demand priority for a junction may be performed while concurrently changing or considering the prioritization results of junctions with higher JW than that of the present junction.

Figure 10:
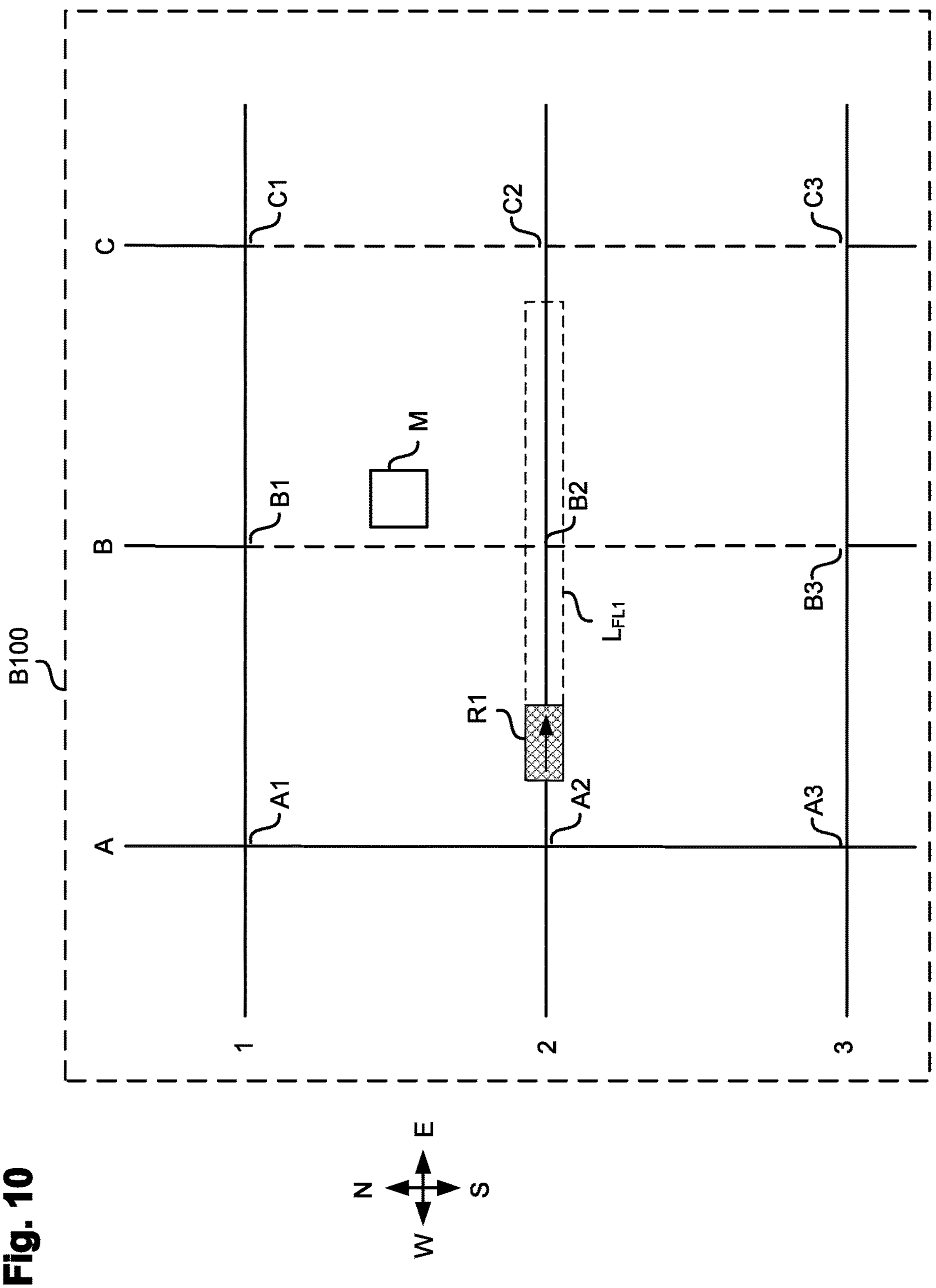
FIG. 10 illustrates a vehicle R1 traveling in an area B100, according to one example.

FIG. 10 illustrates a vehicle R1 traveling in an area B100, according to one example. The vehicle R1 has a buffer length $L_{FL1}$ and is traveling on a road 2 toward a junction B2, where a segment of the road 2 ahead of the forward direction of travel of the vehicle R1. The junction B2 presently provides a green light signal in the direction of travel of the vehicle R1, and traffic signals located at subsequent junctions on a route of the vehicle R1, such as a traffic signal located at a junction C2, may provide a green light signal from a present time until the vehicle R1 passes through the corresponding junction. The traffic signal at junction C2 may provide a green light signal prior to the arrival of the vehicle R1 at the junction, or the traffic signal may provide a green light signal at a time related to the buffer length $L_{FL1}$ of the vehicle R1 intersecting the junction, and the corresponding traffic signal may maintain the green light signal for a fixed period of time or at least until the vehicle R2 has passed through the junction C2.

This may reduce transitions between stop/go, reducing traffic flow interruption and activity that may contribute to traffic congestion. Traffic with a destination on a street near a red lighted junction (a. k. a. a locked or red lighted junction) may still be routed to locations on those streets, such as a location M, during lock periods without crossing the locked junction, for example, via junction B1 but not via junction B2 to maintain a clear path on the road 2 for vehicles traveling on the road 2. A lock junction period may vary in duration and may be generally longer in duration than usual traffic signal phases or cycles. The duration may range from seconds to minutes, for example, thirty seconds, one, two, three, five, and ten minutes, or other increments that may be longer. Other traffic may generally not be routed down a red lighted street until the street is green lighted or about to be green lighted. Exceptions to routing a vehicle toward a street with a locked junction (with a red light in the vehicle's direction of travel) may include if the vehicle has a low VSS, the vehicle or user requests to be routed down the street with the locked junction, the user consents to such delays, or high traffic density/congestion conditions necessitate such routing by the TMS 101. Further, a countdown may be communicated to a roadside display, a vehicle, and/or a mobile device by the TMS 101 or a traffic signal system about how long until a red traffic signal may be green again. Further, a vehicle's VSS, a vehicle group GSS, a vehicle count in one or more directions approaching the locked junction or another junction, and other vehicle status or specifications waiting at a locked junction may impact a duration of the traffic signal and lock period.

Another routing process may include two or more vehicles operating simultaneously on different routes or directions in an area. Even if at least some of the routes of the vehicles intersect, the vehicles or their respective buffer lengths $L_{FL}$ may not be simultaneously crossing the same junctions or $L_{FL}$ otherwise intersecting at approximately a same time. Thus, routes may be fractionated or divided through at least one time domain to reduce a number of junctions, therefore reducing a number of prioritization and traffic signaling operations that may be needed. Route fractionation may be applied to one or more routes based on at least one of a vehicle density, a number or density of junctions, a speed limit, a present vehicle speed, an average or estimated vehicle speed, and a presence of an exception such as a disabled vehicle, special event, emergency activity, etc. In other words, while a destination or data about an entire length of a route for each vehicle may be known by the TMS 101, the TMS 101 may not need to consider entire routes for a purpose of traffic signal prioritization and control. Only a portion of each route that is needed for a time period tNEXT or distance of a route dR that is relevant, such as a next 30 seconds, 60 seconds, 90 seconds, 120 seconds, or within a next time period tNEXT of a trip, may need to be considered at a time. A duration of the next time period tNEXT may be a function of vehicle speeds, speed limits, traffic density, and proximity of junctions. After a vehicle or vehicle group passes or leaves a road segment or passes a portion of a road segment of the first route, constraints for use of the first route no longer apply and the road segment may be used for a second route without conflicting with use of the first route.

Figure 11A:
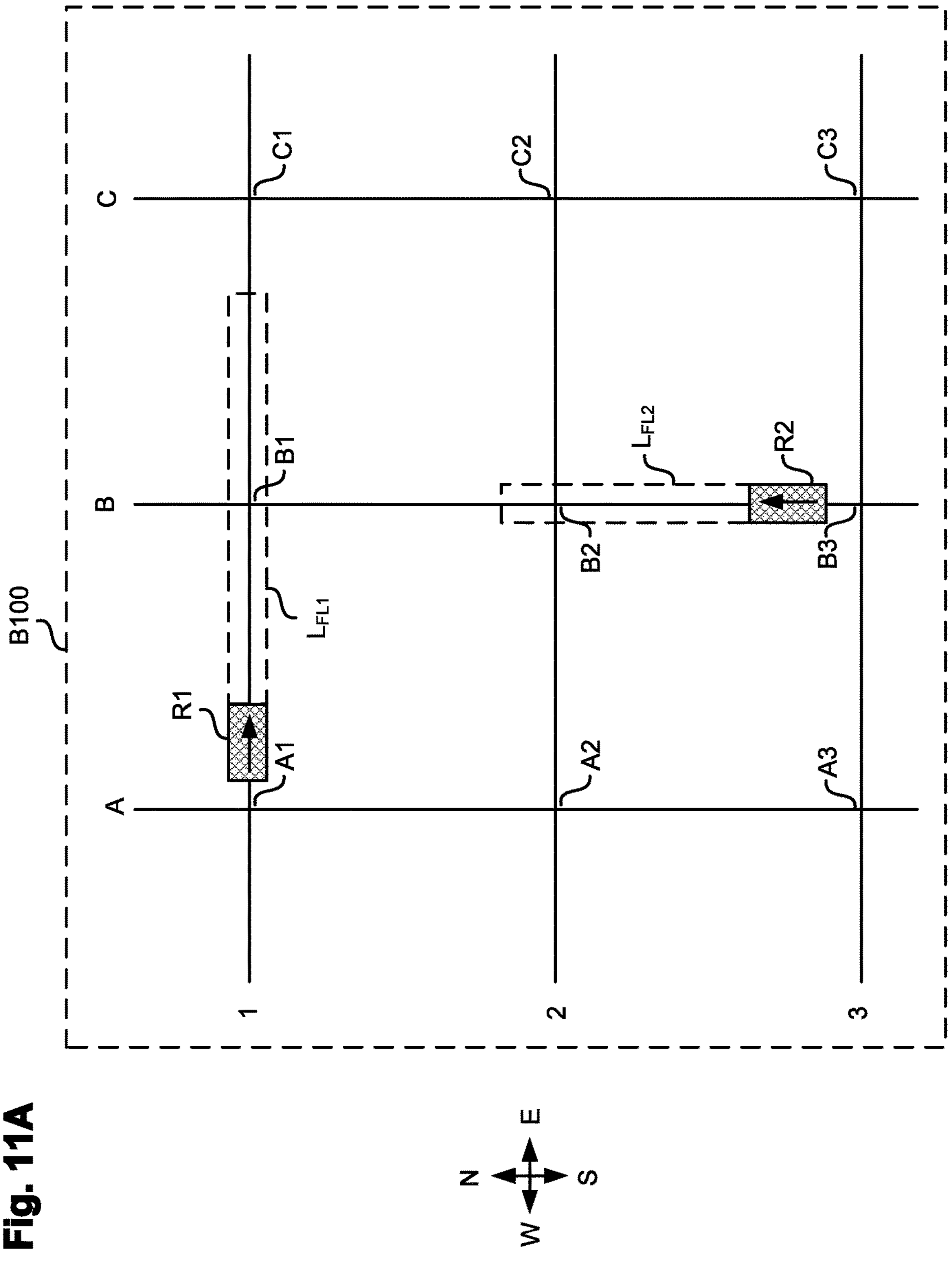
FIGS. 11A-11C illustrate a vehicle R1 and a vehicle R2 traveling in an area B100 on intersecting routes, according to one example.
Figure 11B:
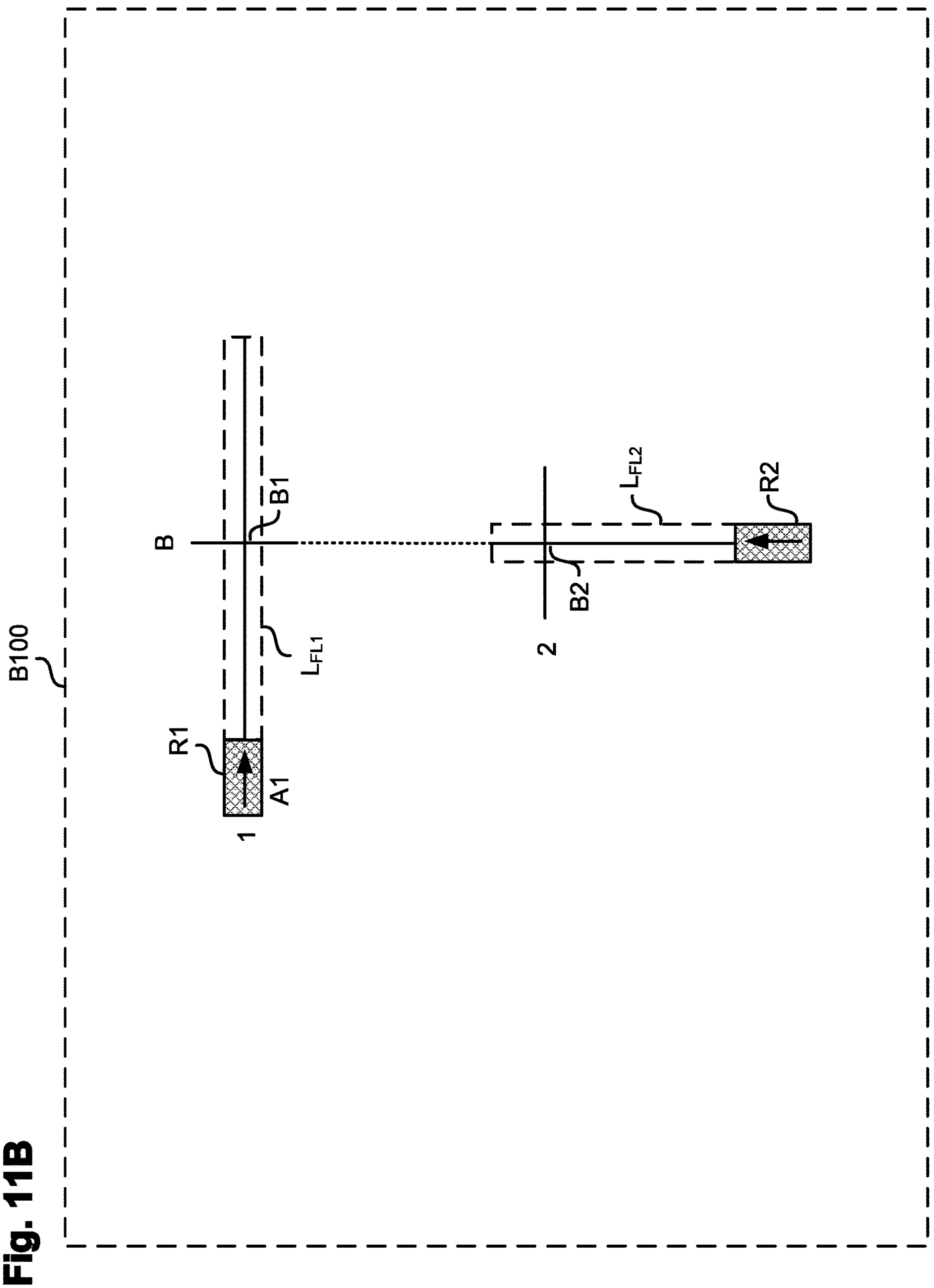
Figure 11C:
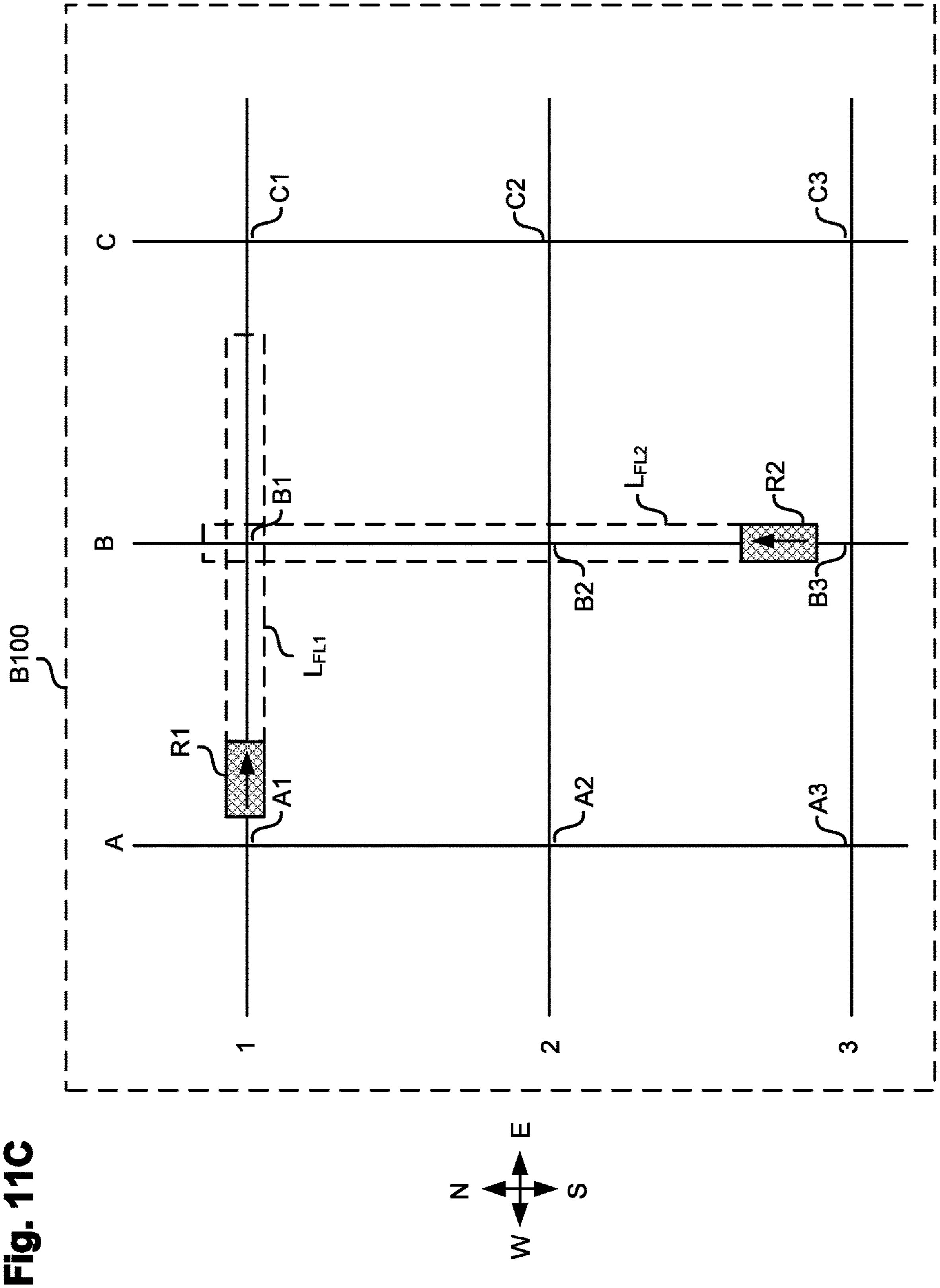

FIGS. 11A-11C illustrate a vehicle R1 and a vehicle R2 traveling in an area B100 on intersecting routes, according to one example. The vehicle R1 has a buffer length $L_{FL1}$ and is traveling on a road 1, and the vehicle R2 has a buffer length $L_{FL2}$ and is traveling on a road B. Both the vehicles R1, R2 may be being routed through and headed toward a junction B1. In a case where there is no overlap between their respective buffer lengths $L_{FL1}$, $L_{FL2}$ during a time period considered, then the TMS 101 may consider the road segments covered by the buffer lengths $L_{FL1}$, $L_{FL2}$ as independent, distinct, and non-intersecting routes, as illustrated by FIG. 11B.

FIG. 11C illustrates a vehicle R1 and a vehicle R2 traveling in an area B100 on intersecting routes, according to one example. The vehicle R1 has the buffer length $L_{FL1}$ and is traveling on the road 1 and the vehicle R2 has the buffer length $L_{FL2}$ and is traveling on the road B. Both the vehicles R1, R2 may be being routed through and headed toward the junction B1. In a case the vehicles R1, R2 may arrive or pass through the junction B1 simultaneously, or their respective buffer lengths $L_{FL}$ 1, $L_{FL2}$ may overlap as at least one of the vehicle R1 and the vehicle R2 approaches and passes through the junction B1, then the TMS 101 may use a junction prioritization process to provide the vehicle or vehicle group with a higher VSS, GSS, and/or junction weighting with traffic signal priority to pass through the junction B1 first and prevent the buffer lengths $L_{FL1}$ and $L_{FL2}$ from overlapping at any time.

Another routing process may include routing and grouping vehicles having routes with common road segments. In some implementations, vehicles and routes may be sorted by VSS or ranges of VSS, for example, vehicles with VSS within a numerical range may be grouped or routed together, while vehicles with disparate VSS may not be grouped with a vehicle group with high VSS. Further, the VSS of vehicles in an area may be used to consolidate routes. Vehicles with higher VSS may have more weighting or higher priority, resulting in their routes being altered less, if at all, and vehicles with lower VSS having less weighting, resulting in their routes being altered more to share common route segments with those of the higher VSS vehicles in certain cases. A degree to which a route of a vehicle may be altered may depend, in part, on a range of VSS between vehicles in an area, in a zone, and/or in a group. Estimated distances, travel times, and/or a number of anticipated stops or junctions and junction weightings on routes may also be considered before routes are assigned to each vehicle, depending on a present system operating mode of the TMS 101. Further, as vehicle routes are considered, actions may be taken by the TMS 101, for example, by use of traffic signal timing, adjustment of dynamic speed limits, and other communication, to stratify vehicles in a group on a common route segment by VSS orby ranges of VSS. An example may include guiding a higher VSS vehicle or a lower VSS vehicle toward a front portion or a rear portion, respectively, of a vehicle group traveling on a common route segment. Further, positioning of a vehicle within a vehicle group may relate to navigation or routing, such as a sequence in which a vehicle will separate from the vehicle group or the common route segment. For example, a vehicle may be guided or positioned to a rear portion of the vehicle group if the vehicle group is continuing straight through a junction and the vehicle is turning at the junction, so as to minimize a probability of impeding other vehicles in the vehicle group that are continuing straight.

In another case, a first vehicle R1 and a second vehicle R2 have a shared route segment, and the vehicle R1 has a higher VSS than that of the vehicle R2 or is in a higher VSS strata. An order of the vehicles on the shared route segment may be determined, at least in part, by the VSS of each vehicle such that the vehicle R1 is allowed or guided to enter the shared route segment first and the vehicle R2 is guided or allowed to enter the shared route segment after the vehicle R1 has passed by or after a time duration has elapsed. Alternatively, the order of entry into the shared route segment of the vehicle R1 and the vehicle R2 may also be determined based on at least one of an estimated time of arrival of each vehicle, an amount that each vehicle may have to turn, the relative speeds, number of lanes, and/or traffic volume of each vehicle's route segment prior to the shared route segment, and the presence of nay traffic signals at the junction of the shared route segments.

Figure 12A:
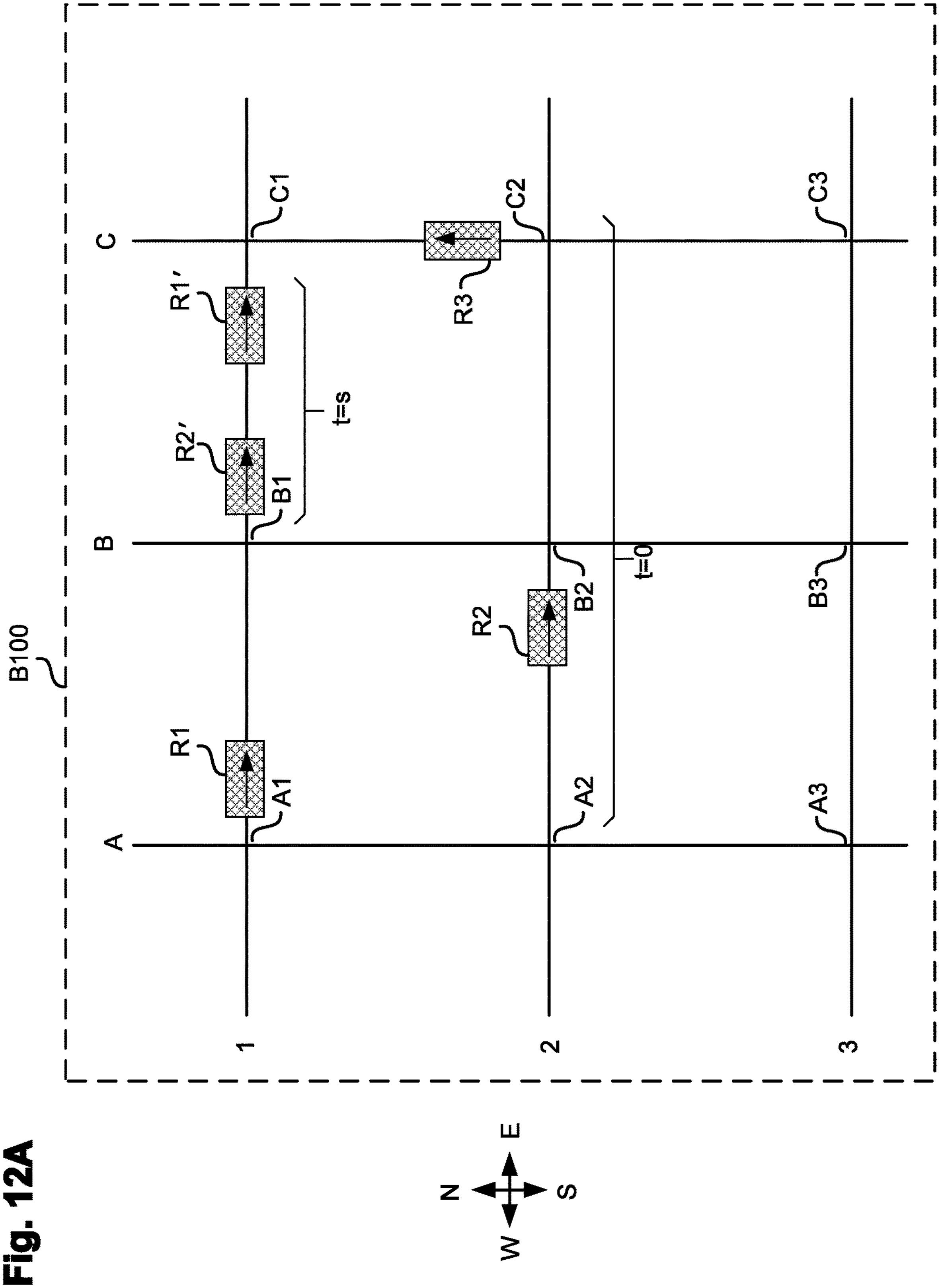
FIGS. 12A-12B illustrate a vehicle R1 and a vehicle R2 traveling in an area B100, according to one example of route or traffic consolidation.
Figure 12B:
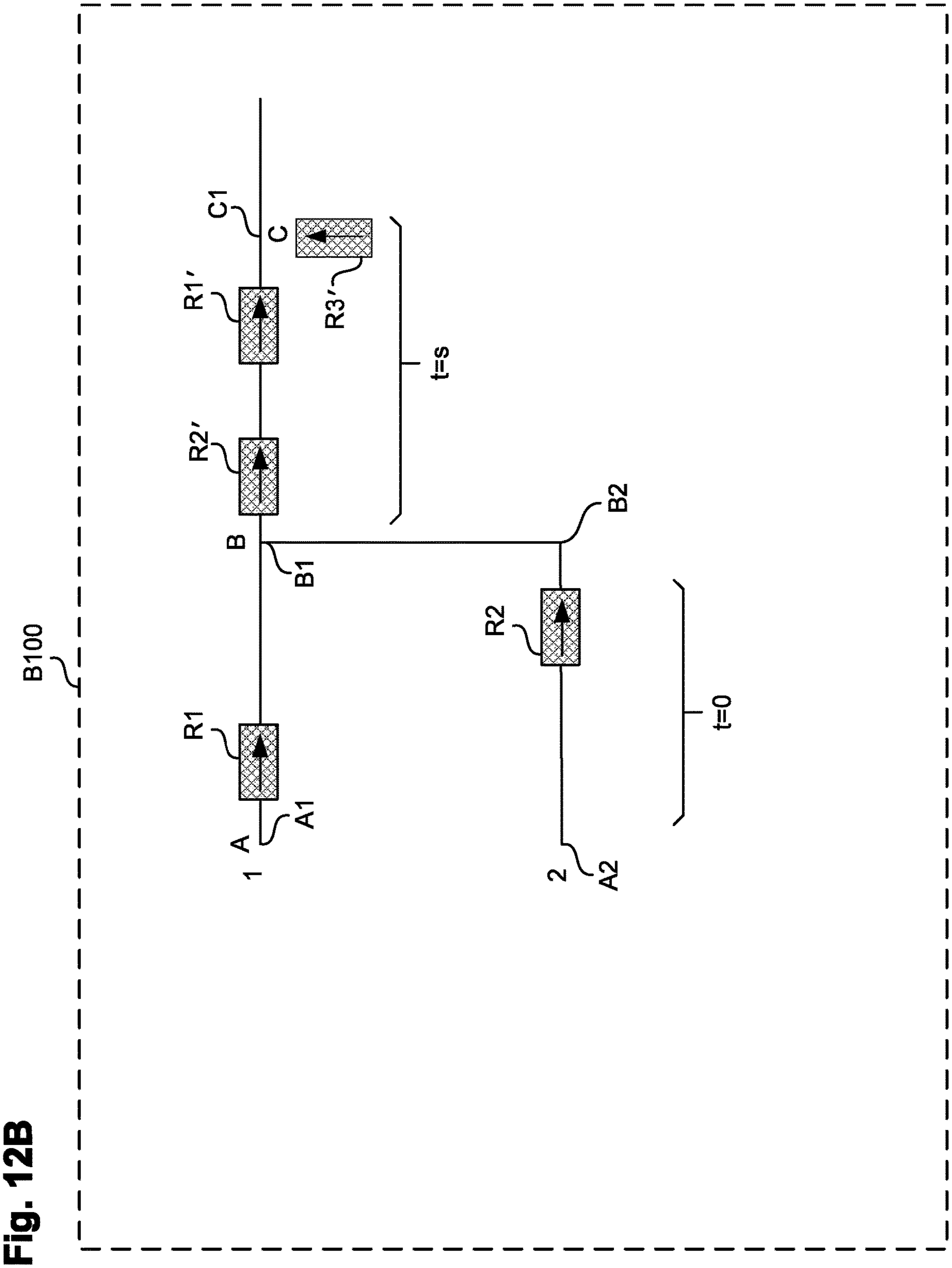

FIGS. 12A-12B illustrate a vehicle R1 and a vehicle R2 traveling in an area B100, according to one example of route or traffic consolidation. Each of the vehicles R1 and R2 has a VSS, and the VSS of the vehicle R1 is greater than that of the vehicle R2. The vehicle R1 is traveling on a road 1 toward junction C1. Initially, (time t=0) the vehicle R1 is located between a junction A1 and a junction B1. The vehicle R2 is traveling on a road 2 toward a junction C1. Initially the vehicle R2 is located between a junction A2 and a junction B2. The TMS 101 causes a traffic signal at the junction B1 to provide a green light signal during a time period in a direction that allows the vehicle R1 to pass through the junction B1 unimpeded. The TMS 101 communicates to the vehicle R2 to turn onto a road B at the junction B2 and proceed toward the junction B1. The vehicle R2 is then provided with guidance to turn onto the road 1 at the junction B1 and proceed toward the junction C1. Depending on prevailing conditions, the TMS 101 may direct a traffic signal at the junction B2 to provide a green light signal during a time period in a direction that allows the vehicle R2 to pass unimpeded through the junction B2 toward the junction B1, and may further provide a green light signal during another time period in a direction that allows the vehicle R2 to pass unimpeded through the junction B1 onto the road 1 toward the junction C1. At a later time (t=s), a second condition may be denoted by the locations of the vehicle R1' and the vehicle R2', the vehicle R2' following the vehicle R1' on the same road segment. FIG. 12B illustrates a portion of FIG. 12A that may be used by the TMS 101 to isolate routes of the vehicle R1 and the vehicle R2 from other vehicles that may be traveling concurrently on separate road segments of the area B100 during a time period spanning t=0 to t=s. At least one of the junctions A1, B1, C1, A2, and B2 may be locked to provide uninterrupted movement of at least one of the vehicles R1 and R2 as described by FIG. 10.

In another example, the vehicle R2 may have a higher initial VSS than that of the vehicle R1. In that case, the TMS 101 may direct a traffic signal at the junction B1 to provide a red light signal in a direction that prevents the vehicle R1 from passing through the junction B1, and provide a green light signal in a direction that allows the vehicle R2 to pass through the junction B1 and head toward the junction C1 without having to stop for a red light signal at the junction B1. Afterward the traffic signal at the junction B1 may provide a green light signal to the vehicle R1 to travel through the junction B1 and follow the vehicle R2 toward the junction C1.

Another routing process may include communicating with at least one vehicle in a group to manage a vehicle group length LFLG and to maintain steady speeds, for example, increasing vehicle density on a road segment while maintaining flow, thereby increasing vehicle throughput.

Figure 13A:
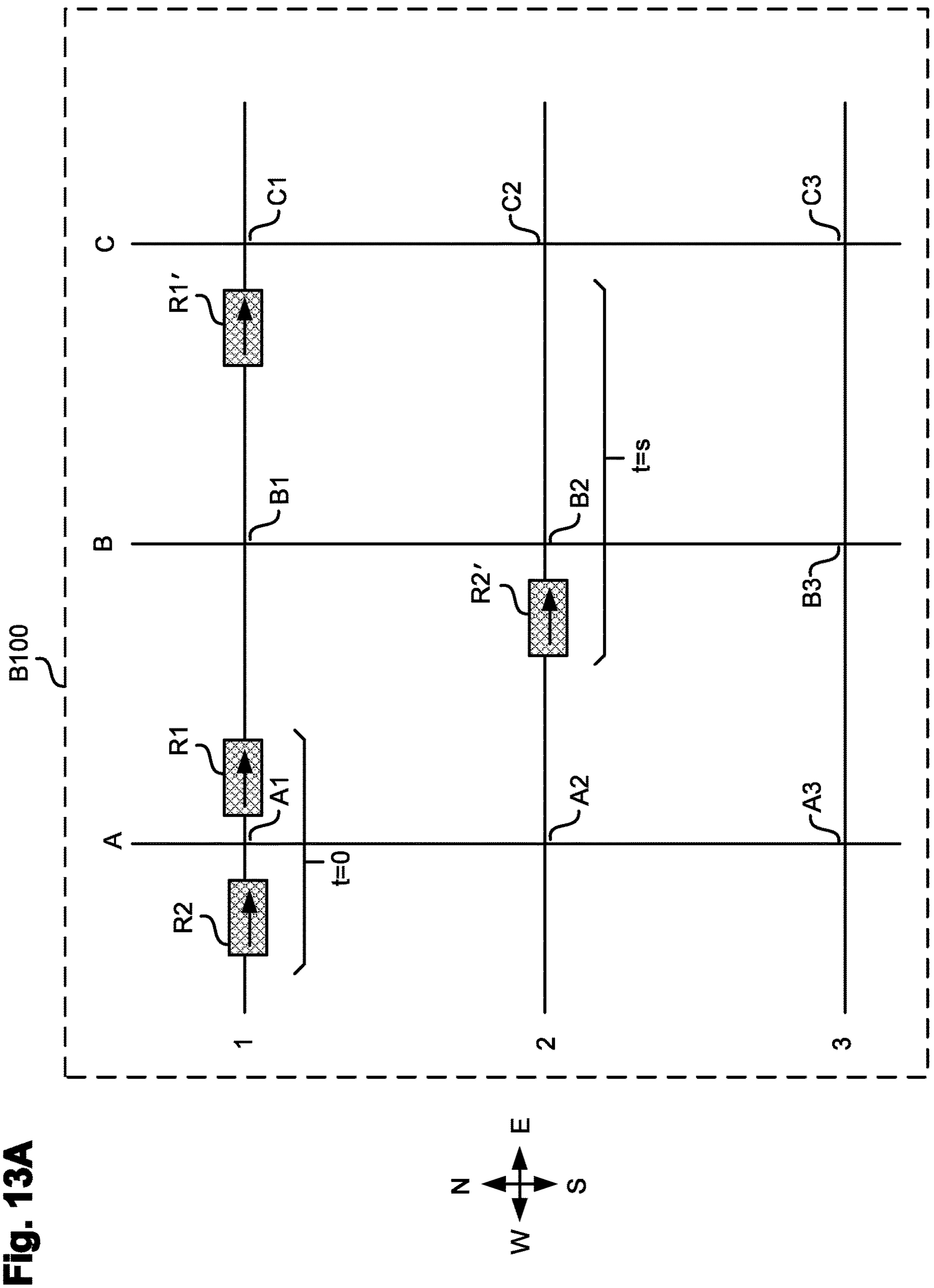
FIGS. 13A-13B illustrate a vehicle R1 and a vehicle R2 traveling in an area B100, according to one example.
Figure 13B:
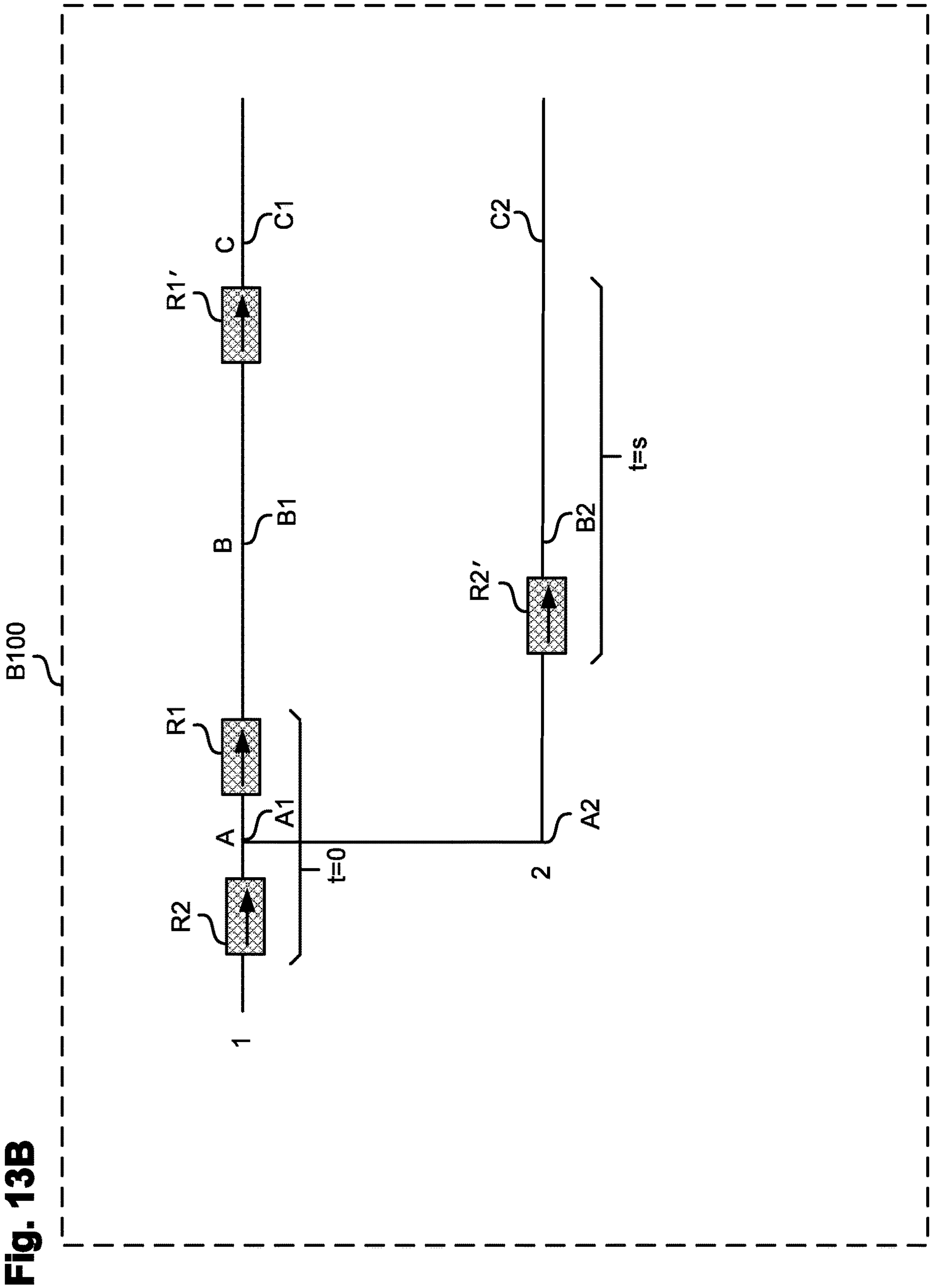

FIGS. 13A-13B illustrate a vehicle R1 and a vehicle R2 traveling in an area B100, according to one example. Each of the vehicles R1 and R2 has a VSS, and the VSS of the vehicle R1 is greater than that of the vehicle R2. The vehicle R1 is traveling on a road 1 toward junction C1.

Initially, at a time t=0, the vehicle R1 is located between a junction A1 and a junction B1. The vehicle R2 is traveling on the road 1 toward a junction C2. Initially the vehicle R2 is approaching the junction A1 and heading toward the junction B1. The TMS 101 directs a traffic signal at the junction B1 to provide a green light signal in a direction that allows the vehicle R1 to pass through the junction B1 unimpeded. The TMS 101 further provides navigation guidance to the vehicle R2 to turn onto a road A at the junction A1 and proceed toward a junction A2. At the junction A2 the vehicle R2 is provided with guidance to turn onto the road 2 and proceed toward the junction C2. Depending on prevailing conditions, the TMS 101 may direct a traffic signal at the junction A2 to provide a green light signal in a direction that allows the vehicle R2 to pass with minimal impedance through the junction A2 toward the junction B2. Further, the TMS 101 may direct a traffic signal at the junction B2 to provide a green light signal during another time period in a direction that allows the vehicle R2 to pass with minimal impedance through the junction B2 onto the road 2 toward the junction C2. After a time s, a second condition is denoted by the locations of the vehicle R1' and the vehicle R2', the vehicle R2' on road 2 and the vehicle R1' on road 1, headed toward the junction C2 and the junction C1, respectively. FIG. 13B illustrates a portion of FIG. 13A that may be used by the TMS to fractionate routes of the vehicle R1 and the vehicle R2 from one another, as well as from other vehicles that may be traveling concurrently on separate road segments of the area B100 during a time period spanning t=0 to t=s.

Figure 14:
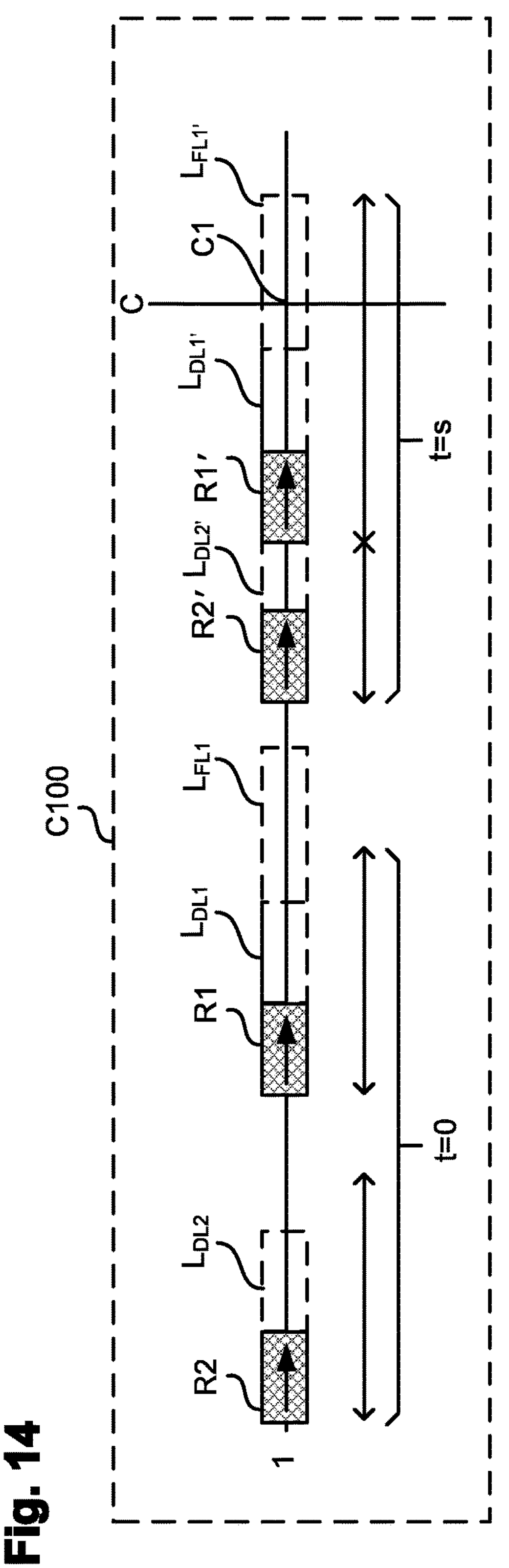
FIG. 14 illustrates a vehicle R1 and a vehicle R2 traveling on a road 1 as a vehicle group, according to one example.

FIG. 14 illustrates a vehicle R1 and a vehicle R2 traveling on a road 1 as a vehicle group, according to one example. The vehicle R1 and the vehicle R2 each have a drive length $L_{DL1}$ and $L_{DL2}$, respectively, and the vehicle R1 may have a buffer length $L_{FL1}$, the buffer length $L_{FL1}$ used to determine, at least in part, a vehicle group length $L_{FLG}$ as the vehicle R1 is in a leading position in the vehicle group. Initially (at time t=0) the vehicle R2 is following the vehicle R1 toward a junction C1, the vehicle R2 in a same lane as the vehicle R1. There may exist a gap length between the drive length $L_{DL2}$ of the vehicle R2 and the buffer length $L_{FL1}$ of the vehicle R1 indicating that the vehicle group length $L_{FLG}$ may be longer than needed for present conditions. The TMS 101 may communicate with at least one of the vehicles R1, R2 to reduce the gap length between the buffer length $L_{FL1}$ of the vehicle R1 and the drive length $L_{DL}$ of the vehicle R2. This may be accomplished by at least one of the vehicle R2 increasing velocity and the vehicle R1 decreasing velocity to reduce or close the gap, and maintain a reduced vehicle group length $L_{FLG}$, for example, so that at a later time t=s, a second condition of the vehicle group length $L_{FLG}'$ may be denoted by the locations of the vehicle R1' and the vehicle R2', the length of the vehicle group including the vehicle R1' and the vehicle R2' may be approximately the sum of the lengths $L_{FL1}'$ and $L_{DL2}'$ (e.g. an ideal condition). A shorter vehicle group length at a given velocity may require less time for the vehicle group to cover a road segment and to pass through a junction on the road segment, allowing more vehicle throughput and traffic signal timing flexibility than a longer vehicle group length. Further, by leaving larger time periods between vehicle groups of more densely packed vehicle groups traveling in a first direction, vehicles traveling in a second direction intersecting with the first direction at a junction may also be provided with more opportunities for the traffic signal to give a green signal for the second direction in between vehicle groups traveling in the first or another direction.

Figure 15:
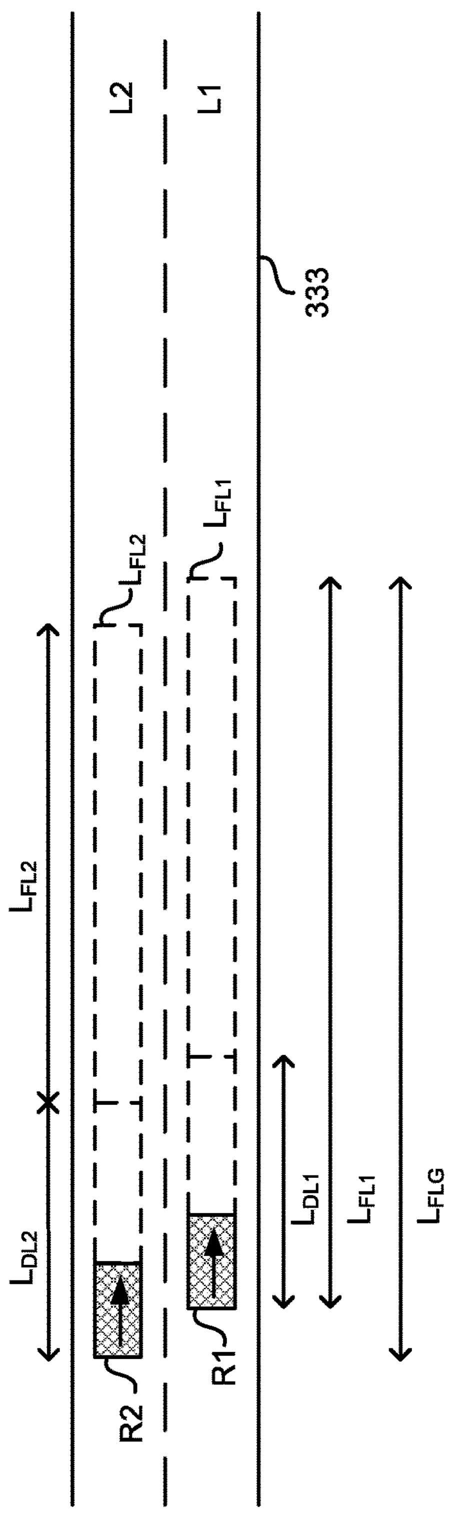
FIG. 15 illustrates a vehicle R1 and a vehicle R2 traveling on a road 1 as a vehicle group, according to one example.

FIG. 15 illustrates a vehicle R1 and a vehicle R2 traveling on a road 1 as a vehicle group, according to one example.

For one or more vehicles in a group in a single lane, the minimum vehicle group length $L_{FLG}$ may be defined by $L_{FLG}=L_{FL}\ 1+L_{DL2}+\ldots+L_{DLn}$, where n is the last vehicle in the group. The $L_{FLG}$ may be longer than the minimum if there are gaps between the $L_{DL}$ of a following vehicle to a trailing edge of a leading vehicle.

In a multi-lane situation, the minimum $L_{FLG}$ may be the $L_{FL}$ of a lead vehicle among all lanes plus the $L_{DL}$ of each following vehicle along a lane with the longest sum of $L_{DL}$. This minimum may be adjusted by any overlap between the $L_{FL}$ of the lead vehicle and an $L_{DL2}$ to $L_{DL}$m of the first following vehicle through the m following vehicle that may overlap the $L_{FL}$, if the first following vehicle is not in a same lane as the lead vehicle.

Further, up to all the VSS of vehicles within a group of vehicles may be considered for inclusion in calculation of a GSS for the group of vehicles. Or there may be a limit up to m of a number of vehicles with VSS that may be added to a group, or the length may be determined by a length along one or more lanes of travel in a same direction of a road segment that may be calculated or estimated to be able to pass through a next signalized junction during a green phase in the direction of travel, or the group length may be up to a predetermined limit such as 0.125 mile or 0.25 mile. The GSS may be equivalent to a sum of all the VSS of vehicles in a lane or an area of a road segment along the same direction of travel. Vehicle groups may be in one lane or span multiple lanes as long as the lanes are adjacent and move in approximately a same direction.

The vehicle R1 and the vehicle R2, may each have a drive length $L_{DL1}$ and $L_{DL2}$, respectively, and may travel as a vehicle group on the road segment 333 in a common direction in separate and approximately parallel lanes. The vehicle R1 may be ahead of the vehicle R2 and there may be approximately parallel overlap between at least one of the vehicle R1 and the vehicle R2, and/or between the drive length $L_{DL1}$ and the drive length $L_{DL2}$. In such a case the buffer length $L_{FL1}$ of the vehicle R1 may be used in determining a vehicle group length $L_{FLG}$, which may be the sum of the buffer length $L_{FL1}$ and a portion of the drive length $L_{DL2}$ that the buffer length $L_{FL1}$ does not overlap.

In other words, the vehicle group length $L_{FLG}$ may be less than the sum of the buffer length $L_{FL1}$ and the drive length $L_{DL2}$, such as a distance along a lane between a rear edge of the drive length $L_{DL2}$ and the leading edge of the buffer length $L_{FL1}$, allowing the vehicle group to cover a road segment and to pass through a junction on the road segment in less time than if the vehicle group was distributed in a single lane and having a vehicle group length $L_{FLG}$ defined, for example, with the vehicle R2 following the vehicle R1.

Further, because the drive length $L_{DL}$ and the buffer length $L_{FL}$ of each vehicle may be based at least in part on vehicle specification, condition, or status, and may be dynamic and change with vehicle velocity and other conditions (see description for FIG. 9), vehicle throughput on a road segment or through a junction may be optimized, in part, by changing vehicle velocity. Essentially, $L_{DL}$ is a distance including a length of a vehicle and a forward distance for the vehicle to stop or avoid an obstacle ahead of the vehicle, for a present velocity and road conditions. $L_{FL}$ is a distance including a length of the vehicle and a forward distance sufficient for a signalized junction ahead of the vehicle to safely change from green in another phase movement to provide a green light signal in a direction of travel of the vehicle, prior to the arrival of the vehicle at the signalized junction such that the vehicle can proceed through the junction without slowing. The length $L_{FL}$ is primarily a function of time and velocity of the vehicle.

Another routing process may include routing or sorting a vehicle or vehicle group to distribute traffic across a zone or area to avoid or defer reaching a congestion threshold along a road segment, to sort by relative priority, for example by a vehicle priority VSS or a vehicle group priority GSS (as explained above), with other vehicles or vehicle groups that have higher or lower priority, or have priority levels in different strata.

At least one process for routing and/or sorting may be utilized. The routing and sorting processes may be combined in varying order depending on, for example, system operating mode(s) in use at a present time and during next time periods.

In some implementations, each vehicle that is detected or provides information to the TMS may be assigned a VSS for purposes related to at least one of routing, navigating, and receiving a signal to continue through a signalized junction as the vehicle approaches the signalized junction. The VSS of the vehicle may allow a user, such as a driver, to exert influence over the user's priority level by incentivizing and disincentivizing specific actions and activities, thereby increasing predictability of the actions that may be taken or not taken by the user.

Figure 16A:
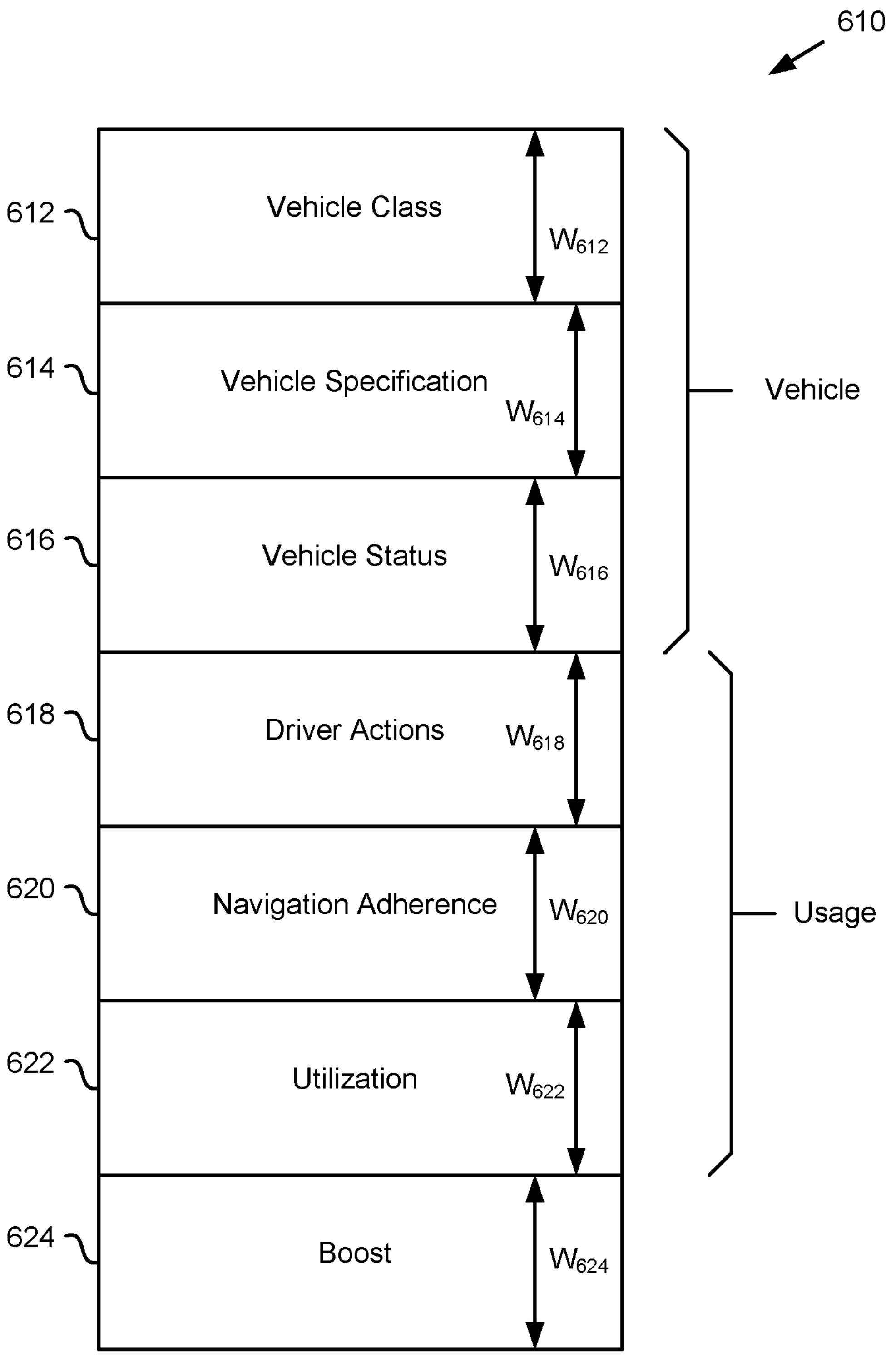
FIG. 16A illustrates a chart having a number of categories and weightings of data elements that may form a VSS, according to one example.

A level of priority, herein referred to as a Vehicle Score Stack (VSS), may be a composite score or ranking determined by the TMS 101 based on a number of elements that may be obtained from a number of sources and users. The elements may be categorized (FIG. 16A).

At least a portion of the VSS may be used for additional purposes separate from a case of a specific user driving or operating a motor vehicle, such as cases that the specific user is a passenger in a motor vehicle, a pedestrian, a bicyclist, or another party in a transaction or a communication. The VSS may be used to incentivize and disincentivize certain driver, passenger, bicyclist, and pedestrian behaviors, travel patterns, vehicle characteristics and uses, navigation uses, and otherwise balance road system loads. The VSS may include a set of global and local variables, and a weighting of each element may be adjusted by location, day, time, categorization, or other aspect.

The VSS of a vehicle may first be scored on a particular scale, for example, 10,000, 1,000, 500, 100, or ranked relative to the VSS of other vehicles in a set. However, in each case the VSS of a first vehicle may be compared on a normalized basis to a second vehicle which may not have a VSS. Vehicles that do not have a VSS that are detected may be considered to have a weight or count equal to 1. If the VSS of the first vehicle is normalized against a predetermined VSS or an average of VSS scores of a set of other vehicles, then a priority of the first vehicle relative to the second vehicle may be established. For example, if the first vehicle has a VSS of 800 and the average of VSS scores used to compare is 400, then the first vehicle may have a priority of 800/400=2. That is, the first vehicle may count twice as much of the second vehicle for purposes of prioritization.

For vehicles that have a VSS, in one example, each vehicle's VSS is normalized to a 1,000 scale. A baseline value may be assigned or determined, for example, zero. In another example, the VSS may be a normalized score from zero to 100, 500, 1,000, 10,000, or some other number. In another example, the VSS may decrease to less than zero. In another example, a separate demerit score may be kept and the VSS may not decrease to less than zero.

The demerit score may, for example, be represented by a count of instances or points that accrue each time a driver or a vehicle exhibits unpredictable, unsafe, or undesirable behaviors with respect to traffic movement and safety. Once the demerit score reaches or exceeds a number of demerit instances or points, the driver or the vehicle may experience a reduction or restriction in privileges such as a lower priority with traffic lights, receiving guidance to navigate on longer or slower routes, or routes with more stops to allow other vehicles to proceed with higher priority. The demerit score may be kept as an ongoing tally or periodically reduced, or reset to zero. The demerit score may also be reduced by maintaining a set of instantaneous VSS above a level, such as an average VSS of the vehicle or driver over a previous distance or time period, or an average VSS of other vehicles and/or drivers for a distance or time period. Below are examples of reductions in instantaneous VSS 611. In lieu of or in addition to such reductions, a count or points may be added to the demerit score for each occurrence described.

In one example, a vehicle is detected to exceed a speed limit on a road segment by 20 mph. A driver action 618 component of each subsequent instantaneous VSS 611 (FIG. 19) may then be reduced by approximately 50 percent for a next 20 miles or 30 minutes.

In another example, a vehicle is detected to experience a rate of acceleration for a period of time at a rate above a predetermined threshold, such as 20 mph/s for more than 2 seconds. The driver action 618 component of each subsequent instantaneous VSS 611 may then be reduced by approximately 30 percent for a next 15 miles or 25 minutes.

In another example, a vehicle is detected to deviate from a route provided by the TMS 101 or a navigation system that is configured to communicate with the TMS 101. A navigation adherence 620 component of each subsequent instantaneous VSS 611 may then be reduced by approximately 60 percent until the vehicle is detected to again be traveling on the route provided, until the vehicle has arrived at the stated destination, or a user has communicated an updated destination to the navigation system or the TMS 101.

These are only exemplary and the invention is not limited to these examples. Many other demerits could be envisioned for disincentivizing various actions or behaviors to various degrees.

Detection of each VSS 610 element may be performed in a variety of ways, such as through at least one or more mobile devices, vehicle systems or devices, and road side detection systems or devices, and at different times.

In one example, indicators of emissions compliance of a vehicle may come from at least one of road side detection by measurement equipment, determined by sensor data output from an on-board vehicle data system that emissions output is below a threshold, and receipt of verification of the vehicle's emissions inspection results from an approved data source such as a service center or a state agency.

In another example, a vehicle's speed may be determined by at least one of the vehicle's sensors, such as a transmission rotation speed, derived via GPS signals received by a mobile or portable device on-board the vehicle, and by one or more road sensors or detection devices, such as cameras or radar.

If more than one data source or calculation process is available concurrently for determining the value of an element then at least one data source or calculation process may be used to determine the element's values. Each data source or calculation process may be assigned a level of preference for use in a case that data sources or calculation processes used for determining an element of the VSS provide conflicting or contradictory information that exceeds a threshold in absolute or relative terms, depending on the element, such that a primary data source or primary calculation process for determining the element may be selected, then a secondary data source or secondary calculation process may be selected, and so forth.

The VSS of the vehicle may increase or decrease based on inclusion or exclusion of an element or data source to the TMS 101 during use. In one example, the addition of a second mobile device, such as a smartphone, to the VSS calculation may indicate at least one additional passenger, and increase a utilization component of the VSS. In another example, detection of an engine fault code in a vehicle data bus may reduce the VSS of the vehicle. Weightings may be assigned to raw data of each element or category, and may vary by time, day, location, junction, road segment, vehicle class/status, and so forth.

The VSS may be dynamic and based on at least one of a cumulative duration of time or a cumulative distance that an element, an activity, or a status is detected by or known or available to the TMS 101, the duration herein referred to as persistence. At least one element of the VSS may have a persistence. For example, the persistence can be a rolling average or continuous tally over a period of time or distance traveled.

Each element of the VSS may have at least one rate and/or per instance value assigned. The greater a time or a distance an element is detected the more value may be accumulated by or deducted from the VSS, in some cases up to a limit. A value of the VSS may be in the form of a numerical figure, a ranking, or another quantitative metric. Weighting of each element may be static or dynamic. Dynamic weightings may be adjusted on the basis of at least one of, for example, a day or a time, a system operating mode of the TMS 101, a vehicle count in a zone or an area, an operating mode of the vehicle, and a vehicle location. Static weightings may be pre-configured in the TMS 101 from initial use, and while they may be periodically adjusted by system administrators or managers, static weightings may not change responsively to system operating conditions without additional input or intervention.

The VSS may be based on cumulative and/or instantaneous actions and activity (i.e. a previous time period, an instance of time, a distance traveled, or a variation of the two, etc.). Each element may have limits set within certain bands to produce or avoid non-linearities to restrict numerical results to within certain ranges, for example, such as use of the TMS 101 beyond a certain amount (e.g. time or distance) does not enhance the VSS without limit.

Persistence of each VSS component may vary, for example, from about 30 seconds to permanently (or by distance, such as a preceding mile, 10 miles, 100 miles, etc.). Conditions that impact the VSS may include that a trip destination of the vehicle or a user is known in advance and that the trip destination is adhered to within a time or a distance by the vehicle. Through use of the TMS 101 and having a VSS, a vehicle may have higher priority than another vehicle that does not have a VSS since a vehicle without a VSS may not be known to or may have limited visibility to the TMS 101.

A vehicle operating in a zone or an area in which the TMS 101 is in operation may have one of a number of identification levels. In one example, the vehicle is not detected and not identifiable. This may occur in a situation where roads do not have a vehicle detection capability, and the TMS 101 may only operate through wireless communication with vehicles and mobile devices, and is not in communication with the particular vehicle. In another example, the vehicle is detected and not identifiable, such as in a case the TMS 101 has a detection device on or near a road segment, for example, a camera or a vehicle counting device that may detect the vehicle as the vehicle passes. However, the vehicle is not in communication with the TMS 101 and remains unidentified. In another example, the vehicle is detected and identifiable, such as in the case of the previous example and the TMS 101 has a detection device to identify the vehicle. Further, the TMS 101 also may be in communication with the vehicle, for example, through a wireless connection, or the TMS 101 may be able to identify the vehicle through the detection device such as by reading a license plate or a transponder on the vehicle. In another example, the vehicle is detected by and in communication with the TMS 101, such as through wireless communication, but remains unidentified such as through the use of an anonymous connection, such that the vehicle identity is only associated with identification of an Ethernet Hardware Address (EHA), a Burned-In Address (BIA), a Media Access Control (MAC) address, or an Extended Unique Identified (EUI) of a wireless device. Further, the use of encryption processes and technologies (e.g. use of a blockchain) may also provide capability of maintaining a level of anonymity.

FIG. 16A illustrates a chart having a number of categories and weightings of data elements that may form a VSS, according to one example.

Each vehicle and/or user operating within the TMS may be detected with varying levels of accuracy, detail, and latency. A vehicle may be assigned a VSS 610. The VSS 610 may be a composite score or relative ranking that affects the determination of the vehicle's priority level, and may include a number of data elements that may be detected, calculated, estimated, inferred, or otherwise determined by the TMS 101 through various devices connected to the TMS 101 and/or through various data sources in communication with the TMS 101. The data elements may be weighted, prioritized, and combined to generate the VSS 610. All data element types may have a numerical value assigned, and the VSS 610 may be a combination of a sum of the product of the element values and their respective element weights.

While the VSS 610 may be representative of a vehicle, a user, and/or activities thereof, a set of data indicative of the vehicle, the user, and/or an activity may reside in at least one proxy device such as a smartphone, a tablet, a vehicle data system, a laptop, and/or a remote network external to the vehicle. The proxy device may or may not be in communication with or otherwise connected to the vehicle, such as in a case a smartphone is contained within the vehicle but not communicatively connected to the vehicle and derives approximate vehicle movement data (e.g. vehicle speed and accelerations, etc.) from sensors connected to or contained within the smartphone that are not connected to the vehicle.

A number of data element types (aka "data elements" or "elements") within the VSS 610 may be grouped in categories for ease of understanding and for simplicity of identification and calculation, but the elements are not required to be categorized. The VSS 610 may be determined on the basis of available input. The more elements of the VSS 610 that are provided or can be determined, and the more that is known or can be determined about each element of the VSS 610, the higher the VSS 610 may ultimately be. The higher the VSS 610 is, the higher a priority of a vehicle may be. At least one category and/or element may have a corresponding weighting Wn (e.g. W612, W614, W616, W618, W620, W622, W624, etc.) within a calculation of the VSS 610 such that some elements and categories may have a greater influence on the value of the VSS 610 than other elements (e.g. a first element may have greater influence than a second element, or vice versa).

A portion of the VSS 610 may be assigned to and/or sourced from the vehicle, and a portion may be assigned to and/or sourced from one or more users (e.g. a driver and/or a passenger, etc.) associated with the vehicle, depending on available data elements and sources of those elements. In one example, elements of the VSS 610 that may be tracked at least in part by the vehicle or devices embedded in or otherwise connected to the vehicle, and not generally separated from the vehicle, may form a portion of the VSS 610 that may be attributed to the vehicle. Devices may be part of a system integral to the vehicle, including a Control Area Network (CAN) bus, Advanced Driver Assistance System (ADAS), vehicle telematics system, or vehicle infotainment system, a plug-in device such as via an OBD-II or other port, or a device specifically connected to or assigned to the vehicle such as a camera, or a video or audio recording system. Exemplary categories of elements of the VSS 610 that may be tracked by the vehicle's systems, an embedded device, or an associated device that may form at least a portion of the VSS 610 including at least one of the vehicle class 612, the vehicle specification 614, and the vehicle status 616.

In another example, elements of the VSS 610 that may be tracked at least in part by a mobile device, for example, a smart phone, that may travel with a user independently of one specific vehicle, may also form at least part of a user score 608 that is analogous to the VSS 610. The user score 608 may be quantified in a manner as the VSS 610, and the user score 608 may further form a portion of the VSS 610. Exemplary categories of elements of the VSS 610 that may form at least a portion of the user score 608 include at least one of the driver actions 618, the navigation adherence 620, and the utilization 622. Further, other categories of the VSS 610 may also be tracked by one or more mobile devices, and thus may form another portion of the user score 608. One or more user scores 608 may thus contribute to determination of the VSS 610, for example, by one or more functions. In a case a user score 608 may be determined to be that of a driver of the vehicle, the user score 608, or its elements, may have a different weighting(s) than that of a second user score 608' that may be that of a passenger of the vehicle.

Data elements that may be used may include, but are not limited to, any of a vehicle registration or Vehicle Identification Number (VIN) data, an image or video, an audio signature and/or volume level, an emissions measurement, a weight measurement, a travel direction, a frequency of traveling on one or more road segments, a vehicle (or other device) velocity, acceleration, condition, and/or direction, such as traveling toward or away from specific events or conditions, VSS points allotted by a user toward travel objectives, and route familiarity (e.g. frequency of traveling on a specific route), a GPS location, a wheel speed, a transmission output shaft speed, a brake hydraulic pressure, a brake control pressure or force, an engine or motor RPM, a power output, a throttle position, a fuel flow rate, a fuel level, a state of charge (SOC) of a battery pack, a coolant temperature, an oil pressure, a tire pressure, a seating position weight, an airbag deployment, a hard braking event, use of any detectable vehicle control device or mechanism, an Event Data Recorder (EDR) recording to non-volatile memory, and/or a head, hand, and/or eye position or movement of a user. Other data may include an operating mode or usage of a smartphone, for example, texting, calling, use of a hands-free mode, display mode, use of a touch screen, and use, ability to use, or inability to use specific features, functions, or apps of the smartphone. Any data that is available from on-board a vehicle, through a mobile or portable device within the vehicle, from a detection device external to the vehicle, or from another data source may be used to detect, determine, estimate, anticipate, and/or infer a status of the vehicle or a driver or other vehicle occupant, and the results may be used to determine a value of one or more elements or categories of the VSS 610 for a time period. In general data element types may inform a calculation of the VSS 610 by their presence, or information that can be derived from the data, may be equated to a score or point value that may then form a component of a VSS 610. For example, if the TMS 101 is provided with the VIN of a vehicle then the vehicle status 614 score of the VSS 610 may have points added, such as according to a predetermined schedule that assigns numerical value of various pieces of vehicle or status information to operation of the TMS 101.

Categories of data element types may include vehicle class, vehicle specification, vehicle status, driver actions, navigation adherence, utilization, and boost. Each type of data element or category may have a numerical range, and each category score may be the sum of numerical scores of the data elements. The VSS 610 of a vehicle over time may be a sum or average of its instantaneous VSS 611 scores, the instantaneous VSS 611*a* sum of the scores in each category, and each category may be multiplied by a weighting. The weightings (e.g. W612 to W624) may serve as multipliers of their respective categories and/or elements, and may vary depending on if the vehicle is operating in a specific zone, area, or road segment, or at certain times or under certain conditions. Categories and weightings may be defined on a more granular level by applying separate weightings within a category to individual types of data elements within the category (if categories are used). Categories are used for exemplary purposes in this description but a VSS 610 may also be calculated from data element types and weightings for each data element type, and such weightings may simply be equal to one.

In general categories and elements allow characteristics and performance of a vehicle, driver, and/or user to be measured or scored, while weightings allow categories or elements to be emphasized relative to one another under certain conditions, for example by road, area, or zone, and/or time of day or day of week.

Weightings may also be adjusted for certain vehicles or drivers based on other conditions. In other words, some vehicles or drivers operating in a certain area may have a different set of weightings applied than other vehicles or drivers in the same area. An example of this is an emergency vehicle operating in an emergency mode may have a vehicle class weighting W612 and/or vehicle status weighting W616 that is higher than that of other vehicles.

In certain situations, such as an emergency vehicle operating in an emergency mode, some or all of the category scores of the emergency vehicle may be maximized so as to have priority over all other non-emergency vehicles that may be present in the area. Further, the category scores of at least some non-emergency vehicles in communication with the TMS 101 or a navigation system may be reduced to ensure greater priority for the emergency vehicle, in addition to other measures that may be taken, such as traffic signal preemption for the emergency vehicle.

Figure 17:
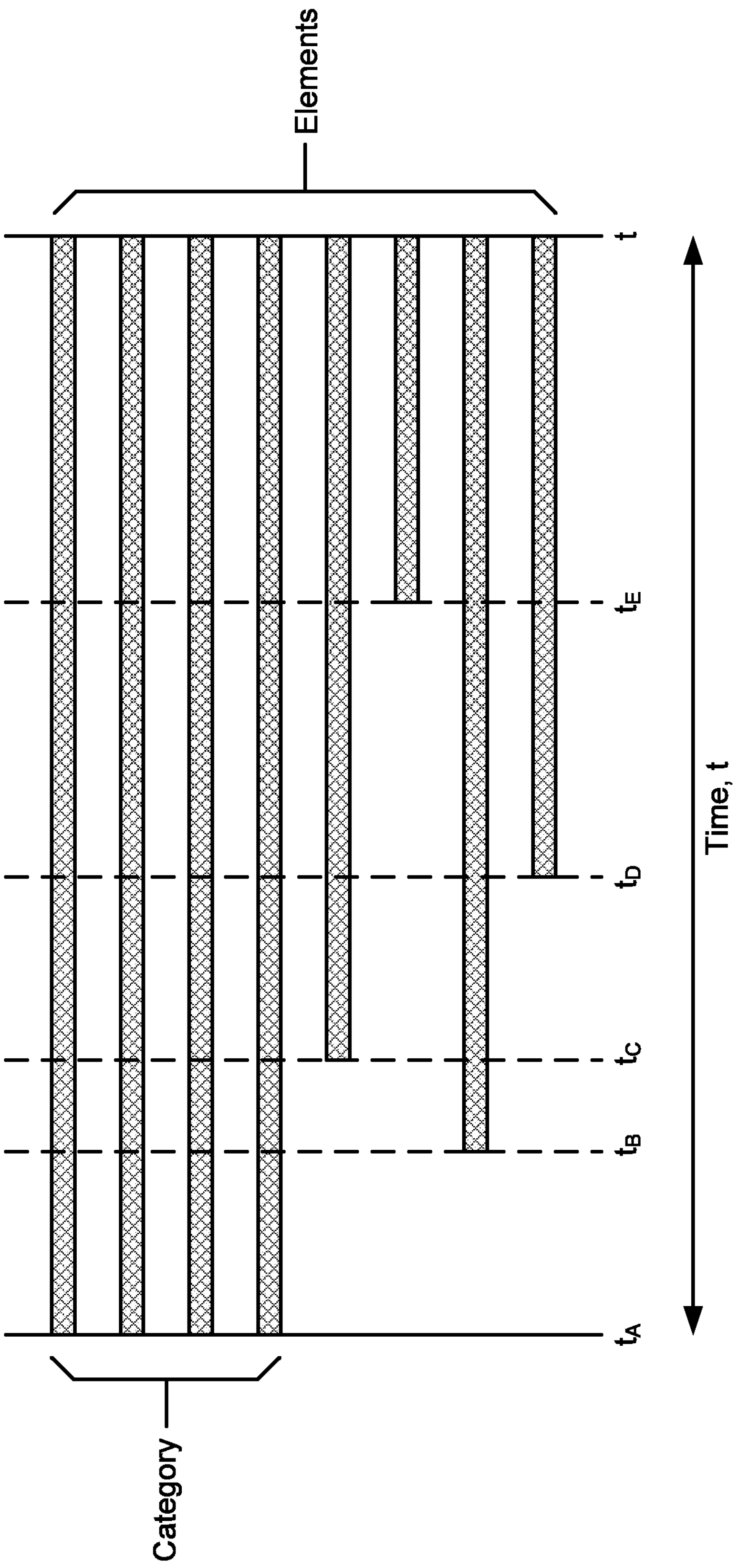
FIG. 17 illustrates a graph of a number of elements of the VSS 610 relative to a time scale, according to one example.
Figure 19:
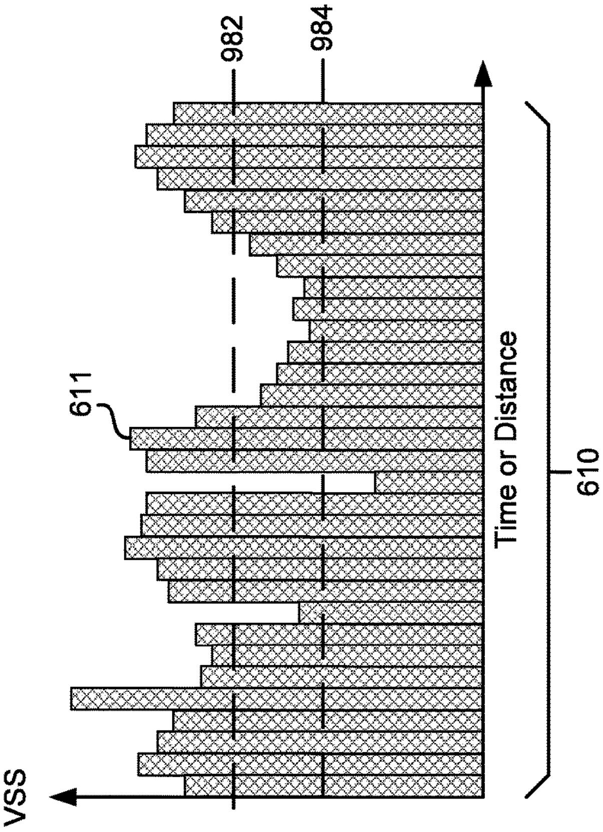
FIG. 19 is a diagram illustrating a VSS 610 including a series of instantaneous VSS 611, according to one example.

Each category of data elements may then have a present score between zero and a maximum value for that category, for example between zero and 100 or between zero and 500. Weightings may also further be applied as a multiple to each category score. A sum of the present available scores for those categories may represent an instantaneous VSS 611 (FIG. 19). For example, a driver who is detected to be presently driving exactly within requirements of the TMS 101 may receive a maximum driver action 618 category score of the instantaneous VSS 611. A sum of instantaneous VSS 611 over a period of time may represent the VSS 610. The VSS 610 and the instantaneous VSS 611 are each a single derived value. In one example, for a set of categories and weightings, the instantaneous VSS 611 and VSS 610 may be expressed as:

$$\text{Instantaneous } VSS\,611 = \sum[(\text{Category}_n)(\text{Category Weighting}_n)],$$

Where each $\text{Category}_n$ may be a sum of data element scores $\Sigma(\text{Data Element Type}_m)$;

VSS 610=Σ(Instantaneous VSS 611) for a time period as defined by the description for FIG. 17

In another example, individual data element types of one or more categories may have weightings different from that of the category weighting. The instantaneous VSS 611 may then be calculated as a sum of data element types multiplied by respective data element type weightings. In other words, a category weighting of a category may not be applied to an entire category, but different weightings may be applied to individual data element types within the category instead, that may result in an instantaneous VSS 611 with a higher degree of granularity. Examples provided below assume a range of zero to 100 for each category type, that category scores are a sum of data element type scores within each category, and additions to or deductions from scores may be occur within category score ranges. Points provided are for illustrative purposes only.

Other examples may assign scores to data element types that form each category or may classify categories themselves as data element types.

Vehicle class 612 may include one or more data elements, processes, or functions used for identifying at least one of, for example, a vehicle classification (e.g. emergency, government, or non-civilian), various types of emergency vehicles (e.g. military, police, fire, ambulance, etc.), civilian, commercial (light, medium, and heavy duty, buses, motor coaches), and private cars, trucks, and low speed vehicles, vehicles belonging to a group (e.g. by location, area, road segment, company, organization, convoy, etc.), motorcycles, scooters, and bicycles, and a registration classification (e.g. private, commercial, government, diplomat, handicapped, school bus, government, etc.). In one example, an emergency vehicle operating in a non-emergency mode may have a vehicle class 612 score of 90 out of 100, and in an emergency mode the vehicle class 612 score may increase to 100 while the vehicle status weighting $W_{616}$ may increase from 2 to 10. In another example, a passenger vehicle may have a vehicle class 612 score of 30 and a vehicle class weighting $W_{612}$ of 1. In another example, a heavy truck may have a vehicle class 612 score of 60 if it is not hazmat classified, and 80 if it is hazmat classified. In another example, a motorcycle may have a vehicle class 612 score of 45. In another example, any vehicle with a registration classification disclosed to the TMS 101 may have an additional 5 points added, up to the maximum category score. Vehicle specification 614 may include one or more data elements, processes, or functions used for identifying or measuring at least one of, for example, a magnitude of vehicle roll, pitch, and yaw, a driving mode of operation (e.g. SAE automated vehicle classification in use) for automated or partially automated vehicles, a vehicle location, speed, acceleration, deceleration, a traffic signal, locations, speeds, accelerations, and decelerations of other vehicles on the road segment, or another metric, a vehicle lateral position or rate of change relative to one or more road lanes or relative to at least one other vehicle, object, or measure of time, a following distance to a leading vehicle, an ADAS activation (e.g. automatic emergency braking, lane departure intervention, or alert event, etc.), a transmission gear or mode selected, a steering angle, a vehicle weight, a lighting status (e.g. of headlights, high beams, turn signals, tail lights, brake light, marker lights, reverse lights, fog lights, etc.), a seatbelt use, a wiper status, a heating, defrost, or air conditioning status, a vehicle system fault code status, an emissions output, an inspection or registration status, a license plate type, a tire pressure, a combination vehicle length (passenger vehicle towing a trailer, truck tractor trailer(s), bobtail tractor), a distance traveled in a zone or area in a time period, and an internal vehicle noise level (e.g. audio volume), and an external vehicle noise level.

In one example, a vehicle detected to have an Anti-lock Braking System (ABS) may have 5 points added to its vehicle specification 614 score. In another example, a vehicle whose only source of propulsion energy is electrical power may have 38 points added to its vehicle specification 614 score, while a vehicle with gasoline-hybrid electric propulsion may have 28 points added to its vehicle specification 614 score. In another example, a vehicle providing an output of a steering angle sensor to the TMS 101 may have 6 points added to its vehicle specification 614 score. Vehicle Status 616 may include a status of one or more data elements, processes, or functions, such as those that may be identified from the above (vehicle specification 614).

In one example, a vehicle detected to be driving at a speed within a percentage of a posted speed limit of a present road segment may have 20 points added to the vehicle status 616 score. In another example, a vehicle detected to have its headlights on during dark periods of a day may have 18 points added to the vehicle status 616 score. In another example, a vehicle detected to be operating with a turn signal on for more than a time period or driving distance may have 15 points deducted from the vehicle status 616 score.

Driver actions 618 or status may include one or more data elements, processes, or functions used for identifying at least one of, for example, a vehicle occupant's status (e.g. a driver or a passenger), a driver operating a steering wheel or device, a throttle control, a brake control, a gear shift or transmission control, a head light control (e.g. low beam, high beam, etc.), a turn signal control, a hazard light control, a horn, a cruise speed control, a seatbelt, a mirror or a windshield wiper, the driver using a mobile device (and a mode of the mobile device), the driver may be using the TMS 101 in a guidance mode by receiving and adhering to guidance provided by the TMS 101, whether the driver may be licensed to drive and/or insured to drive, is a resident of a zone or an area or likely has familiarity with a route (such as based on a number of previous trips, a number, magnitude or rate of steering inputs relative to that needed for a route, or other actions), and may otherwise be assigned a classification, and whether the driver is being sought by law enforcement or emergency services.

Further, driver actions 618 may also include one or more data elements used for identifying at least one of the driver's hand positions on a steering wheel or other device, seating position, head or eye movement, heart rate, blood pressure, perspiration, body or skin surface temperature, a level of distraction, drowsiness, intoxication (such as through Blood Alcohol Content (BAC)), or other impairment may be based on data obtained at least in part through biometric processes, for example, via sensors built into or installed in the vehicle, or wearable devices Sorn by the driver and even configuring to communicate with the TMS 101 such as through smart phone or vehicle CAN bus.

Identity verification of each user associated with a mobile device may be inferred or determined by user inputs such as a password or signature, or biometric information such as use of a fingerprint, a retina or iris pattern, or voice audio. A level of confidence may be assigned by the device or the TMS 101 depending on a type and quantity of inputs used for identity verification. For example, a fingerprint input may provide a higher level of confidence in a user's identity than a level of confidence provided by use of a correct password, while use of both may provide even greater confidence.

If a user is identified or inferred to be a present driver of the vehicle, then a mobile device of the driver may operate in a driving mode. In one example, through movement of the mobile device, insertion or removal of the device from a cradle or docking station, detection of relative movement of the mobile device with the vehicle, or synchronization with a vehicle telematics or infotainment system, a driving mode of the mobile device may be enabled or disabled.

A driving mode of a mobile device may have a different functionality or feature set from a default or normal mode of operation. For example, a driving mode may enable or prioritize certain apps, functions, or features from a normal mode such as limiting, restricting, or disabling at least one of texting, messaging, video displaying, non-emergency phone use (e.g. dialing a number other than 9-1-1), web browsing, emailing, gaming function, or only allowing specific apps or functions or features to be accessible unless the vehicle, or by proxy, the mobile device, is not detected to be moving at speed, and possibly for at least a period of time. Various Driving modes of a mobile device may have varying effects on the driver actions 618 portion of the VSS 610. Functional features or apps that are considered to have a greater effect on driver distraction and road safety may therefore have a commensurate effect upon the VSS 610 of the vehicle when restricted or disabled with use inside the vehicle. Should the driver desire to use features or apps on the mobile device that have been restricted or disabled, the vehicle may be required to come to a stop, and possibly for a minimum elapsed duration of time, before access to those features and apps may be available again. The minimum duration of time may vary, and may be greater than a time until a next red light at a next junction will remain red in a direction of the vehicle direction of travel. In this way, it may be possible to limit texting and driving. Exceptions to disablement of functions, features, and apps may be emergency phone calls and sharing of location for emergency uses. Use of such features may be permissible at some or all times, and may vary by a zone, area, or location of the device.

In another example, cameras, such as those mounted on overhead gantries may record, file, and or process images for purposes related to enforcement against distracted driving. Cumulative VSS impacts may account for known portions of a driver's driving record (e.g. demerit score, driver's license status, restrictions, etc.), unpaid tickets in a zone or an area, and a driver training level such as by a government agency, a third party certification, or through simulator training.

Data describing driver actions may be processed differently at different times, depending on, for example, vehicle location, type of road (e.g. highway, local, parking lot, off-highway), and day and time. One example may be that a vehicle driving in a first direction on a road during a first portion of a day is in compliance with system requirements. However, if the road direction is reversed to a second direction during a second portion of the day, and the vehicle is driven on the road in the first direction during the second portion of the day, then the vehicle and driver are not in compliance with the system requirements and the VSS may be adjusted in a different manner.

In one example, a driver detected not to be using a mobile device while driving, and whose mobile device is operating in a driving mode, may have 60 points added to the driver actions 618 score. In another example, a driver whose BAC is detected to exceed a limit may have his or her VSS privileges suspended, and other actions may be taken by the TMS 101. In another example, a driver detected to have both hands on a steering wheel and a driver's seatbelt is engaged for more than a proportion of driving time, may have 16 points added to the driver actions 618 score.

Navigation adherence 620 may include one or more data elements, processes, or functions used for identifying at least one of, for example, a trip destination, driving on a recommended route, driving on a major road, avoiding a restricted road, adhering to a travel start time, a travel time, a travel speed, or a travel distance, indicating a route flexibility, designating a parking availability and disclosing a parking reservation at a destination, overlapping a route (e.g. repeatedly driving in a same direction, street, zone, or area, etc.), deviating by more than a distance and/or time from an intended or recommended route, possessing a special permit, and indicating a convoy group status.

In one example, a vehicle detected to have a reserved parking space at its may have 22 points added to its navigation adherence 620 score. During times of high traffic volumes in the area of the destination, and a category weighting W620 may be increased from 1 to 3 to emphasize navigation adherence as a component of vehicle priority. In another example, a vehicle that departs from a location within three minutes of a scheduled time may have 17 points added to its navigation adherence 620 score. In another example, a vehicle with a declared route that defers leaving a location in response to a request by the TMS 101 or a navigation system by a time period may have an amount of points added to its navigation adherence 620 score, the amount commensurate with a duration of the time period and/or a condition of traffic on the declared route. In another example, a vehicle may have 40 points added to its navigation adherence 620 score for as long as the vehicle continues on a route provided by a navigation system and/or the TMS 101.

Utilization 622 may include one or more data elements, processes, or functions used for identifying at least one of, for example, a number of vehicle occupants, a destination of a vehicle or at least one vehicle occupant, and each occupant's use of a mobile device that may be assigned to a driver, a user, or a vehicle passenger. A number of confirmed vehicle occupants in a vehicle may affect the VSS 610 of the vehicle. In one example, a vehicle with multiple vehicle occupants may have a higher utilization 622 component and thus the vehicle may have a higher overall VSS 610. In another example, a vehicle with multiple vehicle occupants may have the utilization 622 calculated based on a function of at least one of a user score 608 of each vehicle occupant, and a product or sum of user scores 608 of each vehicle occupant. The function may be linear or non-linear. Non-linear functions may be provide an upper or a lower bound to the influence that the number of vehicle occupants may have upon the utilization 622 for a class of vehicle. Further, a weighting of a user may be higher as a driver compared with the weighting of the user as a passenger for a purpose of detecting vehicle occupancy. In another example, a vehicle with multiple vehicle occupants may have the utilization 622 calculated based on, at least in part, one or more known trip destinations for at least one vehicle occupant, and trip routing may be determined, at least in part, by one or more known trip destinations. In other words, the more defined the trip destinations, the more defined the route may be, and the more impact the utilization 622 may have upon the VSS 610. In another example, the higher a ratio of vehicle occupants to known trip destinations, the higher the utilization 622 of the vehicle may be over the course of a trip. In yet another example, a function based on a relationship between estimated or actual passenger distance and vehicle distance for a trip route may impact the VSS 610 of a vehicle. Analogous may also be used for freight movement, for example a relationship between mass-distance (or volume-distance) and vehicle distance traveled for a route. In yet another example, an emergency vehicle operating in an emergency mode may have a utilization 622 and/or a VSS 610 within a highest possible range of values providing the emergency vehicle with priority over any non-emergency vehicle.

In one example, a number of vehicle occupants may be inferred by the TMS 101 through detection by time and location on similar path by analysis of at least one of a wireless communication, a GPS signal, and/or another way of detection of at least one mobile device in the vehicle. In another example, seatbelts or weight sensors in vehicle seating systems may be used to detect the presence of vehicle occupants.

Further, in addition to previously stated ways of confirming a user identity for a mobile device, to prevent a vehicle occupant from artificially inflating the number of vehicle occupants by using multiple mobile devices, the TMS 101 may communicate with the mobile devices in question at random times whether the mobile devices or in the vehicle or not to detect, estimate, infer, or confirm the status of the mobile device as that of a present driver of the vehicle or that of a passenger. Examples include at least one of calling at least one mobile device, providing a prompt to a mobile device to confirm operation mode, and detecting a motion of the mobile device relative to that of the vehicle or removal of the mobile device from a cradle or docking station.

Further, a response to any of the mobile devices may be compared with a driving pattern of the vehicle by the TMS 101 to discern or correlate whether indicators of distracted driving are likely to be occurring concurrently with inputs to at least one mobile device. Indicators of distracted driving may include, for example, varying vehicle speed, a statistically significant or otherwise quantifiable speed difference with other traffic, the vehicle weaving in a lane or across lanes, and vehicle turn signal activation for a distance greater than that between the vehicle and one or more upcoming junctions or as the vehicle travels on only one road segment for more than a predetermined distance or more than a predetermined time period.

In one example, a vehicle detected to have a more than one person aboard may have 10 points added to its utilization 622 score. During times of high traffic volumes in the area of travel a category weighting W622 may be increased from 1 to 5 to emphasize utilization as a component of vehicle priority. In another example, a commercial truck that is known to be carrying a load of cargo may have 12 points added to its utilization 622 score. In another example, a vehicle may have between 20 and 60 points added to its utilization 622 score depending on a number of confirmed passengers aboard the vehicle. Passengers may be counted through use of smart devices and/or cameras to identify and confirm their presence.

Boost 624 may include one or more data elements, processes, or functions used for identifying at least one of, for example, a frequency of use of the TMS 101 relative to travel in a zone or an area, an allotment of VSS points from a user's account toward increasing the VSS 610 for a time period or distance traveled, by a location such as in a zone, an area, on a road segment, or a specific destination, and an addition of VSS points to a user's account or from a source other than the user's account.

VSS points may be digital credits that may be received either through activity (e.g. earned through performance), purchase, or transfer from another account or source, and then used at a later time. VSS points may be classified by class, and each class of VSS points may have a distinct set of constraints or restrictions related to duration or use, such as an expiration date or time, a numerical limit of points that may be used together, a time period or date range when each class of VSS points can or cannot be used, and eligible purposes or locations where each class of VSS points may be used.

In one example, a user or a third-party adds boost points to a user's boost 624 score. Each boost point added may result in a commensurate number of points increase in the user's (and therefore the vehicle's) boost 624 score for some period of time or trip distance such as the addition of one boost point results in 10 points added to the boost 624 score for a next 10 miles or next 20 minutes. In another example, a user or a third-party adds 3 boost points to increase the user's boost score 624 by 15 points for a duration of a trip. In another example, a third-party adds 2 boost points to increase the user's boost score 624 by 8 points for a next 5 miles and the user is informed of the addition by the TMS 101 or a navigation system. In another example, a third-party adds 5 boost points to increase the user's boost score 624 by 20 points for a specific route, such as one that goes to a specific location defined by the third-party and agreed to by the user.

The vehicle's VSS 610 or average VSS may be compared with or ranked relative to a second VSS or average VSS of a second vehicle or a number of vehicles, such as those of vehicles operating in a zone or an area, on an absolute or relative basis, or compared with those of all other vehicles known to the TMS, and so on. In one example, the VSS of a first vehicle is compared to the VSS of a second vehicle, the vehicle with the higher VSS during a time period (e.g. a previous one, five, fifteen, and sixty minutes) may have greater priority. In another example, the vehicle with the higher VSS or average VSS over a previous five, twenty or one hundred miles may have greater priority.

Figure 16B:
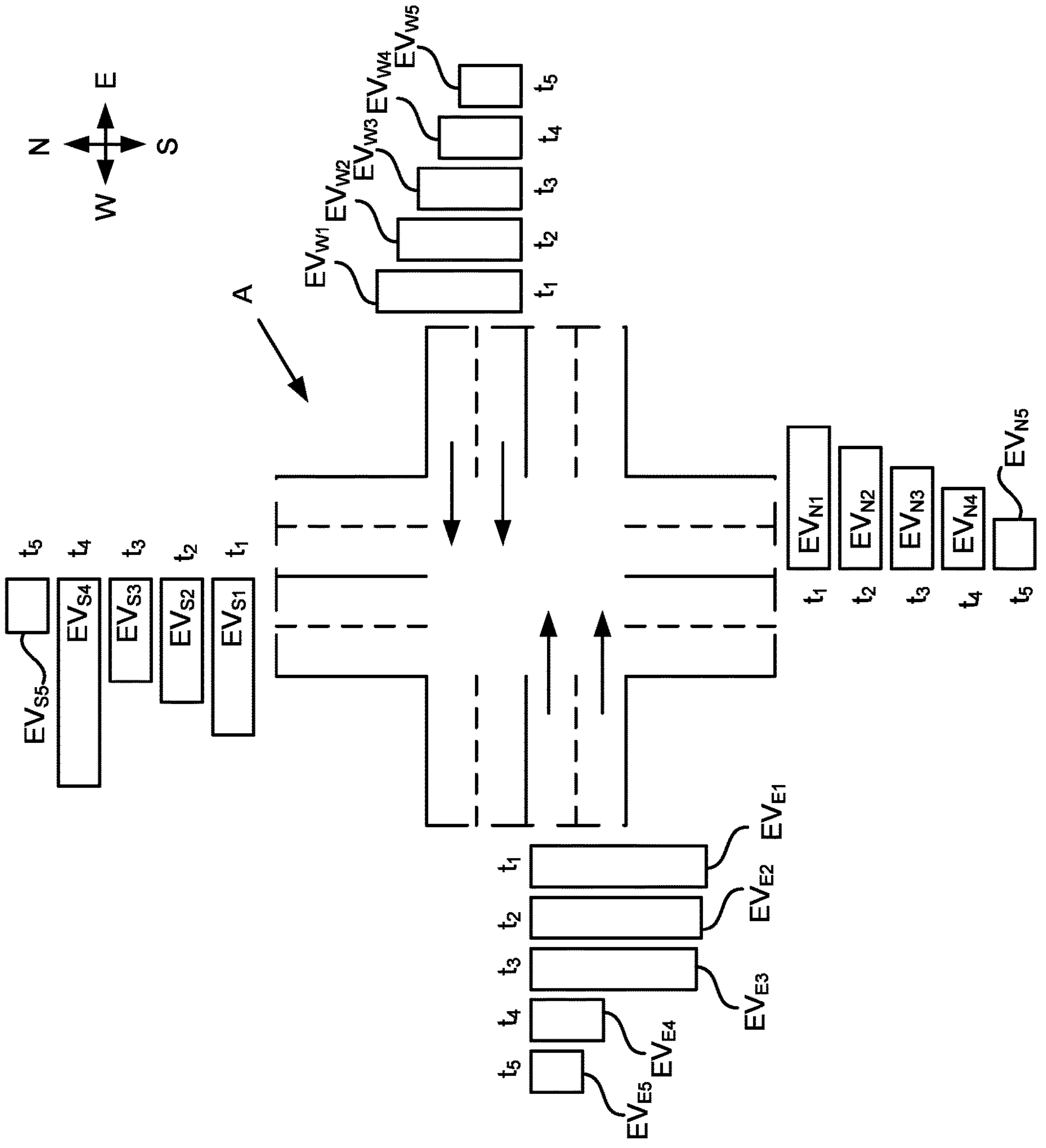
FIG. 16B is a diagram indicating magnitudes of traffic demand approaching the junction A from each direction, according to one example.

FIG. 16B is a diagram indicating magnitudes of traffic demand approaching the junction A from each direction, according to one example. While similar to that described in FIGS. 8B2 and 8C3 in that vehicles may be counted from each direction approaching the junction A to calculate traffic demand, the traffic demand may then be weighted by not only time period (or distance) but also by priority or VSS of each vehicle and, where available, knowing a navigation route of the vehicle.

A first vehicle that has a VSS may thus have a weighting that is multiples of a second vehicle that may not have a VSS. This is because the first vehicle may be more predictable than the second vehicle. Further, the intended route of the first vehicle may be disclosed, making it possible for the TMS 101 to calculate when to change a traffic signal for the first vehicle, while the second vehicle may not even be known to the TMS 101. The relative VSS of the first vehicle may be greater than one compared with the second vehicle that is only counted numerically (i.e. VSS effectively=1). Then due to having a disclosed route, the EV of the first vehicle relative to the junction A is closer to 1 (even approximately =1) even at some distance from the junction A, while the EV of the second vehicle relative to the junction A is only a fraction of 1 the further it is away from the junction A.

The EV of the first vehicle relative to the junction A may still increase as it gets closer to the junction A for the same reasons as with previously described scenarios of vehicles without a disclosed route. However, the rate of increase of the EV of the first vehicle may be lower due to the first vehicle starting from an already high EV relative to the junction A due to its disclosed route that passes through the junction A. Further, a spatial relationship between the junction A and another junction B, such as described by FIGS. 8C1 and 8C2, may allow at least one junction weighting (JW) to be applied by the TMS 101 to adjust traffic signal timing based on traffic demand or EV from one junction to another.

For example, as a traffic demand is detected to approach the junction B, a portion of the traffic demand will exit the junction B and approach the junction A from the west along road segments BA1, BA2 and BA3. In a case at least a portion of the traffic demand is from vehicles with a VSS and disclosed route that passes through the junctions A and B, an EV for each of those vehicles may be calculated and represented as $EV_{E3}$, $EV_{E2}$ and $EV_{E1}$ approaching the junction A. The expected values $EV_{E3}$, $EV_{E2}$ and $EV_{E1}$ may each have a smaller delta between them than if the vehicles in those respective time periods ($t_1$, $t_2$, $t_3$) did not have disclosed routes, as their respective EV amounts would increase from much lower values as the vehicles approached the junction A. In other words, the slope of the line between a vehicle's EV from a longer time period out from a junction to the vehicle's EV at a time period closer to the junction is steeper for a vehicle that does not have a disclosed route since the vehicle's EV may be a function of the vehicle's distance from the junction.

An EV of an approaching vehicle or of a time period may be multiplied by a JW of a junction or a directional portion of the JW (the JW may also be a sum of directional junction weightings of the junction's directions). The JW may serve as an indicator of relative significance of a first junction compared to a second junction, and the relative significance of the vehicle or time period (by way of EV) may allow calculation of a relative significance of traffic demand from one junction to a next and/or a relative significance of traffic demand in one through direction of a junction compared with another through direction of the junction.

The JW of the junction A may be equal to a sum of the JW of each direction of approach, expressed as $JW_{AN}+JW_{AW}+JW_{AE}+JW_{AS}$. The JW of each direction may be a predetermined value or adjusted dynamically, such as by time of day, day of the week, or based on traffic conditions.

In one example, $JW_A=1$, with the JW of each of four directions equal to 0.25. If the $JW_A$ is then compared to that of another junction, such as $JW_B$, and then scaled up or down relative to $JW_B$, for example $JW_A$ is scaled up to 1.2, the proportions of the four $JW_A$ directions may remain the same, and each $JW_A$ direction would have a value of 0.30. In other examples, the proportion of the $JW_A$ directions may not be equal but do sum to equal the value of a scaled $JW_A$.

FIG. 17 illustrates a graph of a number of elements of the VSS 610 relative to a time scale, according to one example. Each of the elements of the VSS 610 may have a weighting (described in FIG. 16A) and a separate time-based persistence.

Each element of the VSS 610 may have a start time prior to a current time t. Start times of each element may vary. The VSS 610 may include at least one of a status detected (e.g. binary), an average calculation, an instantaneous calculation or measurement for at least one of a status detected, an element, a weighted calculation, and a cumulative calculation. Alternatively, each category of the VSS 610 may have an average calculation, an instantaneous calculation or measurement, a weighted calculation, and a cumulative calculation.

The VSS 610 may be assigned a persistence on the basis of a rolling or weighted average over time of at least one element. For example, the VSS 610 may use data from some or all available elements detected or calculated during a period of time of a prior trip, such as an immediate past trip, and may use that data for at least some period of time of a current trip.

Further, data from the prior trip may be raw data and may or may not include past weighting and/or persistence information for the VSS 610, or data or calculations related to the VSS of other vehicles, or relative to a location, a zone, an area, and for a route or roads traveled.

In one example, at least one minute of data of a prior trip may be used in calculations for a first portion of a current trip. In another example, approximately one to five minutes of data from a prior trip may be used in calculations for at least a portion of a current trip. In another example, approximately up to an hour of data from a prior trip may be used in calculations for at least a portion of a current trip. In another example, from approximately one to 24 hours of data from a prior trip may be used in calculations for at least a portion of a current trip. In another example, data from within certain areas or locations may be used in calculations for at least a portion of a current trip. In yet another example, up to all available prior trips, either of a same mode of transportation or from at least two modes of transportation, may be used in calculations for at least a portion of a current trip.

Weighting and persistence of each element of the VSS 610 may also be varied based on a present environment, a zone, or an area to, for example, place greater or lesser emphasis on certain elements (e.g. speeding or texting in a school zone, construction zone, or at other times). The VSS 610 may be dynamic and change with time during a trip, the VSS 610 (or elements of the VSS 610) having a persistence spanning a period up to time t, where t represents present time. Times $t_A$, $t_B$, $t_C$, $t_D$, and $t_E$ represent previous start times, respectively, from which one or more elements of the VSS 610 may be used in calculating the VSS 610 to the present time t.

Each element, or category of elements, of the VSS 610 may have a persistence that may vary from that of other elements or categories. The effect of an element on the VSS 610 may then be, at least partially, a function of the persistence and magnitude of the element.

In some cases, an element may not have a persistence. In such cases, a proxy value may be substituted or assigned for calculations where needed. For example, an element with a binary status such as whether a vehicle has reserved parking (or parking is estimated to be available) at an intended destination may only have an instantaneous VSS 611 value and no persistence. However, providing confirmation to the TMS 101 that the vehicle does or does not have reserved parking at the intended destination may result in assignment of a proxy value as the vehicle approaches within a distance or arrival time estimate of the intended destination.

In effect, the persistence of an element may be used to assign a time or distance weighting to the element in the process of calculating the VSS 610. In one example, a longer persistence may provide an element with a greater overall weighting within the VSS 610 while a shorter persistence may provide the element with a lesser overall weighting within the VSS 610. Further, the instantaneous VSS 611 may be compared with the VSS 610 determined over a longer period of time.

Dependencies or conditional relationships may exist between elements. For example, if only an emergency vehicle may operate in an emergency mode then no other vehicle classes could have an emergency mode status of "on". In another example, a commercial vehicle may have different navigation adherence conditions to restrict the commercial vehicle from certain roads, either altogether or during certain time periods while private passenger automobiles may have different constraints.

Further, each vehicle or user may be assigned a separate demerit score (described above with reference to FIG. 15) upon detection of a violation, depending on severity or timing. For example, a vehicle is detected to have run a red light by a time tR after the light has turned red. In one example, the time tR may be three seconds. In another example, the time tR may be ten seconds. In another example, a demerit score may be assigned if the time tR is in the range of one to four seconds, and a second demerit score may be assigned if the time tR is greater than four seconds. The demerit score may be distinct and separate from the VSS 610 though the demerit score may have an effect on how the VSS 610 or elements of the VSS 610 are determined or utilized. Or the demerit score may be deducted from the VSS 610 and/or the instantaneous VSS 611.

Figure 18:
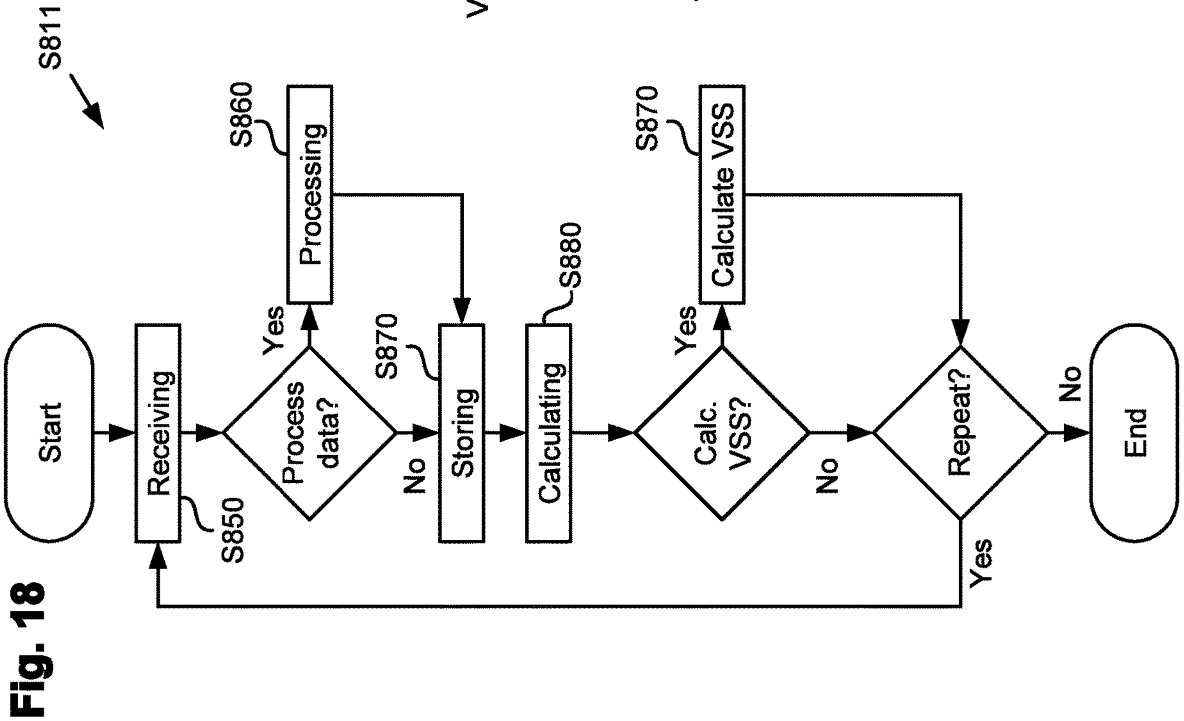
FIG. 18 is a diagram for a process S811 for determining an instantaneous VSS 611, according to one example.

FIG. 18 is a diagram for a process S811 for determining an instantaneous VSS 611, according to one example. The diagram may include a number of primary and secondary processes used for determining the instantaneous VSS 611 of a vehicle including the process of receiving S850 each element which may be received from a number of data sources, processing S860 the data for each element that may be received, including by a secondary process, to ensure the data is in a usable format for calculating including assigning points values to data that must first be related to a format of an instantaneous VSS 611 (e.g. receipt of a vehicle VIN must be converted to an instantaneous VSS 611 points value), and storing S870 at least one of the data for each element and the processed data for each element in a memory, and calculating S880, based at least in part on an output of a processing S860 and/or a storing S870 process, to determine the instantaneous VSS 611, and then to record the instantaneous VSS 611 to a memory or otherwise communicate the instantaneous VSS 611 or a VSS 610 to the TMS 101. The storing S870 process may store data in temporary or volatile memory for use during the calculating S880 process. Upon completion of the calculating S880 process data may be moved from volatile memory to non-volatile memory for later retrieval or deleted.

The calculating S880 may include comparing at least one of a stored data of an element in the memory and/or a processed data of the element in the memory. Further, the process S811 may also allow for determining the VSS 610, as explained in the description for FIG. 16A. Secondary processes may include processes for collecting and/or processing data related to specific elements of the instantaneous VSS 611 and the VSS 610. Specific elements may include at least one of categorized data and uncategorized data, for example, categories enumerated by FIG. 16A. Elements of the instantaneous VSS 611 and the VSS 610 (terms which may be used interchangeably at times), and values assigned to the elements, that are disclosed to, or detected, determined, estimated, or inferred by the TMS 101 may include, but are not limited to, example categories described by FIG. 16A including vehicle class, vehicle specification, vehicle status, driver actions, and so on. Further, elements may be classified in more than one category or in categories that differ from those described. Each process may occur anywhere within the TMS 101 or via systems, devices, and/or components in communication with or connected to the TMS 101, and include steps to communicate between components, devices, or systems. Example information that may be determined by data provided by mobile devices such as smartphones, and not in communication with a vehicle, include acceleration data in multiple axes, GPS and location data, and a number of vehicle occupants. Example information that may be determined by data provided by vehicle sensors and data networks include wheel speed, vehicle fuel economy, and vehicle steering angle. Example information that may be determined by data provided by sensors or detectors at roadside and connected to the TMS 101 include identifying a vehicle presence (e.g. counting a vehicle), identifying a lane of a road a vehicle is located in, a vehicle speed, and a vehicle license plate number. Some types of information may be obtained from more than one of the exemplary sources stated.

In one example, the TMS 101 or a system configured to communicate with the TMS 101 may calculate an instantaneous VSS 611 element of a vehicle pertaining to vehicle speed. A GPS capability aboard the vehicle, such as via a smartphone or a navigation system built into the vehicle, may provide a series of date/time and lat/long coordinates to the TMS 101. The TMS 101 may then process the data to ensure it is from one of a set of usable data formats, proceed to storing the data in a memory, and then calculate the vehicle speed by comparing changes in GPS location data with respect to time. Further, if a vehicle speed sensor output is available, that data may also be received by the TMS 101, processed (and time-stamped), stored, and incorporated in the vehicle speed calculation, such as by converting the speed sensor output signal to a speed, and comparing the result with the vehicle speed calculated from GPS coordinates.

FIG. 19 is a diagram illustrating a VSS 610 including a series of instantaneous VSS 611, according to one example. The VSS 610 may be determined from a setoff instantaneous VSS 611, for example, as a summation, or function thereof, over a time or distance based series of instantaneous VSS 611. The VSS 610 may not be formed by consecutive instantaneous VSS 611 and may be calculated from a number of instantaneous VSS 611 calculated at one or more data sample rates. In one example, VSS points may be earned during at least a portion of a time period a VSS 610 and/or an instantaneous VSS 611 of a vehicle is detected by the TMS 101 to be operating above a first threshold 982, indicating a driver is performing above a predetermined level, and may include purchase and/or use of VSS points, or VSS points received from another party, such as a reward for purchase of certain goods, services, or for other actions by the user or the vehicle, or given or assigned to the vehicle or the user by another party.

The first threshold 982 may be, for example, an average of the VSS of a number of vehicles in a zone or an area, or another baseline. Further, if the VSS 610 of the vehicle is detected by the TMS 101 to be below the first threshold 982 or a second threshold 984 (the first threshold 982 may be equal to the second threshold 984), indicating the user is not performing to a predetermined level, VSS points may be deducted from the user's account by a predetermined amount or at a predetermined rate, while a value may be added to the user's demerit score. Actions by the user to receive VSS points may include at least one of maintaining, as a driver, the VSS 610 of a vehicle above the first threshold 982 for a time period or distance traveled, traveling in or to a zone, area, road segment, or location within a time period, on a specific day, or to be present at a specific day or time, and/or completing an action offered or requested. Rewards may include additional points for a user's account, a vehicle or a user receiving a larger number or proportion of green lights when approaching signalized junctions, reduced wait times, parking reservations and discounts, fuel purchase discounts, incentives on public transportation, and perks from governments, organizations and businesses that benefit from a user's usage of the TMS 101, such as by having the ability to anticipate arrival and travel times with a greater degree of confidence. Rewards may be provided by third parties in exchange for a user performing an action. Actions may include traveling to or remaining at or within a specific location at or for a certain time. Rewards for such actions may have a dynamic component that accounts for current traffic levels and/or a number of passengers in a vehicle (utilization 622) to encourage users to reduce or defer driving during periods of heavy traffic in a zone or area. VSS points may be fungible and transferable to one or more users or vehicles, and may reside with the user's account or the vehicle's account, and may serve as a type of digital currency.

In one example, VSS points may accumulate in a user account, during or for a time period a VSS 610 and/or an instantaneous VSS 611 of a vehicle is detected by the TMS 101 to be operating above the first threshold 982, and/or VSS points may not be deducted from a user account for time periods or events where the VSS 610 and/or instantaneous VSS 611 of the vehicle is detected by the TMS 101 to be below the first threshold 982 or the second threshold 984.

In another example, VSS points may accumulate in a user account, during or for a time period a VSS 610 and/or an instantaneous VSS 611 of a vehicle is detected by the TMS 101 to be operating above the first threshold 982, and VSS points may be deducted from a user account for time periods or events where the VSS 610 and/or the instantaneous VSS 611 of the vehicle is detected by the TMS 101 to be below the first threshold 982 or the second threshold 984. VSS points may be deducted from the user's account by a fixed amount or at a rate during such time periods.

In another example, VSS points may accumulate in a user account during or for a time period a VSS 610 and/or an instantaneous VSS 611 of a vehicle is detected by the TMS 101 to be operating above the first threshold 982, and VSS points may not be deducted from a user account for time periods or events where the VSS 610 and/or an instantaneous VSS 611 of the vehicle is detected by the TMS 101 to be below the first threshold 982 or the second threshold 984. However, at least one value may be added to the demerit score of the user's account.

Figure 20:
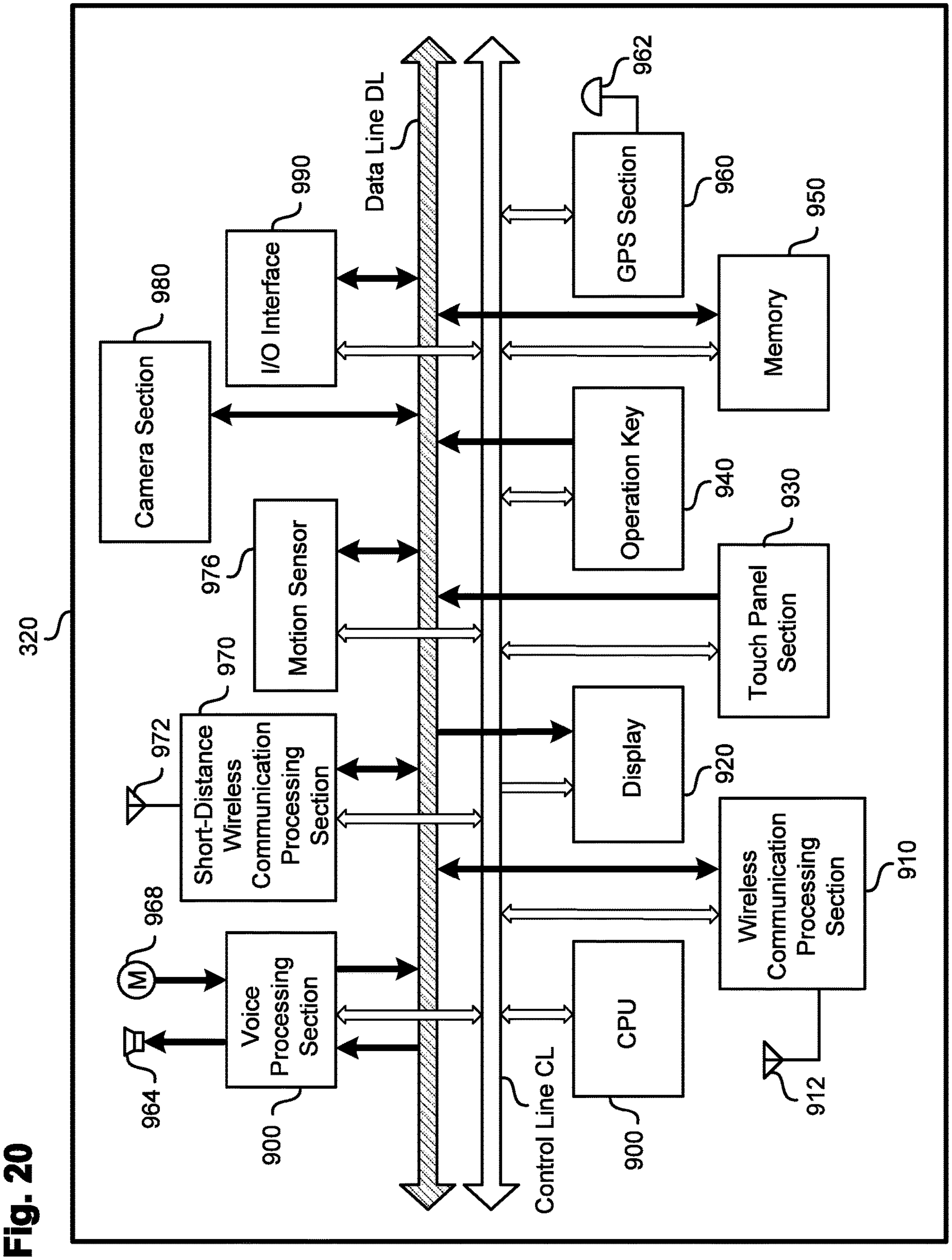
FIG. 20 is a block diagram illustrating the controller 320 for implementing the functionality of the mobile device 322 described herein, according to one example.

FIG. 20 is a block diagram illustrating the controller 320 for implementing the functionality of the mobile device 322 described herein, according to one example. The skilled artisan will appreciate that the features described herein may be adapted to be implemented on or with a variety of devices (e.g. a laptop, a tablet, a server, an e-reader, a navigation device, etc.). The controller 320 may include a Central Processing Unit (CPU) 900 and a wireless communication processor 910 connected to an antenna 912.

The CPU 900 may include one or more CPUs 900, and may control each element in the controller 320 to perform functions related to communication control and other kinds of signal processing. The CPU 900 may perform these functions by executing instructions stored in a memory 950. Alternatively or in addition to the local storage of the memory 950, the functions may be executed using instructions stored on an external device accessed on a network or on a non-transitory computer readable medium.

The memory 950 may include but is not limited to Read Only Memory (ROM), Random Access Memory (RAM), or a memory array including a combination of volatile and non-volatile memory units. The memory 950 may be utilized as working memory by the CPU 900 while executing the processes and algorithms of the present disclosure. Additionally, the memory 950 may be used for long-term data storage. The memory 950 may be configured to store information and lists of commands.

The controller 320 may include a control line CL and data line DL as internal communication bus lines. Control data to/from the CPU 900 may be transmitted through the control line CL. The data line DL may be used for transmission of data.

The antenna 912 may transmit/receive electromagnetic wave signals between base stations for performing radio-based communication, such as the various forms of cellular telephone communication. The wireless communication processor 910 may control the communication performed between the controller 320 and other external devices via the antenna 912. For example, the wireless communication processor may control communication between base stations for cellular phone communication.

The controller 320 may also include at least one of the display 920, a touch panel 930, an operation key 940, and a short-distance communication processor 970 connected to an antenna 972. The display 920 may be a Liquid Crystal Display (LCD), an organic electroluminescence display panel, or another display screen technology. In addition to displaying still and moving image data, the display 920 may display operational inputs, such as numbers or icons which may be used for control of the controller 320. The display 920 may additionally display a GUI for a user to control aspects of the controller 320 and/or other devices. Further, the display 920 may display characters and images received by the controller 320 and/or stored in the memory 950 or accessed from an external device on a network. For example, the controller 320 may access a network such as the Internet and display text and/or images transmitted from a web server.

Touch panel 930 may include a physical touch panel display screen and a touch panel driver. The touch panel 930 may include one or more touch sensors for detecting an input operation on an operation surface of the touch panel display screen. The touch panel 930 also may detect a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 930 may detect when the stylus approaches/contacts the operation surface of the touch panel display (similar to the case in which a finger is used for the touch operation).

In certain aspects of the present disclosure, the touch panel 930 may be disposed adjacent to the display 920 (e.g. laminated) or may be formed integrally with the display 920. For simplicity, the present disclosure assumes the touch panel 930 is formed integrally with the display 920 and therefore, examples discussed herein may describe touch operations being performed on the surface of the display 920 rather than the touch panel 930. However, the skilled artisan will appreciate that this is not limiting.

For simplicity, the present disclosure assumes the touch panel 930 is a capacitance-type touch panel technology. However, it should be appreciated that aspects of the present disclosure may easily be applied to other touch panel types (e.g. resistance-type touch panels) with alternate structures. In certain aspects of the present disclosure, the touch panel 930 may include transparent electrode touch sensors arranged in the X-Y direction on the surface of transparent sensor glass.

The operation key 940 may include one or more buttons or similar external control elements, which may generate an operation signal based on a detected input by the user. In addition to outputs from the touch panel 930, these operation signals may be supplied to the CPU 900 for performing related processing and control. In certain aspects of the present disclosure, the processing and/or functions associated with external buttons and the like may be performed by the CPU 900 in response to an input operation on the touch panel 930 display screen rather than the external button, key, etc. In this way, external buttons on the controller 320 may be eliminated in lieu of performing inputs via touch operations, thereby improving water-tightness.

The antenna 972 may transmit/receive electromagnetic wave signals to/from other external apparatuses, and the short-distance wireless communication processor 970 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 970.

The controller 320 may include a motion sensor 976. The motion sensor 976 may detect features of motion (i.e., one or more movements) of the controller 320. For example, the motion sensor 976 may include an accelerometer to detect acceleration, a gyroscope to detect angular velocity, a geomagnetic sensor to detect direction, a geo-location sensor to detect location, etc., or a combination thereof to detect motion of the controller 320. In certain embodiments, the motion sensor 976 may generate a detection signal that includes data representing the detected motion. For example, the motion sensor 976 may determine a number of distinct movements in a motion (e.g., from start of the series of movements to the stop, within a predetermined time interval, etc.), a number of physical shocks on the controller 320 (e.g., a jarring, hitting, etc. of the electronic device), a speed and/or acceleration of the motion (instantaneous and/or temporal), or other motion features. The detected motion features may be included in the generated detection signal. The detection signal may be transmitted, e.g., to the CPU 900, whereby further processing may be performed based on data included in the detection signal. The motion sensor 976 can work in conjunction with a Global Positioning System (GPS) section 960. The GPS section 960 may detect the present position of the controller 320. The information of the present position detected by the GPS section 960 may be transmitted to the CPU 900. An antenna 962 may be connected to the GPS section 960 for receiving and transmitting signals to and from a GPS satellite.

Figure 21A:
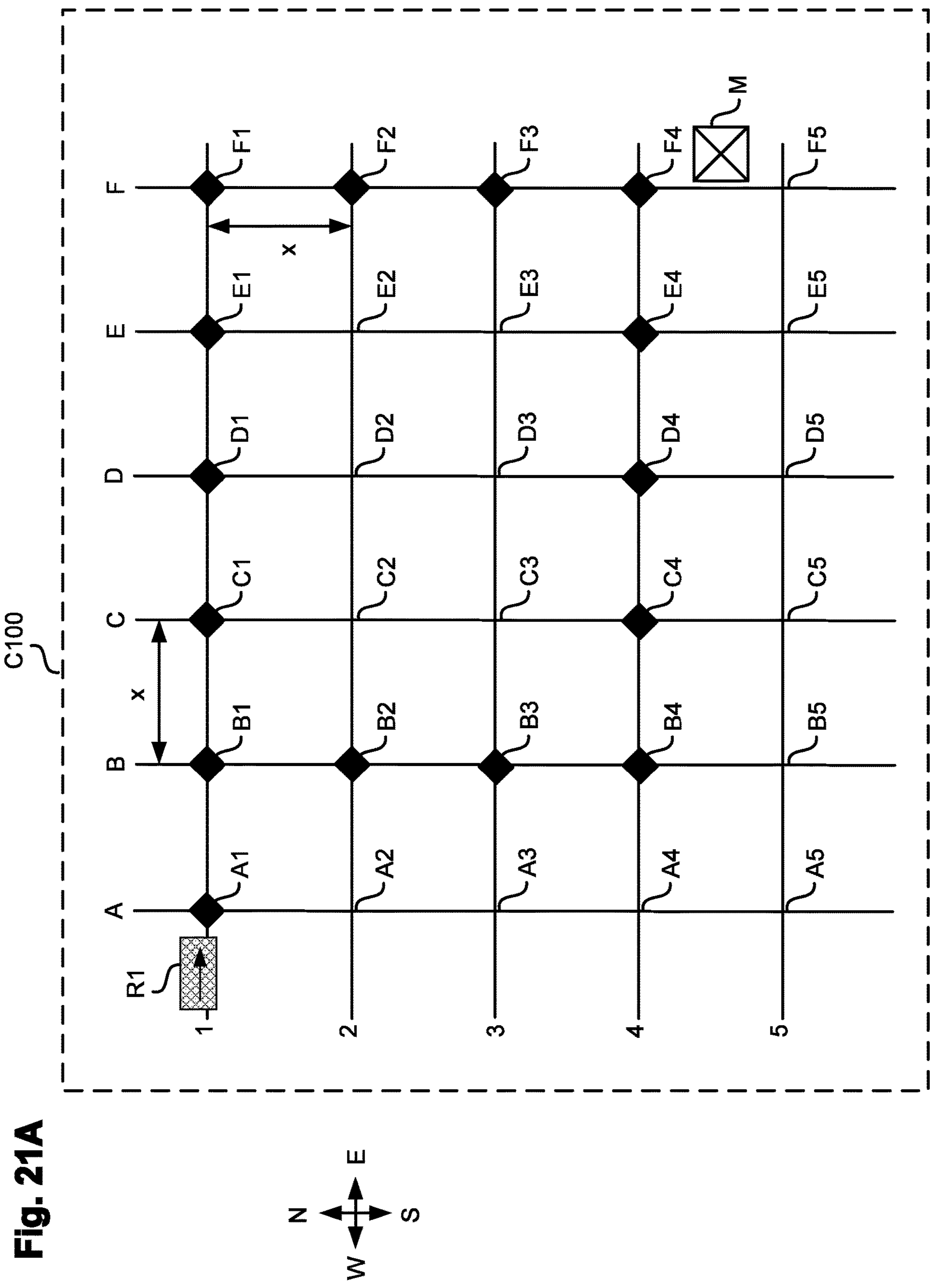
FIG. 21A illustrates the vehicle R1 traveling in an area C100, according to one example.

FIG. 21A illustrates the vehicle R1 traveling in an area C100, according to one example. The area C100 represents a grid of junctions formed by a number of roads designated road A through road F, each located in a north-south direction, and a number of roads designated road 1 through road 5, each located in an east-west direction. Each junction may be identified by a combination of a north-south road and an east-west road. For example, a junction B2 is the junction of road B and road 2. Junctions A1 through F5 may be signalized four way junctions, may be identical or similar to that of junction A (FIGS. 5A-5H), and have a variety of possible traffic movements. Some or all of the traffic signals at the junctions A1 through F5 may be adaptive and connected to the TMS 101, or a TSS 348 at one or more junctions on the route of the vehicle R1.

In one example, the junctions may all be equally spaced a distance x apart in both the north-south direction and the east-west direction, and the distance x may be 0.5 mile. The vehicle R1 may be located on road 1 west of road A and approaching the junction A1, and may be driving to a destination M located between road 4 and road 5, on an east side of road F. In one case, each road may allow two-way traffic, and left and right turns may be made from any direction of a junction. Junctions shown with diamonds (e.g. junctions B1, C4, etc.) indicate a junction located on one or more exemplary routes of the vehicle R1.

In a case a location and heading of the vehicle R1 or other relevant information of the vehicle R1, such as estimated arrival time (ETA) at a junction, may be communicated to the TMS 101, or a TSS 348. The TMS 101 may adjust signal timing of a next junction, for example, that of junction A1 to provide a green traffic signal in a direction of travel of the vehicle R1 prior to arrival of or to minimize a delay of the vehicle R1 as the vehicle R1 approaches junction A1.

In a case the location, heading, and destination M of the vehicle R1 or other relevant information, such as ETA of the vehicle R1 at one or more junctions is communicated to, or known or generated by the TMS 101, the TMS 101 may adjust traffic signal timing at some or all of the junctions between the vehicle R1 and the destination M, and may adjust signal timing at a next junction on the route of the vehicle R1, or other junctions in communication with the TMS 101, to adjust traffic signal timing so as to decrease or increase estimated travel time and delay of the vehicle R1.

The TMS 101 may estimate, calculate, or be provided with an average speed or travel time of the vehicle R1 between any two points on the route such as average speed or time between junctions, speed or time to negotiate various types of turns (e.g. 90 degree right turn, 90 degree left turn, 180 degree U-turn, turns of other angular magnitudes, etc.) or combinations of turns, and delays from external conditions such as pedestrian movements, slowing or stopping for traffic signals and traffic queues, weather conditions, construction, parking, and other activities.

Estimated speed or time may be based on a variety of data, for example, present average speeds of one or more vehicles on or near the route of the vehicle R1, one or more present speed limits on or near the route of the vehicle R1, or calculations using historical data and/or distance between measurement locations. Historical data may include information such as vehicle, pedestrian, bicyclist, device (e.g. Bluetooth), and other movement data, traffic signal timing plans, operating modes and/or status, event schedules, fire, rescue and police records, insurance records, school hours, transit or school bus schedules, and/or hours of operation of businesses, establishments and institutions. A travel time for the vehicle R1 to arrive at the destination M may be estimated by a sum of time for the vehicle R1 to drive each road segment of the route, negotiate turns, and await any delays.

An exemplary route for the vehicle R1 may be to drive east on road 1, turn right at junction F1 and drive south on road F, and turn left at a destination M. The time for arrival of the vehicle R1 at the destination may be defined by summing the estimated travel time of each road segment of the route and adding or subtracting estimated times for certain factors such as turns and delays.

In a case an average speed of the vehicle R1 between junction A1 and junction F1 is estimated to be 45 mph, and between junction F1 and junction F4 an average speed is estimated to be 30 mph, a travel time for the vehicle R1 to arrive at the destination M may be estimated.

An exemplary second route for the vehicle R1 may be to drive east on road 1, turn right at junction B2 and drive south on road B, turn left at junction B4 and drive east on road 4, turn right at junction F4 and drive south on road F, and turn left at the destination M.

In a case average speeds of the vehicle R1 are estimated to be 45 mph for the road segment between junction A1 and junction B1, 30 mph between junction B1 and B4, 45 mph between junction B4 and junction F4, and 30 mph between junction F4 and the destination M, a second travel time for the vehicle R1 to arrive at the destination may be estimated by a sum of times for the vehicle R1 to drive each road segment of the second route, negotiate turns, and await any delays as described above.

Conversely, time durations for unexpected and unspecified activities are not possible to predict, and thus may be estimated by assigning one or more time constants to certain changes in vehicle speed, location, or other conditions that may be known such as if the vehicle R1 hazard lights are activated, and/or if the vehicle R1 comes to a stop in an unexpected location such as between two junctions and the next traffic signal is known to be green for the vehicle and there is no known traffic queue. Instances of time for the vehicle R1 to turn may be considered a subset of delay times.

Routes described above are two of multiple exemplary routes that the vehicle R1 may be guided on by the TMS 101 or a navigation system to arrive at destination M. The routes may be calculated by a third-party application, such as a mapping and navigation API.

In another example, the vehicle R1 deviates from a route provided, such as the first route described above, driving east on road 1 and turning right at junction D1 and driving south on road D. In a case the vehicle R1 continues to drive, the TMS 101 may assume the vehicle R1 is still heading toward destination M, and recalculates a route and travel time from a present location of the vehicle R1 to the destination M. Signal timing may be adjusted for some or all of the junctions on a recalculated route of the vehicle R1, and possibly for the junctions located on a previous route the vehicle R1 had been provided guidance for. Also, other dynamic traffic control elements and systems may be adjusted in relation to the vehicle R1 such as speed limits, pedestrian signals, and other road side signage, as well as vehicle or user (e.g. driver VSS) guidance and scoring. New travel time may be calculated and provided to the vehicle R1 or user.

Further, the VSS of the vehicle R1 may be adjusted, for example the VSS may be lowered by the TMS 101, due to the vehicle R1 deviating from the route provided. The magnitude of adjustment of the VSS may be based on a function, such as one based on a distance, a number of turns, a direction, a traffic volume on one or more road segments of the route provided, another road segment or other route.

In a case the vehicle R1 stops for more than a time tSTOP at a location other than expected, the TMS 101 may query a user in the vehicle R1 whether to change, pause, or cancel a route provided for the vehicle R1.

The TMS 101 may provide the user or the vehicle R1 with guidance and/or adjust signal timing at a junction the vehicle R1 is approaching to provide a green light signal, to decrease, or increase delay of the vehicle R1, and may, for example, include use of a buffer length $L_{FL}$ and/or a drive length $L_{DL}$ in such calculations (see FIG. 9). The TMS 101 may adjust signal timing of a variety of traffic signals located at junctions other than the nearest or next junction on the route of the vehicle R1 for the purpose of meeting at least one of the operating mode objectives of the TMS 101, such as minimizing average travel time, total travel time, or maximizing vehicle throughput of roads in an area or zone.

A primary objective to keeping traffic flowing smoothly is dependent upon preventing traffic volume from reaching a saturation threshold for a set of conditions on a road segment. A degree of saturation may be defined as demand in relation to capacity, or a traffic flow rate for a given road segment or junction. A threshold or saturation point as 80%, 85%, or 90% may be an indicator of demand as a proportion of capacity. For example, each lane of a road segment may have a capacity of approximately 1,500 to 2,000 vehicles per hour. A degree of saturation may be determined as a ratio of actual or estimated vehicles per time period (fraction of an hour) traveling on the road segment to the road segment's capacity. Once the degree of saturation reaches or exceeds the saturation threshold for the road segment, the main recourse to reducing congestion is time—to wait until traffic volume is lower for the set of conditions, which may result in significant traffic delays. As traffic volume increases on the road segment, having an ability to reduce incoming traffic to the road segment before or as the saturation threshold is approached may be advantageous in maintaining traffic flow and keeping the degree of saturation below the saturation threshold.

The TMS 101 may use a number of processes to meet system objectives such as those of reducing travel time, increasing vehicle throughput, or otherwise improving vehicle and/or pedestrian traffic flows through an area.

Figure 21B:
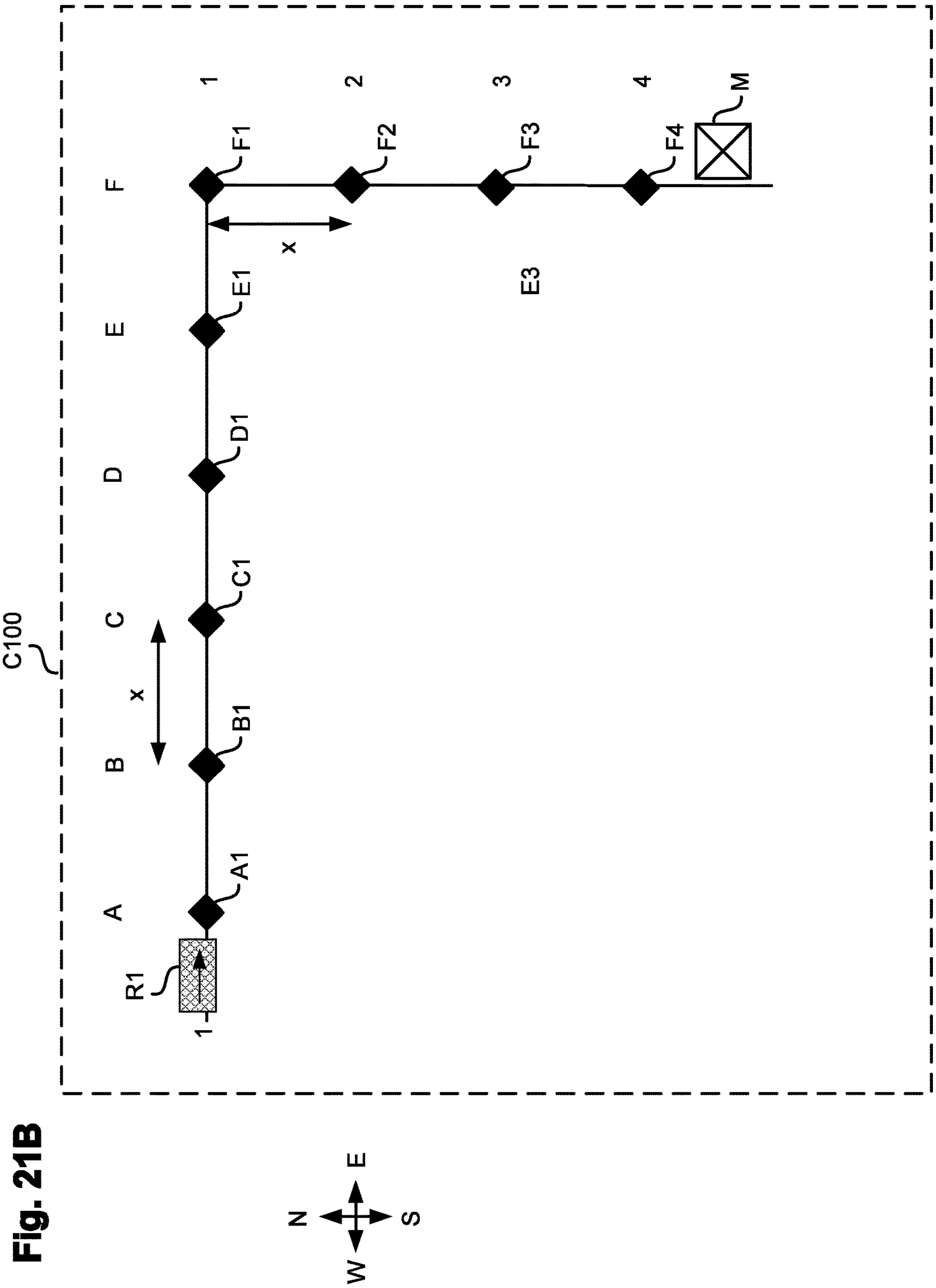
FIG. 21B is a portion of the area C100 shown in FIG. 21A, according to one example.

An area C100 shown in FIG. 21B is a portion of the area C100 shown in FIG. 21A, according to one example. FIG. 21B may be similar to FIG. 12A-12B in that at least a portion of a route of one or more vehicles, for example the vehicle R1, may be isolated from other roads and/or traffic in the area C100. Some or all of the traffic signals on the route may be adjusted to remain green in a direction of travel of the vehicle R1 for a period of time such that cross traffic and/or other traffic movements of the route, or portions of the route, may be temporarily halted, such as by adjustment of traffic signals and/or other dynamic traffic control systems or processes, to allow the vehicle R1, or other vehicles, to proceed on the route with little or no delay, for a period of time. This type of route may be referred to as a flashroute.

The flashroute may be formed by a number of consecutive road segments, and may be specifically generated for a specific route of one or more vehicles. More than one flashroute may be generated for a route, such as in a case that one or more road segments of the route has or is expected to have a movement of timing conflict. The route may then have two or more flashroutes to be navigated by the vehicle R1 in succession, with a possible stop or delay for the vehicle R1 between flashroutes.

A number of road segments may be used to form a flashroute for temporary use by a designated vehicle or group of vehicles, and then the road segments may return to normal use after the designated vehicles have traveled through, or past, or circumvented or deviated from the road segments that form the flashroute. Road segments of the flashroute may change to/from other uses (i.e. allow other traffic movements) asynchronously with other road segments.

A road segment that forms a portion of a first flashroute may be separated from the first flashroute, such as in a case after a vehicle or group of vehicles passes through a junction. For example, as the vehicle R1 travels from the junction A1 past the junction B1 toward the junction F1, the road segment of road 1 between the junctions A1 and B1 is no longer needed for the first flashroute of the vehicle R1. That road segment may then be separated from the first flashroute, and cross traffic and other traffic movements may resume at the junction A1 and the junction B1. In some cases, the junction A1 may not be needed while the junction B1 is still needed for the first flashroute, and thus the junction A1 may also resume service for other traffic movements before the junction B1 does so.

Further, a second flashroute (or portions of the second flashroute) that does not conflict with the first flashroute may be in concurrent operation within the area C100, such as a case the first flashroute includes only road segments distinct from the road segments of the second flashroute, the first flashroute includes only junctions distinct from the junctions of the second flashroute, or the first flashroute includes only lanes of road segments that are distinct from lanes of road segments of the second flashroute. Flashroutes are not considered to be in conflict in cases where a same set of lanes, road segments, and/or junctions may be used on multiple flashroutes in different time domains.

Flashroute junctions may serve as gates to queue and prepare traffic for entering the flashroute. In such a case the flashroute may remain active after the vehicle R1 has passed to allow another vehicle R2 to enter the flashroute if a route of the vehicle R2 is consolidated, at least in part, with that of the vehicle R1 or otherwise overlaps with the route of the vehicle R1 during a concurrent period of time.

Figure 21C:
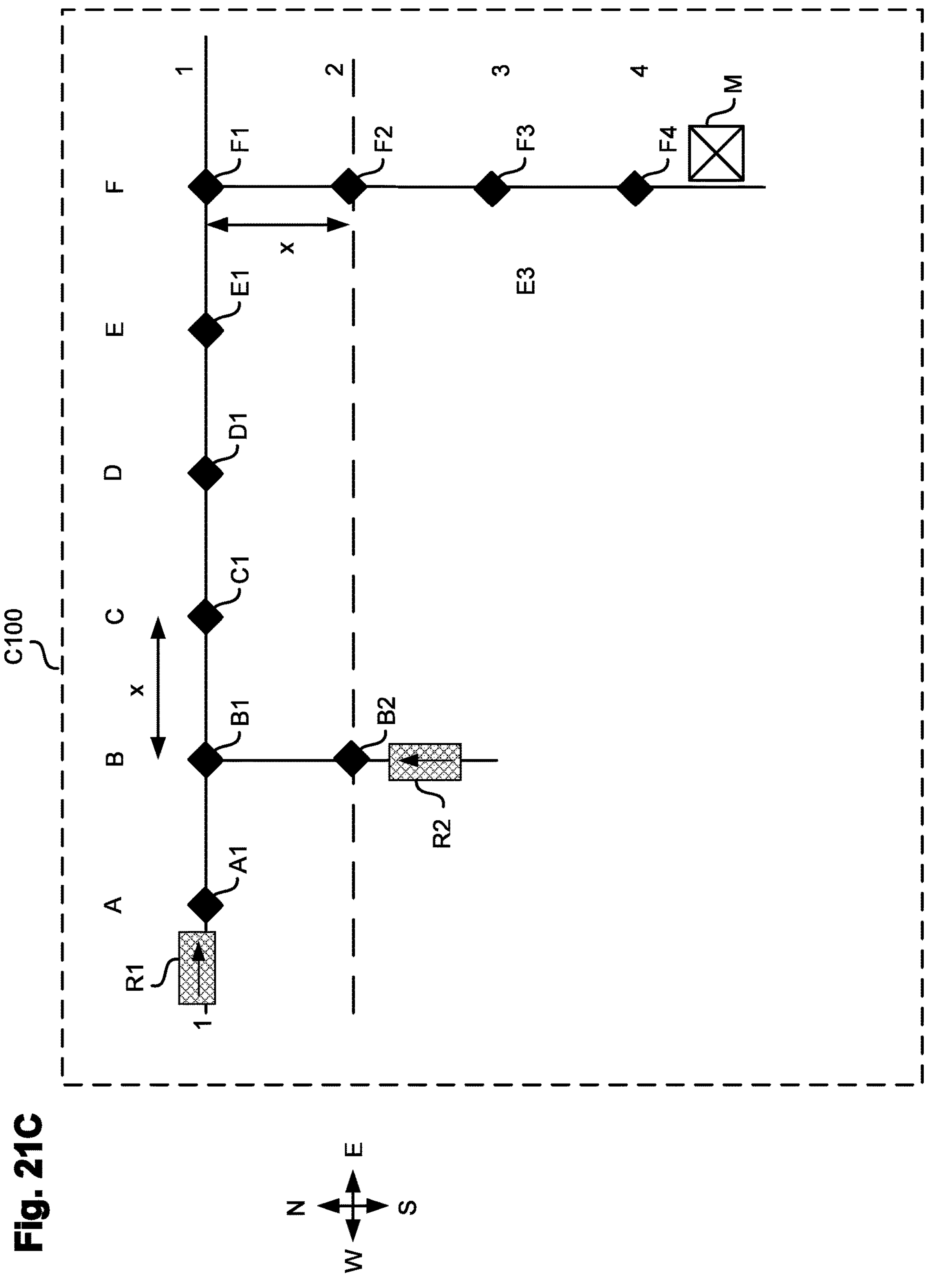
FIG. 21C is a diagram showing the area C100, similar to that shown in FIG. 21B with the addition of a vehicle R2 and a second flashroute for the vehicle R2, according to one example.

FIG. 21C is a diagram showing the area C100, similar to that shown in FIG. 21B with the addition of a vehicle R2 and a second flashroute for the vehicle R2, according to one example. The first flashroute remains the same as described in FIG. 21B for the vehicle R1.

In a case the vehicle R2 has a destination such as to the east of the road F on the road 1, the vehicle R2 may be routed on one of several routes to reach the destination, such as by turning right at the junction B2 and proceeding east on road 2 (shown in FIG. 21B) to junction F2 and turning left, then turning right at junction F1.

However, instead at least a portion of the route of the vehicle R2 may be consolidated with at least a portion of the route of the vehicle R1. In such a case the route of the vehicle R2 may be to travel north on the road B to the junction B1, turn right and proceed on road 1 through the junction F1 en route to the destination east of road F. The route of the vehicle R1 remains as that described by FIG. 21B, with the destination M. Depending on a variety of factors, for example, an ETA at the junction B1 of the vehicle R1 relative to the estimated time of arrival of the vehicle R2, the relative VSS of the vehicle R1 compared with the vehicle R2, which of the vehicles is turning first after route consolidation (e.g. at the junction F1), and/or other traffic movements or concurrent traffic with either that of the vehicle R1, the vehicle R2 or other traffic, the TMS 101 may guide the vehicle R2 to slow or stop at the junction B1 until after the vehicle R1 has passed. A similar scenario is described in FIGS. 12A-12B. The routes (or portions thereof) of the vehicles R1 and R2 may also each be a flashroute as described in FIG. 21B.

Figure 21D:
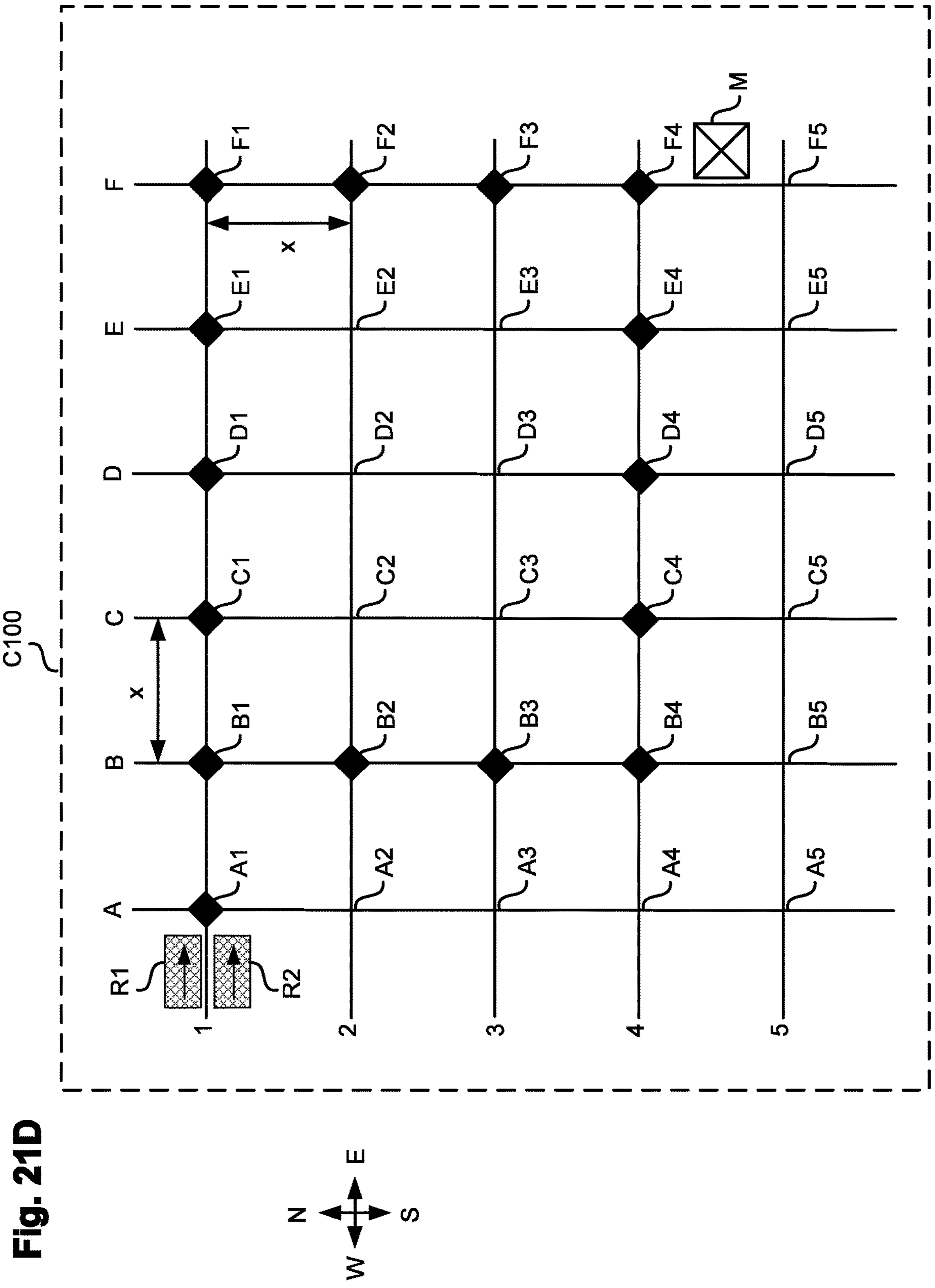
FIG. 21D is a diagram showing the area C100, similar to that shown in FIG. 21A with the addition of a vehicle R2 traveling concurrently with and in the same direction as the vehicle R1 on a common road segment, according to one example.

FIG. 21D is a diagram showing the area C100, similar to that shown in FIG. 21A with the addition of a vehicle R2 traveling concurrently with and in the same direction as the vehicle R1 on a common road segment, according to one example. Both vehicles may be heading toward the destination M. If a traffic volume for any road segment along an intended route of the vehicles R1 and R2 is estimated to be approaching, equal to, or having already exceeded a saturation threshold during an upcoming time period that at least one of the vehicles R1 and R2 is on the intended route, then the routes of one or more of the vehicles R1 and R2 may be adjusted or changed. For example, the vehicle R1 may be routed to travel along the road 1 to the junction F1, turn right at the junction F1 and proceed south on road F to the destination M. Meanwhile, the vehicle R2 may be routed to turn right at the junction B1 and proceed south on the road B to the junction B4, and then turn left at the junction B4 and proceed on the road 4 to the junction F, and then to turn right onto the road F and proceed to the destination M. This may reduce the risk of, or offset a buildup of traffic and avoid reaching the saturation threshold on the road segments of the original intended route.

If the routes of the vehicles R1 and R2 are fractionated, the vehicle with a higher VSS may be provide with a more favorable route or route segments in terms of expected distance, travel time, or number of stops.

While some examples described have included consolidation of routes and fractionation of routes as separate cases, in some cases routes of two or more vehicles may be consolidated on some road segments for a portion (and fractionated for another portion) of each vehicle's respective route. In other words, the vehicles may be rerouted through route consolidation and/or fractionation. In some cases, the first flashroute may remain the same as described in FIG. 21B for the vehicle R1; however, the second flashroute for the vehicle R2 may be consolidated with the first flashroute.

Figure 21E:
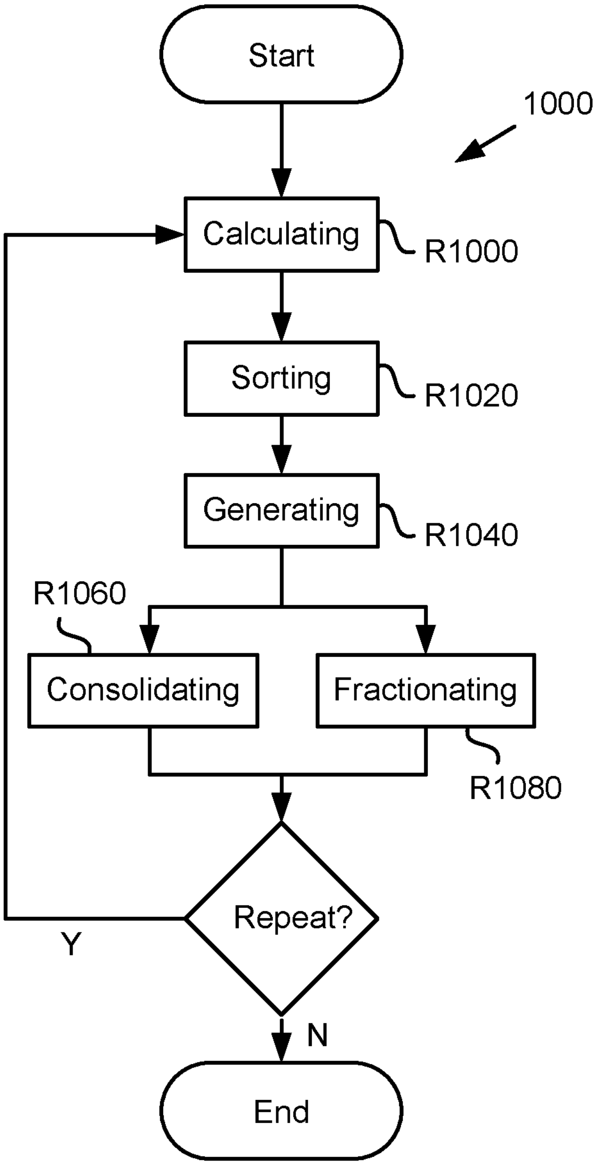
FIG. 21E is a diagram for a routing process 1000 for routing traffic based on saturation of a road segment, according to one example.

FIG. 21E is a diagram for a routing process 1000 for routing traffic based on saturation of a road segment, according to one example. The process 1000 for routing traffic may include at least one of the steps of:

Calculating R1000 a degree of saturation of one or more road segments in an area during an upcoming time period, calculating if a degree of saturation of one or more road segments in the area has been reached or exceeded, and/or calculating an estimated saturation threshold and/or travel time for at least one road segment in the area. Calculations may use historical or real-time vehicle counts or weightings in calculations.

Sorting R1020 a VSS of a first vehicle R1 and a VSS of a second vehicle R2 expected to be traveling in the area during the upcoming time period;

Generating R1040 routes for the vehicle R1 and the vehicle R2;

Consolidating R1060 routes of the vehicle R1 and the vehicle R2 for at least one road segment if traffic on the road segment may be estimated to remain below the saturation threshold of the road segments during the upcoming time period with the inclusion of the vehicle R1 and the vehicle R2 on the consolidated route for the vehicles R1 and R2. A GSS may be generated for a time period the vehicles R1 and R2 are on a concurrent road segment of the consolidated route.

Fractionating R1080 at least a common, concurrent road segment of the routes of the vehicles R1 and R2 if the consolidated route of the vehicles R1 and R2 may be estimated to reach or exceed the saturation threshold of one or more road segments during the upcoming time period with the inclusion of the vehicles R1 and R2 on the consolidated route for the vehicles R1 and R2. The vehicle R1 and/or the vehicle R2 may be guided by the TMS 101 to take a different road segment for at least one road segment of the consolidated route to avoid saturation on the consolidated route.

The TMS 101 or a navigation system may sort a VSS of the first vehicle R1 and the second vehicle R2 estimated to be traveling from a present time to within a time period in the area.

In a case the VSS of the first vehicle R1 is greater than the VSS of the second vehicle R2, the TMS 101 or the navigation system may generate a first route for the first vehicle R1 first, free of constraints related to those of the second vehicle R2, and then generate a second route for the second vehicle R2, the second route having constraints related to those of the first route (if applicable).

If any road segments of the first and second routes intersect or overlap and the vehicle R1 and the vehicle R2, or the buffer lengths of the vehicles R1 and R2, are estimated to intersect from different or conflicting directions during the time period then the TMS 101 may generate a different second route to adjust the different second route to have at least one road segment in common with that of the first route, and/or adjust signal timing of any signalized junction in the area such that the vehicles R1 and R2 may travel on a common road segment with the vehicle R2 following after the R1 instead of arriving at a junction from a conflicting direction as that of the vehicle R1. Further, the TMS 101 may adjust the second route to have at least one road segment in common with that of the first route if the second route is within a distance, travel time, or number of junctions of the first route AND has a road segment that may connect to the first route. Alternatively, the TMS 101 may adjust the first route and/or the second route to have at least one road segment in common if the second route is within a distance, travel time, or number of junctions of the first route AND has a road segment that may connect to the first route.

In one case, the TMS 101 may adjust guidance of and/or signal timing for the vehicle R1 and/or the vehicle R2 such that the buffer lengths of the vehicles R1 and R2 do not intersect, overlap, or otherwise conflict.

In another case, if the buffer lengths of the vehicles R1 and R2 are estimated to overlap in a common direction of concurrent travel on a road segment, the TMS 101 may generate a GSS of the VSS of each of the vehicles R1 and R2, and consolidate the buffer lengths of the vehicles R1 and R2 for a period of time while the vehicles R1 and R2 are traveling on the concurrent road segment.

A decision of whether to consolidate one or more road segments of the first route and the second route may depend on if consolidating one or more of the road segments would lead to a condition where the estimated saturation threshold is reached or exceeded on one or more road segments of the first or second routes.

In another case, if consolidation of one or more road segments of the first route and the second route would lead to a condition where the estimated saturation threshold is reached or exceeded, or if a present saturation threshold is already reached or exceeded for at least one road segment, the TMS 101 may fractionate or separate any common, concurrent road segments of the first route and the second route, or separate the second vehicle R2 from the group of vehicles including the first vehicle R1 (such as by guiding the vehicle R2 to stop at a signalized junction with a red traffic signal after the vehicle R1 has passed through the signalized junction during a green traffic signal phase) while guiding both the vehicles R1 and R2 on the common road segments. Traffic may be fractionated by adjusting a route of one or more vehicles estimated to be traveling concurrently on one or more road segments.

Figure 22:
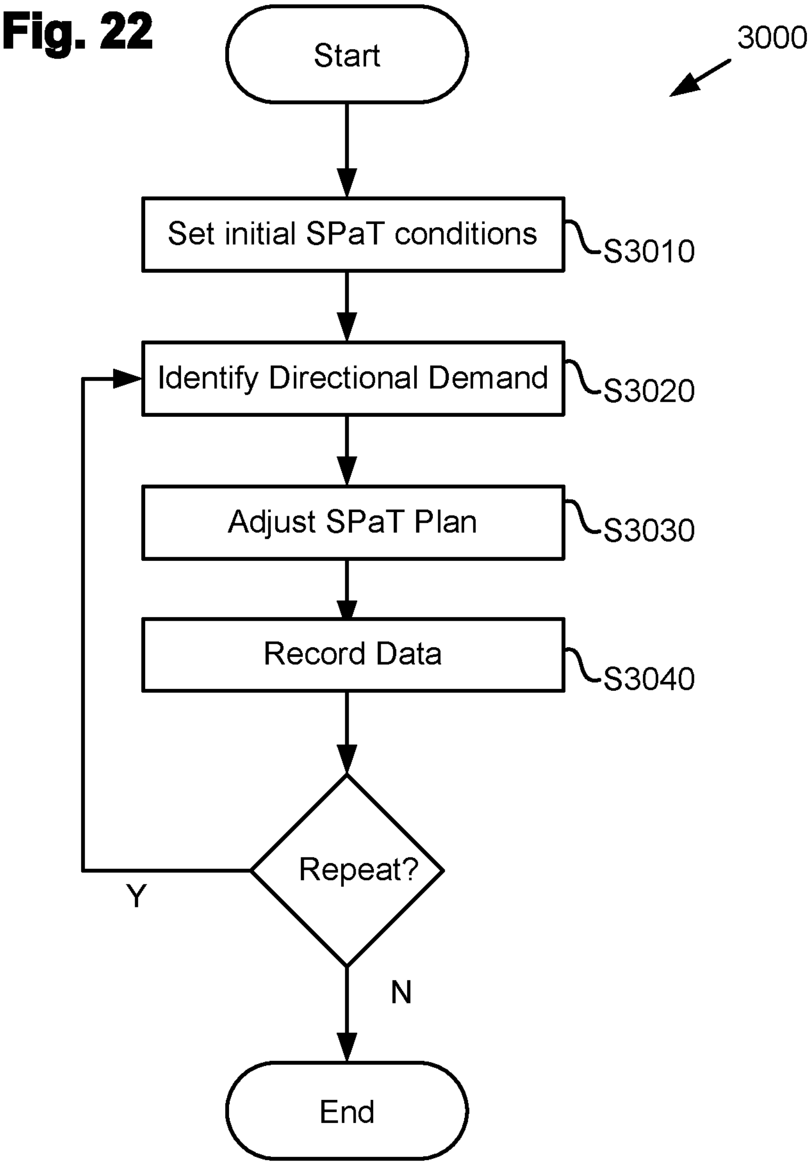
FIG. 22 is a diagram of an adaptive traffic signal control process 3000 of a junction located within an area of the TMS 101 that may be executed by the TMS 101, a TSS 348, and/or a TCD controller 340, according to one example.

FIG. 22 is a diagram of an adaptive traffic signal control process 3000 of a junction located within an area of the TMS 101 that may be executed by the TMS 101, a TSS 348, and/or a TCD controller 340, according to one example. The adaptive traffic signal control process 3000 may include at least one of the sub processes of setting initial SPaT (Signal Phase and Timing) conditions S3010, identifying directional demand S3020 in at least one direction of the junction, adjusting a SPaT plan S3030, and recording data S3040 of the SPaT and/or traffic related to the junction as part of S3030. May further include processes for transmitting data to the TMS 101, a TSS 348, and/or a TCD controller 340.

Directional demand may include traffic approaching the junction from at least one direction, for example, vehicles from a northbound, westbound, eastbound, and/or southbound direction such as described by FIGS. 5A-5F, 6A-6C, and 9.

One way the TMS 101 may determine a duration of a traffic signal phase may be by comparing multiple traffic demands of the junction for multiple time intervals (e.g. a first time interval $t_1$, a second time interval $t_2$, a third time interval $t_3$, etc.). For example, the sum of traffic demand from all directions for a time interval $t_1$ may be compared. Then the same may be compared for the time intervals $t_1+t_2$. Then again for the time interval $t_1+t_2+t_3$ and so on, such as to some tn to optimize for a present system operating mode or modes.

Figure 23:
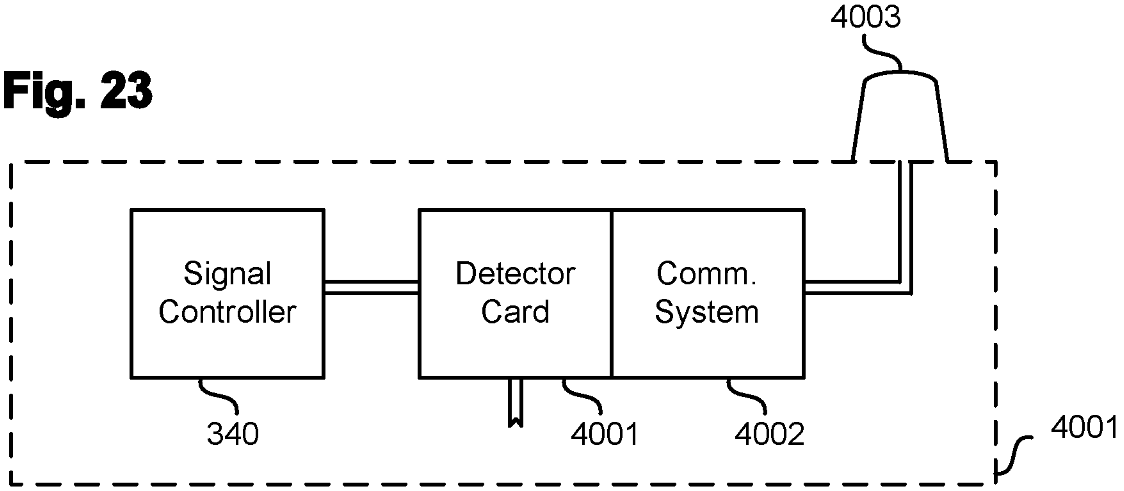
FIG. 23 is a diagram of a detection system for a traffic signal controller, according to one example.

FIG. 23 is a diagram of a detection system for a traffic signal controller, according to one example. A cabinet 4001 may include a TCD controller 340 (or a portion of the TCD controller 340 described as the controller 506 in FIG. 3), at least one detector circuit 4005 (in one example, it may include at least one of an I/O board 502, detector card 504, a controller 506, and at least one switch 508), and a communication system 4002.

The detector card 4005 may be configured to send and/or receive data through the communication system 4002 and also to communicate with the controller 506. In one example, the detector circuit 4005 may include at least one of an input/output (I/O) port such as an Ethernet, serial, or USB port, a processor such as an embedded processor or standalone processor (e.g. Raspberry Pi, Arduino, etc.), and one or more switches such as a relay or a system to provide an analogous or equivalent digital output signal (e.g. solid state relay. etc.). The I/O port may be configured to provide for data to be sent from or received by the processor, such as with the communication system 4002, and the processor may be connected to the switch or switches that may be configured to provide detection input to the controller 506.

The communication system 4002 may be a device or system for any kind of known wireless and/or wired connection, such as Ethernet, Wi-Fi, Bluetooth, DSRC, radio, satellite, or cellular communication. In a case the communication system 4002 is a wireless device or system, at least one of a modem, a router, and an antenna 4003 may also be included in or connected to the communication system 4002. In a case the communication system 4002 is a wired connection, such as with an Ethernet connection, the communication system 4002 may include an Ethernet cable and not have an antenna.

The communication system 4002 may receive data from elsewhere within the TMS 101, such as from the cloud computing environment 300, or directly from an On-Board Unit (OBU) or a vehicle CAN bus, and/or a mobile device 320 such as a smartphone of a vehicle or wearable device of a user, to communicate a detection of a vehicle, a bicyclist, and/or a pedestrian (traffic) to the corresponding detector circuit 4005. The detector circuit 4005 may in turn communicate the detection to the TCD controller 340 to effect change within the TMS 101 to provide, for example, a green light signal or a pedestrian walk signal, at a junction in a direction relevant to the traffic either immediately or after a designated time period. The detector circuit 4005 may be configured to communicate with the TCD controller 340 via a connection on a detector card rack or other wired connection, such as via a wiring harness, a serial cable, a Synchronous Data Link Control (SDLC) connection, or any other known connection, wiring standard or technique.

Communication between the TCD controller 340 and other systems of the TMS 101, such as the cloud computing environment 300, may be unidirectional such as from the cloud computing environment 300 to the TCD controller 340, or bidirectional with data communicated between both the cloud computing environment 300 and the TCD controller 340.

Detection may not be directly correlated to actual traffic in that some types of traffic and some vehicles, bicyclists, and/or pedestrians may have different weightings from others, as described by FIGS. 8A-8F. For example, detection information about a vehicle may be received by the detector circuit 4005 but not communicated to the TCD controller 340 because the vehicle may have a low weighting or priority relative to other traffic. In another example, the detection information may be communicated to the TCD controller 340 as detection of at least one vehicle because the vehicle may have a high weighting or priority relative to other traffic. In other words, detection of the vehicle may not count strictly as one vehicle but rather may count as more or fewer vehicles depending on the weighting or priority of the vehicle detected (or bicycle or pedestrian).

Further, the communication system 4002 may transmit data such as to the TMS 101, another traffic signal system 348, and/or a mobile device 320 via the cloud computing environment 300 or via point-to-point communication.

A method for managing traffic may include the steps of receiving a traffic detection input of a presence of at least one of a vehicle, a driver, a passenger, a mobile device user, a pedestrian, a bicyclist, and a drone, calculating a traffic demand in at least one direction approaching at least one junction, and providing a first vehicle with a green traffic signal for a duration of time to allow the first vehicle to pass the green traffic signal. The duration of time may be based on multiple detection instances of at least the first vehicle approaching one of the junctions, a priority level of at least the first vehicle, and a relative traffic demand of at least one other direction of the junctions. The priority level may be determined by a vehicle priority level score, and the relative traffic demand may be determined by an expected value calculation of traffic detected and/or traffic configured to provide an identification.

The method may further include operating in a mode to execute a vehicle-optimal mode, a system-optimal mode, and/or a vehicle-system optimal mode. The vehicle-system optimal mode executes a vehicle-optimal mode for vehicles with a priority level above a minimum priority level, and executes a system-optimal mode for vehicles with a priority level below the minimum priority level.

Further, the minimum priority level may vary among a set of fixed minimum priority levels.

Further, the minimum priority level may vary with one or more traffic demand.

The method may further include prioritizing a traffic demand approaching a first direction of the junction against a traffic demand approaching a second direction of the junction based on the traffic demands of the first and the second junction directions.

The method may further include prioritizing one of a first vehicle approaching a junction against a second vehicle approaching the junction by comparing a priority level score of the first vehicle and a priority level score of the second vehicle. The priority level score of each vehicle may be variable and based on at least one of a numerical count of the vehicle, vehicle score, a driver score, a vehicle class, a vehicle specification, a navigation score, a utilization score, and a boost score of at least one of the first and the second vehicle.

The method may further include sorting at least one group of vehicles approaching a junction of two or more road segments, by at least one of the priority level of each vehicle and the priority level of each group of vehicles.

The method may further include sorting a set of junctions by a junction weighting of a first junction compared with a junction weighting of a second junction, to prioritize a traffic demand approaching at least one direction of the first junction and a traffic demand approaching at least one direction of the second junction.

The method may further include routing a set of vehicles to travel in a same direction on a common road segment for at least part of a route of each vehicle.

The method may further include routing a set of vehicles traveling in a same direction on a common road segment to travel on separate road segments for at least part of a route of each vehicle.

The method may further include isolating a set of junctions and road segments from other traffic for one or more vehicles to travel at least part of the route of the vehicles. Each traffic signal may be provided as a green light in a direction of travel of the vehicles at least until at least one vehicle has passed the traffic signal.

The method may further include predicting a location of one or more vehicles during a time period and a probability of the location of one or more vehicles at approximately an end of the time period.

A system for detecting traffic may be based on detection input from remote mobile sources. The system may include a detector card configured to receive one or more detection signals from a computer network and transmit the detection signals to a traffic signal controller. The computer network may be configured to communicate with and remotely receive location information from a mobile device, a motor vehicle, a drone, or a bicycle.

The location information may be communicated to the computer network, the computer network calculates when to transmit the detection signals to the detector card, and the detector card may be configured to provide the detection signals to a traffic signal controller.

Further, the system may provide detection signals to the traffic signal controller at a fixed ratio relative to actual vehicle detection counts.

Further, the system may provide detection signals to the traffic signal controller at a variable ratio relative to actual vehicle detection counts. Further, the variable ratio of detection signals provided to the traffic signal controller may be based on a priority level of the detected vehicle.

A system for adaptively controlling traffic control devices may include a traffic signal system, a computing network, a communication system, and a mobile device. The traffic signal system may be configured to be in communication with the computing network through the communication system, the mobile device may be configured to be in communication with the computing network through the communication system, and the computing network adaptively controls the traffic signal system using a location of the mobile device. A priority level may be based on a vehicle class, a vehicle specification, a vehicle status, a driver action, a navigation adherence, utilization, and/or a boost.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. A method for managing traffic signal priority comprising:

receiving, at a traffic management system, vehicle data from a mobile device associated with a vehicle;

determining a Vehicle Score Stack (VSS) for the vehicle based on historical driving behavior accumulated over a plurality of trips, the determining comprising at least one of:

monitoring historical route selections over a minimum time period, tracking temporal consistency of travel patterns, and detecting varying vehicle speed, monitoring driver attention levels through at least one of:

detection of usage of a mobile device, driver hand position on a steering wheel, measuring a following distance consistency, and consistency of vehicle control inputs, calculating a VSS boost wherein at least one of:

a higher level of predictability and a lower distraction level results in an increase in VSS boost points, a consistent attention pattern results in additional VSS boost points, applying the VSS boost points to the VSS to compute a VSS value, wherein a higher VSS value results in increased traffic signal priority; and transmitting the traffic signal priority to a traffic signal controller to control operation of at least one traffic signal to provide priority signaling to the vehicle.

2. The method of claim 1 wherein monitoring driver attention levels comprises at least one of:

detecting the mobile device operating mode, monitoring the mobile device mounting status, and tracking steering wheel contact; and evaluating control input smoothness.

3. The method of claim 1 wherein a vehicle following distance consistency comprises:

detecting distances to a vehicle ahead, evaluating a following distance consistency, applying a following distance consistency score.

4. The method of claim 1 wherein calculating the VSS boost includes:

establishing a base VSS value, applying predictability enhancement factors, adding attention level points to the base VSS.

5. The method of claim 1 wherein vehicle control inputs consistency comprises at least one of:

measuring steering input smoothness, evaluating acceleration patterns, and assigning control consistency points.

6. The method of claim 1 further comprising:

providing real-time feedback about:

current VSS multipliers, available boost opportunities, and attention achievements.

7. The method of claim 1 wherein providing traffic signal priority comprises:

detecting vehicle approach, confirming current attention levels, and applying real-time VSS boost points.

8. The method of claim 1, further comprising:

identifying a plurality of vehicles traveling together as a vehicle group;

calculating a Group Score Stack (GSS) for the vehicle group based on an aggregation of VSS values for vehicles within the vehicle group; and providing traffic signal priority to the vehicle group based on the GSS, wherein a higher GSS results in enhanced traffic signal priority for the vehicle group.

9. The method of claim 8, wherein the vehicle group is provided with coordinated green signals across a plurality of intersections along a travel route of the vehicle group.

10. The method of claim 1, further comprising:

determining a traffic density for a road segment or zone;

selecting an operating mode based on the traffic density, wherein:

when the traffic density is below a first threshold, a vehicle-centric operating mode is selected that optimizes traffic signal priority for individual vehicles having VSS values exceeding a VSS threshold, and when the traffic density exceeds the first threshold, a system-centric operating mode is selected that optimizes traffic signal timing for aggregate traffic throughput.

11. The method of claim 10, wherein the VSS threshold for receiving vehicle-centric traffic signal priority increases as the traffic density increases.

12. A system for managing traffic signal priority comprising:

a communication interface configured to receive vehicle data from a mobile device associated with a vehicle;

a processor configured to:

determine a Vehicle Score Stack (VSS) for the vehicle based on historical driving behavior accumulated over a plurality of trips by at least one of:

monitoring historical route selections over a minimum time period, tracking temporal consistency of travel patterns, and detecting varying vehicle speed;

monitor driver attention levels through at least one of:

detection of usage of a mobile device, driver hand position on a steering wheel, measuring a following distance consistency, and consistency of vehicle control inputs;

calculate a VSS boost wherein at least one of:

a higher level of predictability and a lower distraction level results in an increase in VSS boost points, a consistent attention pattern results in additional VSS boost points;

apply the VSS boost points to the VSS to compute a VSS value, wherein a higher VSS value results in increased traffic signal priority;

transmit the traffic signal priority to a traffic signal controller; and the traffic signal controller configured to control operation of at least one traffic signal to provide priority signaling to the vehicle.

13. The system of claim 12 wherein monitoring driver attention levels comprises at least one of:

detecting the mobile device operating mode, monitoring the mobile device mounting status, and tracking steering wheel contact; and evaluating control input smoothness.

14. The system of claim 12 wherein a vehicle following distance consistency comprises:

detecting distances to a vehicle ahead, evaluating a following distance consistency, applying a following distance consistency score.

15. The system of claim 12 wherein calculating the VSS boost includes:
establishing a base VSS value,
applying predictability enhancement factors,
adding attention level points to the base VSS.

16. The system of claim 12 wherein vehicle control inputs consistency comprises at least one of:
measuring steering input smoothness,
evaluating acceleration patterns, and
assigning control consistency points.

17. The system of claim 12 further comprising:
providing real-time feedback about:
current VSS multipliers,
available boost opportunities, and
attention achievements.

18. The system of claim 12 wherein providing traffic signal priority comprises:
detecting vehicle approach,
confirming current attention levels, and
applying real-time VSS boost points.

19. The system of claim 12, wherein the processor is further configured to:
identify a plurality of vehicles traveling together as a vehicle group;
calculate a Group Score Stack (GSS) for the vehicle group based on an aggregation of VSS values for vehicles within the vehicle group; and
provide traffic signal priority to the vehicle group based on the GSS.

20. The system of claim 12, wherein the processor is further configured to:
determine a traffic density for a road segment or zone;
select an operating mode based on the traffic density, wherein:
when the traffic density is below a first threshold, a vehicle-centric operating mode is selected, and
when the traffic density exceeds the first threshold, a system-centric operating mode is selected.

21. A non-transitory computer-readable medium storing instructions that, when executed by a processor, cause the processor to perform operations for managing traffic signal priority, the operations comprising:
receiving vehicle data from a mobile device associated with a vehicle;
determining a Vehicle Score Stack (VSS) for the vehicle based on historical driving behavior accumulated over a plurality of trips, the determining comprising at least one of:
monitoring historical route selections over a minimum time period,
tracking temporal consistency of travel patterns, and
detecting varying vehicle speed;
monitoring driver attention levels through at least one of:
detection of usage of a mobile device,
driver hand position on a steering wheel,
measuring a following distance consistency, and
consistency of vehicle control inputs;
calculating a VSS boost wherein at least one of:
a higher level of predictability and a lower distraction level results in an increase in VSS boost points,
a consistent attention pattern results in additional VSS boost points;
applying the VSS boost points to the VSS to compute a VSS value, wherein a higher VSS value results in increased traffic signal priority; and
transmitting the traffic signal priority to a traffic signal controller to control operation of at least one traffic signal to provide priority signaling to the vehicle.

22. The non-transitory computer-readable medium of claim 21 wherein monitoring driver attention levels comprises at least one of:
detecting the mobile device operating mode,
monitoring the mobile device mounting status, and
tracking steering wheel contact; and
evaluating control input smoothness.

23. The non-transitory computer-readable medium of claim 21 wherein a vehicle following distance consistency comprises:
detecting distances to a vehicle ahead,
evaluating a following distance consistency,
applying a following distance consistency score.

24. The non-transitory computer-readable medium of claim 21 wherein calculating the VSS boost includes:
establishing a base VSS value,
applying predictability enhancement factors,
adding attention level points to the base VSS.

25. The non-transitory computer-readable medium of claim 21 wherein vehicle control inputs consistency comprises at least one of:
measuring steering input smoothness,
evaluating acceleration patterns, and
assigning control consistency points.

26. The non-transitory computer-readable medium of claim 21 further comprising:
providing real-time feedback about:
current VSS multipliers,
available boost opportunities, and
attention achievements.

27. The non-transitory computer-readable medium of claim 21 wherein providing traffic signal priority comprises:
detecting vehicle approach,
confirming current attention levels, and
applying real-time VSS boost points.

28. The non-transitory computer-readable medium of claim 21, wherein the operations further comprise:
identifying a plurality of vehicles traveling together as a vehicle group;
calculating a Group Score Stack (GSS) for the vehicle group based on an aggregation of VSS values for vehicles within the vehicle group; and
providing traffic signal priority to the vehicle group based on the GSS.

29. The non-transitory computer-readable medium of claim 21, wherein the operations further comprise:
determining a traffic density for a road segment or zone; and
dynamically adjusting the degree of traffic signal priority provided to the vehicle based on the traffic density, wherein vehicles with higher VSS values receive proportionally greater priority as traffic density decreases.

* * * * *